(12) United States Patent
Okamura et al.

(10) Patent No.: US 7,120,105 B2
(45) Date of Patent: Oct. 10, 2006

(54) RECORDING MEDIUM, REPRODUCING APPARATUS, AND RECORDING APPARATUS

(75) Inventors: Hiroshige Okamura, Chiba (JP); Toshiyuki Nakagawa, Kanagawa (JP); Takanori Takemoto, Tokyo (JP)

(73) Assignee: Sony Corporation, Tokyo (JP)

(*) Notice: Subject to any disclaimer, the term of this patent is extended or adjusted under 35 U.S.C. 154(b) by 544 days.

(21) Appl. No.: 10/382,833

(22) Filed: Mar. 7, 2003

(65) Prior Publication Data

US 2003/0174625 A1 Sep. 18, 2003

(30) Foreign Application Priority Data

Mar. 8, 2002 (JP) .............................. 2002-064096

(51) Int. Cl.
*G11B 20/12* (2006.01)
*G11B 27/00* (2006.01)

(52) U.S. Cl. .................................. 369/59.25; 369/275.3

(58) Field of Classification Search ............. 369/59.25
See application file for complete search history.

(56) References Cited

U.S. PATENT DOCUMENTS

| | | | | |
|---|---|---|---|---|
| 5,917,792 A * | 6/1999 | Shigenobu et al. | ...... | 369/59.26 |
| 6,130,866 A * | 10/2000 | Shigenobu et al. | ...... | 369/47.18 |
| 6,191,903 B1 * | 2/2001 | Fujimoto et al. | ............. | 360/48 |

* cited by examiner

*Primary Examiner*—Thang V. Tran
*Assistant Examiner*—Tawfik Goma
(74) *Attorney, Agent, or Firm*—Oblon, Spivak, McClelland, Maier & Neustadt, P.C.

(57) ABSTRACT

The present invention is associated with a recording medium in which, to a data part constituted by frames obtained by attaching a synchronous signal to the data divided by a predetermined data length, data having a preamble part and a postamble part attached with at least one synchronous signal having a pattern different from that of the synchronous signal attached to the data part are recorded, a reproducing apparatus for reproducing this recording medium, and a recording apparatus for recording data to this recording medium.

4 Claims, 33 Drawing Sheets

| FRAME | FS PATTERN |
|---|---|
| PrA0 | FS7 |
| PrA1 | FS7 |
| PrA2 | FS7 |
| PrA3 | FS7 |
| PrA4 | FS7 |
| PrA5 | FS1 |
| PrA6 | FS4 |
| PrA7 | FS7 |
| PrA8 | FS4 |
| PrA9 | FS2 |

| FRAME | FS PATTERN |
|---|---|
| DSX0 | FS0 |
| DSX1 | FS1 |
| DSX2 | FS2 |
| DSX3 | FS3 |
| DSX4 | FS3 |
| DSX5 | FS1 |
| DSX6 | FS4 |
| DSX7 | FS1 |
| DSX8 | FS5 |
| DSX9 | FS5 |
| DSX10 | FS4 |
| DSX11 | FS3 |
| DSX12 | FS4 |
| DSX13 | FS6 |
| DSX14 | FS6 |
| DSX15 | FS3 |
| DSX16 | FS5 |
| DSX17 | FS3 |
| DSX18 | FS2 |
| DSX19 | FS2 |
| DSX20 | FS5 |
| DSX21 | FS6 |
| DSX22 | FS5 |
| DSX23 | FS1 |
| DSX24 | FS1 |
| DSX25 | FS6 |
| DSX26 | FS2 |
| DSX27 | FS6 |
| DSX28 | FS4 |
| DSX29 | FS4 |
| DSX30 | FS2 |

| FRAME | FS PATTERN |
|---|---|
| PoA0 | FS7 |
| PoA1 | FS7 |
| PoA2 | FS7 |
| PoA3 | FS7 |
| PoA4 | FS7 |
| PoA5 | FS7 |

FIG. 3

| | | | |
|---|---|---|---|
| PREAMBLE SECTION | PrA0 | PREAMBLE FS AREA 0 | PREAMBLE DATA AREA 0 |
| | PrA1 | PREAMBLE FS AREA 1 | PREAMBLE DATA AREA 1 |
| | PrA2 | PREAMBLE FS AREA 2 | PREAMBLE DATA AREA 2 |
| | PrA3 | PREAMBLE FS AREA 3 | PREAMBLE DATA AREA 3 |
| | PrA4 | PREAMBLE FS AREA 4 | PREAMBLE DATA AREA 4 |
| | PrA5 | PREAMBLE FS AREA 5 | PREAMBLE DATA AREA 5 |
| | PrA6 | PREAMBLE FS AREA 6 | PREAMBLE DATA AREA 6 |
| | PrA7 | PREAMBLE FS AREA 7 | PREAMBLE DATA AREA 7 |
| | PrA8 | PREAMBLE FS AREA 8 | PREAMBLE DATA AREA 8 |
| | PrA9 | PREAMBLE FS AREA 9 | PREAMBLE DATA AREA 9 |
| DATA SECTOR 0 | DS0_0 | DATA SECTOR FS AREA 0_0 | USER DATA AREA 0_0 |
| | DS0_1 | DATA SECTOR FS AREA 0_1 | USER DATA AREA 0_1 |
| | DS0_2 | DATA SECTOR FS AREA 0_2 | USER DATA AREA 0_2 |
| | ... | ... | ... |
| | ... | ... | ... |
| | DS0_30 | DATA SECTOR FS AREA 0_30 | USER DATA AREA 0_30 |
| DATA SECTOR 1 | DS1_0 | DATA SECTOR FS AREA 1_0 | USER DATA AREA 1_0 |
| | DS1_1 | DATA SECTOR FS AREA 1_1 | USER DATA AREA 1_1 |
| | DS1_2 | DATA SECTOR FS AREA 1_2 | USER DATA AREA 1_2 |
| | ... | ... | ... |
| | ... | ... | ... |
| | DS1_30 | DATA SECTOR FS AREA 1_30 | USER DATA AREA 1_30 |
| DATA SECTOR 2 | DS2_0 | DATA SECTOR FS AREA 2_0 | USER DATA AREA 2_0 |
| | DS2_1 | DATA SECTOR FS AREA 2_1 | USER DATA AREA 2_1 |
| | DS2_2 | DATA SECTOR FS AREA 2_2 | USER DATA AREA 2_2 |
| | ... | ... | ... |
| | ... | ... | ... |
| | DS2_30 | DATA SECTOR FS AREA 2_30 | USER DATA AREA 2_30 |
| | | | USER DATA AREA 3_0 |
| | | | USER DATA AREA 3_1 |
| | DS14_29 | DATA SECTOR FS AREA 14_29 | |
| | DS14_30 | DATA SECTOR FS AREA 14_30 | USER DATA AREA 14_30 |
| DATA SECTOR 15 | DS15_0 | DATA SECTOR FS AREA 15_0 | USER DATA AREA 15_0 |
| | DS15_1 | DATA SECTOR FS AREA 15_1 | USER DATA AREA 15_1 |
| | DS15_2 | DATA SECTOR FS AREA 15_2 | USER DATA AREA 15_2 |
| | ... | ... | ... |
| | ... | ... | ... |
| | DS15_30 | DATA SECTOR FS AREA 15_30 | USER DATA AREA 15_30 |
| POSTAMBLE SECTION | PoA0 | POSTAMBLE FS AREA 0 | POSTAMBLE DATA AREA 0 |
| | PoA1 | POSTAMBLE FS AREA 1 | POSTAMBLE DATA AREA 1 |
| | PoA2 | POSTAMBLE FS AREA 2 | POSTAMBLE DATA AREA 2 |
| | PoA3 | POSTAMBLE FS AREA 3 | POSTAMBLE DATA AREA 3 |
| | PoA4 | POSTAMBLE FS AREA 4 | POSTAMBLE DATA AREA 4 |
| | PoA5 | POSTAMBLE FS AREA 5 | POSTAMBLE DATA AREA 5 |

|←—— 30CHBITS ——→|←—— 1902CHBITS ——→|

FIG. 4

| | | | |
|---|---|---|---|
| | DS0_0 | DATA SECTOR FS AREA 0_0 | USER DATA AREA 0_0 |
| | DS0_1 | DATA SECTOR FS AREA 0_1 | USER DATA AREA 0_1 |
| | DS0_2 | DATA SECTOR FS AREA 0_2 | USER DATA AREA 0_2 |
| | DS0_3 | DATA SECTOR FS AREA 0_3 | USER DATA AREA 0_3 |
| | DS0_4 | DATA SECTOR FS AREA 0_4 | USER DATA AREA 0_4 |
| | DS0_5 | DATA SECTOR FS AREA 0_5 | USER DATA AREA 0_5 |
| | DS0_6 | DATA SECTOR FS AREA 0_6 | USER DATA AREA 0_6 |
| | DS0_7 | DATA SECTOR FS AREA 0_7 | USER DATA AREA 0_7 |
| | DS0_8 | DATA SECTOR FS AREA 0_8 | USER DATA AREA 0_8 |
| | DS0_9 | DATA SECTOR FS AREA 0_9 | USER DATA AREA 0_9 |
| | DS0_10 | DATA SECTOR FS AREA 0_10 | USER DATA AREA 0_10 |
| | DS0_11 | DATA SECTOR FS AREA 0_11 | USER DATA AREA 0_11 |
| | DS0_12 | DATA SECTOR FS AREA 0_12 | USER DATA AREA 0_12 |
| | DS0_13 | DATA SECTOR FS AREA 0_13 | USER DATA AREA 0_13 |
| | DS0_14 | DATA SECTOR FS AREA 0_14 | USER DATA AREA 0_14 |
| DATA SECTOR 0 | DS0_15 | DATA SECTOR FS AREA 0_15 | USER DATA AREA 0_15 |
| | DS0_16 | DATA SECTOR FS AREA 0_16 | USER DATA AREA 0_16 |
| | DS0_17 | DATA SECTOR FS AREA 0_17 | USER DATA AREA 0_17 |
| | DS0_18 | DATA SECTOR FS AREA 0_18 | USER DATA AREA 0_18 |
| | DS0_19 | DATA SECTOR FS AREA 0_19 | USER DATA AREA 0_19 |
| | DS0_20 | DATA SECTOR FS AREA 0_20 | USER DATA AREA 0_20 |
| | DS0_21 | DATA SECTOR FS AREA 0_21 | USER DATA AREA 0_21 |
| | DS0_22 | DATA SECTOR FS AREA 0_22 | USER DATA AREA 0_22 |
| | DS0_23 | DATA SECTOR FS AREA 0_23 | USER DATA AREA 0_23 |
| | DS0_24 | DATA SECTOR FS AREA 0_24 | USER DATA AREA 0_24 |
| | DS0_25 | DATA SECTOR FS AREA 0_25 | USER DATA AREA 0_25 |
| | DS0_26 | DATA SECTOR FS AREA 0_26 | USER DATA AREA 0_26 |
| | DS0_27 | DATA SECTOR FS AREA 0_27 | USER DATA AREA 0_27 |
| | DS0_28 | DATA SECTOR FS AREA 0_28 | USER DATA AREA 0_28 |
| | DS0_29 | DATA SECTOR FS AREA 0_29 | USER DATA AREA 0_29 |
| | DS0_30 | DATA SECTOR FS AREA 0_30 | USER DATA AREA 0_30 |
| | | ← 30CHBITS → | ← 1902CHBITS → |

FIG. 5A

| FRAME | FS PATTERN |
|---|---|
| PrA0 | FS7 |
| PrA1 | FS7 |
| PrA2 | FS7 |
| PrA3 | FS7 |
| PrA4 | FS7 |
| PrA5 | FS1 |
| PrA6 | FS4 |
| PrA7 | FS7 |
| PrA8 | FS4 |
| PrA9 | FS2 |

FIG. 5B

| FRAME | FS PATTERN |
|---|---|
| PoA0 | FS7 |
| PoA1 | FS7 |
| PoA2 | FS7 |
| PoA3 | FS7 |
| PoA4 | FS7 |
| PoA5 | FS7 |

FIG. 5C

| FRAME | FS PATTERN |
|---|---|
| DSX0 | FS0 |
| DSX1 | FS1 |
| DSX2 | FS2 |
| DSX3 | FS3 |
| DSX4 | FS3 |
| DSX5 | FS1 |
| DSX6 | FS4 |
| DSX7 | FS1 |
| DSX8 | FS5 |
| DSX9 | FS5 |
| DSX10 | FS4 |
| DSX11 | FS3 |
| DSX12 | FS4 |
| DSX13 | FS6 |
| DSX14 | FS6 |
| DSX15 | FS3 |
| DSX16 | FS5 |
| DSX17 | FS3 |
| DSX18 | FS2 |
| DSX19 | FS2 |
| DSX20 | FS5 |
| DSX21 | FS6 |
| DSX22 | FS5 |
| DSX23 | FS1 |
| DSX24 | FS1 |
| DSX25 | FS6 |
| DSX26 | FS2 |
| DSX27 | FS6 |
| DSX28 | FS4 |
| DSX29 | FS4 |
| DSX30 | FS2 |

FIG. 6

| SYNC NO | SYNC BODY | | SYNC ID |
|---|---|---|---|
| FS0 | 1' b* | 23' h280402 | 6' h01 |
| FS1 | 1' b* | 23' h280402 | 6' h12 |
| FS2 | 1' b* | 23' h280402 | 6' h28 |
| FS3 | 1' b* | 23' h280402 | 6' h21 |
| FS4 | 1' b* | 23' h280402 | 6' h04 |
| FS5 | 1' b* | 23' h280402 | 6' h09 |
| FS6 | 1' b* | 23' h280402 | 6' h10 |
| FS7 | 1' b* | 23' h280402 | 6' h29 |

FIG. 7

| CANDIDATE FS7 | SYNC BODY | | SYNC ID |
|---|---|---|---|
| FS7_0 | 1' b* | 23' h280402 | 6' h02 |
| FS7_1 | 1' b* | 23' h280402 | 6' h08 |
| FS7_2 | 1' b* | 23' h280402 | 6' h0A |
| FS7_3 | 1' b* | 23' h280402 | 6' h11 |
| FS7_4 | 1' b* | 23' h280402 | 6' h14 |
| FS7_5 | 1' b* | 23' h280402 | 6' h22 |
| FS7_6 | 1' b* | 23' h280402 | 6' h24 |
| FS7_7 | 1' b* | 23' h280402 | 6' h29 |

FIG. 8

| SYNC NO | SYNC BODY | | SYNC ID |
|---|---|---|---|
| FS0 | 1' b* | 23' h280402 | 6' h01 |
| FS1 | 1' b* | 23' h280402 | 6' h04 |
| FS2 | 1' b* | 23' h280402 | 6' h09 |
| FS3 | 1' b* | 23' h280402 | 6' h10 |
| FS4 | 1' b* | 23' h280402 | 6' h12 |
| FS5 | 1' b* | 23' h280402 | 6' h21 |
| FS6 | 1' b* | 23' h280402 | 6' h24 |
| FS7 | 1' b* | 23' h280402 | 6' h29 |

FIG. 21

| FRAME NO | FS(n) | FSn0 | FSn1 | FSn0 | FSn1 | FSn2 | FSn3 | FSn0 | FSn1 | FSn2 | FSn3 | FSn4 |
|---|---|---|---|---|---|---|---|---|---|---|---|---|
| | | | | | | CLUSTER HEADS | | | | | | |
| PrA0 | 7 | | | | | | | | | | | |
| PrA1 | 7 | 77 | | | | | | | | | | |
| PrA2 | 7 | 77 | | 777 | | | | | | | | |
| PrA3 | 7 | 77 | | 777 | | 7777 | | | | | | |
| PrA4 | 7 | 77 | | 777 | | 7777 | | 7777 | | | | |
| PrA5 | 1 | 17 | | 177 | | 1777 | | 1777 | | | | |
| PrA6 | 4 | 41 | | 417 | | 4177 | | 4177 | | | | |
| PrA7 | 7 | 74 | | 741 | | 7417 | | 7477 | | | | |
| PrA8 | 4 | 47 | | 474 | | 4741 | | 4717 | | | | |
| PrA9 | 2 | 24 | | 247 | | 2474 | | 2441 | | | | |
| DSX0 | 0 | 02 | | 024 | | 0247 | | 0274 | | | | |
| DSX1 | 1 | 10 | | 102 | | 1024 | | 1047 | | | | |
| DSX2 | 2 | 21 | | 210 | | 2102 | | 2124 | | | | |
| DSX3 | 3 | 32 | | 321 | | 3210 | | 3202 | | | | |
| DSX4 | 3 | 33 | | 332 | | 3321 | | 3310 | | | | |
| DSX5 | 1 | 13 | | 133 | | 1332 | | 1321 | | | | |
| DSX6 | 4 | 41 | | 413 | | 4133 | | 4132 | | | | |
| DSX7 | 1 | 14 | | 141 | | 1413 | | 1433 | | | | |
| DSX8 | 5 | 51 | | 514 | | 5141 | | 5113 | | | | |
| DSX9 | 5 | 55 | | 551 | | 5514 | | 5541 | | | | |
| DSX10 | 4 | 45 | | 455 | | 4551 | | 4514 | | | | |

FIG. 22

| FRAME NO | FS(n) | FSn0 | FSn1 | FSn0 FSn1 | FSn0 FSn1 FSn2 | FSn3 | FSn0 FSn1 FSn2 FSn3 | FSn4 |
|---|---|---|---|---|---|---|---|---|
| | | | | | CLUSTER HEADS | | | |
| DSX11 | 3 | 3 | 34 | 345 | 3455 | | 3451 | |
| DSX12 | 4 | 4 | 43 | 434 | 4345 | | 4355 | |
| DSX13 | 6 | 6 | 64 | 643 | 6434 | | 6445 | |
| DSX14 | 6 | 6 | 66 | 664 | 6643 | | 6634 | |
| DSX15 | 3 | 3 | 36 | 366 | 3664 | | 3643 | |
| DSX16 | 5 | 5 | 53 | 536 | 5366 | | 5364 | |
| DSX17 | 3 | 3 | 35 | 353 | 3536 | | 3566 | |
| DSX18 | 2 | 2 | 23 | 235 | 2353 | | 2336 | |
| DSX19 | 2 | 2 | 22 | 223 | 2235 | | 2253 | |
| DSX20 | 5 | 5 | 52 | 522 | 5223 | | 5235 | |
| DSX21 | 6 | 6 | 65 | 652 | 6522 | | 6523 | |
| DSX22 | 5 | 5 | 56 | 565 | 5652 | | 5622 | |
| DSX23 | 1 | 1 | 15 | 156 | 1565 | | 1552 | |
| DSX24 | 1 | 1 | 11 | 115 | 1156 | | 1165 | |
| DSX25 | 6 | 6 | 61 | 611 | 6115 | | 6156 | |
| DSX26 | 2 | 2 | 26 | 261 | 2611 | | 2615 | |
| DSX27 | 6 | 6 | 62 | 626 | 6261 | | 6211 | |
| DSX28 | 4 | 4 | 46 | 462 | 4626 | | 4661 | |
| DSX29 | 4 | 4 | 44 | 446 | 4462 | | 4426 | |
| DSX30 | 2 | 2 | 24 | 244 | 2446 | | 2462 | |

FIG. 23

| FRAME NO | FS(n) | CLUSTER INTERMEDIACIES ||||||||
|---|---|---|---|---|---|---|---|---|
| | | FSn0 FSn1 | FSn0 FSn1 FSn2 | FSn0 FSn1 FSn2 FSn3 | FSn0 FSn1 FSn2 FSn3 FSn4 |
| DSX0 | 0 | 02 | 024 | 0244 | 0246 |
| DSX1 | 1 | 10 | 102 | 1024 | 1044 |
| DSX2 | 2 | 21 | 210 | 2102 | 2124 |
| DSX3 | 3 | 32 | 321 | 3210 | 3202 |
| DSX4 | 3 | 33 | 332 | 3321 | 3310 |
| DSX5 | 1 | 13 | 133 | 1332 | 1321 |
| DSX6 | 4 | 41 | 413 | 4133 | 4132 |
| DSX7 | 1 | 14 | 141 | 1413 | 1433 |
| DSX8 | 5 | 51 | 514 | 5141 | 5113 |
| DSX9 | 5 | 55 | 551 | 5514 | 5541 |
| DSX10 | 4 | 45 | 455 | 4551 | 4514 |

FIG. 24

| FRAME NO | FS (n) | CLUSTER INTERMEDIACIES ||||||||||
| | | FSn0 | FSn1 | FSn0 | FSn1 | FSn2 | FSn3 | FSn0 | FSn1 | FSn3 | FSn4 |
|---|---|---|---|---|---|---|---|---|---|---|---|
| DSX11 | 3 | 34 | | 345 | | | | | 3455 | 3451 | |
| DSX12 | 4 | 43 | | 434 | | | | | 4345 | 4355 | |
| DSX13 | 6 | 64 | | 643 | | | | | 6434 | 6445 | |
| DSX14 | 6 | 66 | | 664 | | | | | 6643 | 6634 | |
| DSX15 | 3 | 36 | | 366 | | | | | 3664 | 3643 | |
| DSX16 | 5 | 53 | | 536 | | | | | 5366 | 5364 | |
| DSX17 | 3 | 35 | | 353 | | | | | 3536 | 3566 | |
| DSX18 | 2 | 23 | | 235 | | | | | 2353 | 2336 | |
| DSX19 | 2 | 22 | | 223 | | | | | 2235 | 2253 | |
| DSX20 | 5 | 52 | | 522 | | | | | 5223 | 5235 | |
| DSX21 | 6 | 65 | | 652 | | | | | 6522 | 6523 | |
| DSX22 | 5 | 56 | | 565 | | | | | 5652 | 5622 | |
| DSX23 | 1 | 15 | | 156 | | | | | 1565 | 1552 | |
| DSX24 | 1 | 11 | | 115 | | | | | 1156 | 1165 | |
| DSX25 | 6 | 61 | | 611 | | | | | 6115 | 6156 | |
| DSX26 | 2 | 26 | | 261 | | | | | 2611 | 2615 | |
| DSX27 | 6 | 62 | | 626 | | | | | 6261 | 6211 | |
| DSX28 | 4 | 46 | | 462 | | | | | 4626 | 4661 | |
| DSX29 | 4 | 44 | | 446 | | | | | 4462 | 4426 | |
| DSX30 | 2 | 24 | | 244 | | | | | 2446 | 2462 | |

F I G. 2 5

| | | | |
|---|---|---|---|
| PREAMBLE SECTION | PrA0 | PREAMBLE FS AREA 0 | PREAMBLE DATA AREA 0 |
| | PrA1 | PREAMBLE FS AREA 1 | PREAMBLE DATA AREA 1 |
| | PrA2 | PREAMBLE FS AREA 2 | PREAMBLE DATA AREA 2 |
| | PrA3 | PREAMBLE FS AREA 3 | PREAMBLE DATA AREA 3 |
| | PrA4 | PREAMBLE FS AREA 4 | PREAMBLE DATA AREA 4 |
| | PrA5 | PREAMBLE FS AREA 5 | PREAMBLE DATA AREA 5 |
| | PrA6 | PREAMBLE FS AREA 6 | PREAMBLE DATA AREA 6 |
| | PrA7 | PREAMBLE FS AREA 7 | PREAMBLE DATA AREA 7 |
| | PrA8 | PREAMBLE FS AREA 8 | PREAMBLE DATA AREA 8 |
| | PrA9 | PREAMBLE FS AREA 9 | PREAMBLE DATA AREA 9 |
| DATA SECTOR 0 | DS0_0 | DATA SECTOR FS AREA 0_0 | USER DATA AREA 0_0 |
| | DS0_1 | DATA SECTOR FS AREA 0_1 | USER DATA AREA 0_1 |
| | DS0_2 | DATA SECTOR FS AREA 0_2 | USER DATA AREA 0_2 |
| | ... | ... | ... |
| | ... | ... | ... |
| | DS0_25 | DATA SECTOR FS AREA 0_25 | USER DATA AREA 0_25 |
| DATA SECTOR 1 | DS1_0 | DATA SECTOR FS AREA 1_0 | USER DATA AREA 1_0 |
| | DS1_1 | DATA SECTOR FS AREA 1_1 | USER DATA AREA 1_1 |
| | DS1_2 | DATA SECTOR FS AREA 1_2 | USER DATA AREA 1_2 |
| | ... | ... | ... |
| | ... | ... | ... |
| | DS1_25 | DATA SECTOR FS AREA 1_25 | USER DATA AREA 1_25 |
| DATA SECTOR 2 | DS2_0 | DATA SECTOR FS AREA 2_0 | USER DATA AREA 2_0 |
| | DS2_1 | DATA SECTOR FS AREA 2_1 | USER DATA AREA 2_1 |
| | DS2_2 | DATA SECTOR FS AREA 2_2 | USER DATA AREA 2_2 |
| | ... | ... | ... |
| | ... | ... | ... |
| | DS2_25 | DATA SECTOR FS AREA 2_25 | USER DATA AREA 2_25 |
| | | | USER DATA AREA 3_0 |
| | | | USER DATA AREA 3_1 |
| | DS14_24 | DATA SECTOR FS AREA 14_24 | |
| | DS14_25 | DATA SECTOR FS AREA 14_25 | USER DATA AREA 14_25 |
| DATA SECTOR 15 | DS15_0 | DATA SECTOR FS AREA 15_0 | USER DATA AREA 15_0 |
| | DS15_1 | DATA SECTOR FS AREA 15_1 | USER DATA AREA 15_1 |
| | DS15_2 | DATA SECTOR FS AREA 15_2 | USER DATA AREA 15_2 |
| | ... | ... | ... |
| | ... | ... | ... |
| | DS15_25 | DATA SECTOR FS AREA 15_25 | USER DATA AREA 15_25 |
| POSTAMBLE SECTION | PoA0 | POSTAMBLE FS AREA 0 | POSTAMBLE DATA AREA 0 |
| | PoA1 | POSTAMBLE FS AREA 1 | POSTAMBLE DATA AREA 1 |
| | PoA2 | POSTAMBLE FS AREA 2 | POSTAMBLE DATA AREA 2 |
| | PoA3 | POSTAMBLE FS AREA 3 | POSTAMBLE DATA AREA 3 |
| | PoA4 | POSTAMBLE FS AREA 4 | POSTAMBLE DATA AREA 4 |
| | PoA5 | POSTAMBLE FS AREA 5 | POSTAMBLE DATA AREA 5 |
| | | ← 24CHBITS → | ← 1110CHBITS → |

F I G. 2 6

| | | | |
|---|---|---|---|
| | DS0_0 | DATA SECTOR FS AREA 0_0 | USER DATA AREA 0_0 |
| | DS0_1 | DATA SECTOR FS AREA 0_1 | USER DATA AREA 0_1 |
| | DS0_2 | DATA SECTOR FS AREA 0_2 | USER DATA AREA 0_2 |
| | DS0_3 | DATA SECTOR FS AREA 0_3 | USER DATA AREA 0_3 |
| | DS0_4 | DATA SECTOR FS AREA 0_4 | USER DATA AREA 0_4 |
| | DS0_5 | DATA SECTOR FS AREA 0_5 | USER DATA AREA 0_5 |
| | DS0_6 | DATA SECTOR FS AREA 0_6 | USER DATA AREA 0_6 |
| | DS0_7 | DATA SECTOR FS AREA 0_7 | USER DATA AREA 0_7 |
| | DS0_8 | DATA SECTOR FS AREA 0_8 | USER DATA AREA 0_8 |
| | DS0_9 | DATA SECTOR FS AREA 0_9 | USER DATA AREA 0_9 |
| | DS0_10 | DATA SECTOR FS AREA 0_10 | USER DATA AREA 0_10 |
| | DS0_11 | DATA SECTOR FS AREA 0_11 | USER DATA AREA 0_11 |
| DATA SECTOR 0 | DS0_12 | DATA SECTOR FS AREA 0_12 | USER DATA AREA 0_12 |
| | DS0_13 | DATA SECTOR FS AREA 0_13 | USER DATA AREA 0_13 |
| | DS0_14 | DATA SECTOR FS AREA 0_14 | USER DATA AREA 0_14 |
| | DS0_15 | DATA SECTOR FS AREA 0_15 | USER DATA AREA 0_15 |
| | DS0_16 | DATA SECTOR FS AREA 0_16 | USER DATA AREA 0_16 |
| | DS0_17 | DATA SECTOR FS AREA 0_17 | USER DATA AREA 0_17 |
| | DS0_18 | DATA SECTOR FS AREA 0_18 | USER DATA AREA 0_18 |
| | DS0_19 | DATA SECTOR FS AREA 0_19 | USER DATA AREA 0_19 |
| | DS0_20 | DATA SECTOR FS AREA 0_20 | USER DATA AREA 0_20 |
| | DS0_21 | DATA SECTOR FS AREA 0_21 | USER DATA AREA 0_21 |
| | DS0_22 | DATA SECTOR FS AREA 0_22 | USER DATA AREA 0_22 |
| | DS0_23 | DATA SECTOR FS AREA 0_23 | USER DATA AREA 0_23 |
| | DS0_24 | DATA SECTOR FS AREA 0_24 | USER DATA AREA 0_24 |
| | DS0_25 | DATA SECTOR FS AREA 0_25 | USER DATA AREA 0_25 |

← 24CHBITS → ← 1110CHBITS →

FIG. 27A

| FRAME | FS PATTERN |
|---|---|
| PrA0 | FS6 |
| PrA1 | FS6 |
| PrA2 | FS6 |
| PrA3 | FS6 |
| PrA4 | FS2 |
| PrA5 | FS5 |
| PrA6 | FS6 |
| PrA7 | FS5 |
| PrA8 | FS1 |
| PrA9 | FS6 |

FIG. 27B

| FRAME | FS PATTERN |
|---|---|
| PoA0 | FS6 |
| PoA1 | FS6 |
| PoA2 | FS6 |
| PoA3 | FS6 |
| PoA4 | FS6 |
| PoA5 | FS6 |

FIG. 27C

| FRAME | FS PATTERN |
|---|---|
| DSX0 | FS0 |
| DSX1 | FS1 |
| DSX2 | FS2 |
| DSX3 | FS1 |
| DSX4 | FS3 |
| DSX5 | FS3 |
| DSX6 | FS1 |
| DSX7 | FS4 |
| DSX8 | FS2 |
| DSX9 | FS2 |
| DSX10 | FS4 |
| DSX11 | FS1 |
| DSX12 | FS1 |
| DSX13 | FS5 |
| DSX14 | FS4 |
| DSX15 | FS4 |
| DSX16 | FS3 |
| DSX17 | FS4 |
| DSX18 | FS5 |
| DSX19 | FS5 |
| DSX20 | FS3 |
| DSX21 | FS2 |
| DSX22 | FS3 |
| DSX23 | FS5 |
| DSX24 | FS2 |
| DSX25 | FS6 |

FIG. 28

| FRAME NO | FS(n) | FSn0 | FSn0 FSn1 | FSn0 FSn1 FSn2 | FSn0 FSn1 FSn2 FSn3 | FSn0 FSn1 FSn2 FSn3 FSn4 |
|---|---|---|---|---|---|---|
| PrA0 | 6 | | | | | |
| PrA1 | 6 | 66 | | | | |
| PrA2 | 6 | 66 | 666 | 6666 | | |
| PrA3 | 6 | 66 | 666 | 2666 | 2666 | |
| PrA4 | 2 | 26 | 266 | 5266 | 5266 | |
| PrA5 | 5 | 52 | 526 | 6526 | 6566 | |
| PrA6 | 6 | 65 | 652 | 5652 | 5626 | |
| PrA7 | 5 | 56 | 565 | 1565 | 1552 | |
| PrA8 | 1 | 15 | 156 | 6156 | 6165 | |
| PrA9 | 6 | 61 | 615 | 0615 | 0656 | |
| DSX0 | 0 | 06 | 061 | 1061 | 1015 | |
| DSX1 | 1 | 10 | 106 | 2106 | 2161 | |
| DSX2 | 2 | 21 | 210 | 1210 | 1206 | |
| DSX3 | 1 | 12 | 121 | 3121 | 3110 | |
| DSX4 | 3 | 31 | 312 | 3312 | 3321 | |
| DSX5 | 3 | 33 | 331 | 1331 | 1312 | |
| DSX6 | 1 | 13 | 133 | 4133 | 4131 | |
| DSX7 | 4 | 41 | 413 | 2413 | 2433 | |
| DSX8 | 2 | 24 | 241 | 2241 | 2213 | |
| DSX9 | 2 | 22 | 224 | 4224 | 4241 | |
| DSX10 | 4 | 42 | 422 | | | |

CLUSTER HEADS

FIG. 29

| FRAME NO | FS(n) | FSn0, FSn1 | FSn0, FSn1, FSn2 | FSn0, FSn1, FSn2, FSn3 | FSn0, FSn1, FSn2, FSn3, FSn4 |
|---|---|---|---|---|---|
| | | | | | CLUSTER HEADS |
| DSX11 | 1 | 14 | 142 | 1422 | 1424 |
| DSX12 | 1 | 11 | 114 | 1142 | 1122 |
| DSX13 | 5 | 51 | 511 | 5114 | 5142 |
| DSX14 | 4 | 45 | 451 | 4511 | 4514 |
| DSX15 | 4 | 44 | 445 | 4451 | 4411 |
| DSX16 | 3 | 34 | 344 | 3445 | 3451 |
| DSX17 | 4 | 43 | 434 | 4344 | 4345 |
| DSX18 | 5 | 54 | 543 | 5434 | 5444 |
| DSX19 | 5 | 55 | 554 | 5543 | 5534 |
| DSX20 | 3 | 35 | 355 | 3554 | 3543 |
| DSX21 | 2 | 23 | 235 | 2355 | 2354 |
| DSX22 | 3 | 32 | 323 | 3235 | 3255 |
| DSX23 | 5 | 53 | 532 | 5323 | 5335 |
| DSX24 | 2 | 25 | 253 | 2532 | 2523 |
| DSX25 | 6 | 62 | 625 | 6253 | 6232 |

FIG. 30

| FRAME NO | FS (n) | FSn0 FSn1 | FSn0 FSn1 FSn2 | CLUSTER INTERMEDIACIES FSn0 FSn1 FSn2 FSn3 | FSn0 FSn1 FSn3 FSn4 |
|---|---|---|---|---|---|
| DSX0 | 0 | 06 | 062 | 0625 | 0653 |
| DSX1 | 1 | 10 | 106 | 1062 | 1025 |
| DSX2 | 2 | 21 | 210 | 2106 | 2162 |
| DSX3 | 1 | 12 | 121 | 1210 | 1206 |
| DSX4 | 3 | 31 | 312 | 3121 | 3110 |
| DSX5 | 3 | 33 | 331 | 3312 | 3321 |
| DSX6 | 1 | 13 | 133 | 1331 | 1312 |
| DSX7 | 4 | 41 | 413 | 4133 | 4131 |
| DSX8 | 2 | 24 | 241 | 2413 | 2433 |
| DSX9 | 2 | 22 | 224 | 2241 | 2213 |
| DSX10 | 4 | 42 | 422 | 4224 | 4241 |

FIG. 31

| FRAME NO | FS (n) | FSn0 | FSn1 | FSn0 FSn1 FSn2 | | | CLUSTER INTERMEDIACIES FSn0 FSn1 FSn2 FSn3 | | | | FSn0 FSn1 FSn3 FSn4 | | | |
|---|---|---|---|---|---|---|---|---|---|---|---|---|---|---|
| DSX11 | 1 | 14 | | | | | | | | | 1422 | | 1424 | |
| DSX12 | 1 | 11 | | | | | | | | | 1142 | | 1122 | |
| DSX13 | 5 | 51 | | | | | | | | | 5114 | | 5142 | |
| DSX14 | 4 | 45 | | | | | | | | | 4511 | | 4514 | |
| DSX15 | 4 | 44 | | | | | | | | | 4451 | | 4411 | |
| DSX16 | 3 | 34 | | | | | | | | | 3445 | | 3451 | |
| DSX17 | 4 | 43 | | | | | | | | | 4344 | | 4345 | |
| DSX18 | 5 | 54 | | | | | | | | | 5434 | | 5444 | |
| DSX19 | 5 | 55 | | | | | | | | | 5543 | | 5534 | |
| DSX20 | 3 | 35 | | | | | | | | | 3554 | | 3543 | |
| DSX21 | 2 | 23 | | | | | | | | | 2355 | | 2354 | |
| DSX22 | 3 | 32 | | | | | | | | | 3235 | | 3255 | |
| DSX23 | 5 | 53 | | | | | | | | | 5323 | | 5335 | |
| DSX24 | 2 | 25 | | | | | | | | | 2532 | | 2523 | |
| DSX25 | 6 | 62 | | | | | | | | | 6253 | | 6232 | |

FIG. 32

| SYNC NO | SYNC BODY | | SYNC ID |
|---|---|---|---|
| FS0 | 1' b* | 23' h280402 | 6' h01 |
| FS1 | 1' b* | 23' h280402 | 6' h12 |
| FS2 | 1' b* | 23' h280402 | 6' h28 |
| FS3 | 1' b* | 23' h280402 | 6' h21 |
| FS4 | 1' b* | 23' h280402 | 6' h04 |
| FS5 | 1' b* | 23' h280402 | 6' h09 |
| FS6 | 1' b* | 23' h280402 | 6' h10 |

FIG. 33

| FRAME | FS PATTERN |
|---|---|
| DSX0 | FS0 |
| DSX1 | FS1 |
| DSX2 | FS2 |
| DSX3 | FS3 |
| DSX4 | FS3 |
| DSX5 | FS1 |
| DSX6 | FS4 |
| DSX7 | FS1 |
| DSX8 | FS5 |
| DSX9 | FS5 |
| DSX10 | FS4 |
| DSX11 | FS3 |
| DSX12 | FS4 |
| DSX13 | FS6 |
| DSX14 | FS6 |
| DSX15 | FS3 |
| DSX16 | FS5 |
| DSX17 | FS3 |
| DSX18 | FS2 |
| DSX19 | FS2 |
| DSX20 | FS5 |
| DSX21 | FS6 |
| DSX22 | FS5 |
| DSX23 | FS1 |
| DSX24 | FS1 |
| DSX25 | FS6 |
| DSX26 | FS2 |
| DSX27 | FS6 |
| DSX28 | FS4 |
| DSX29 | FS4 |
| DSX30 | FS2 |

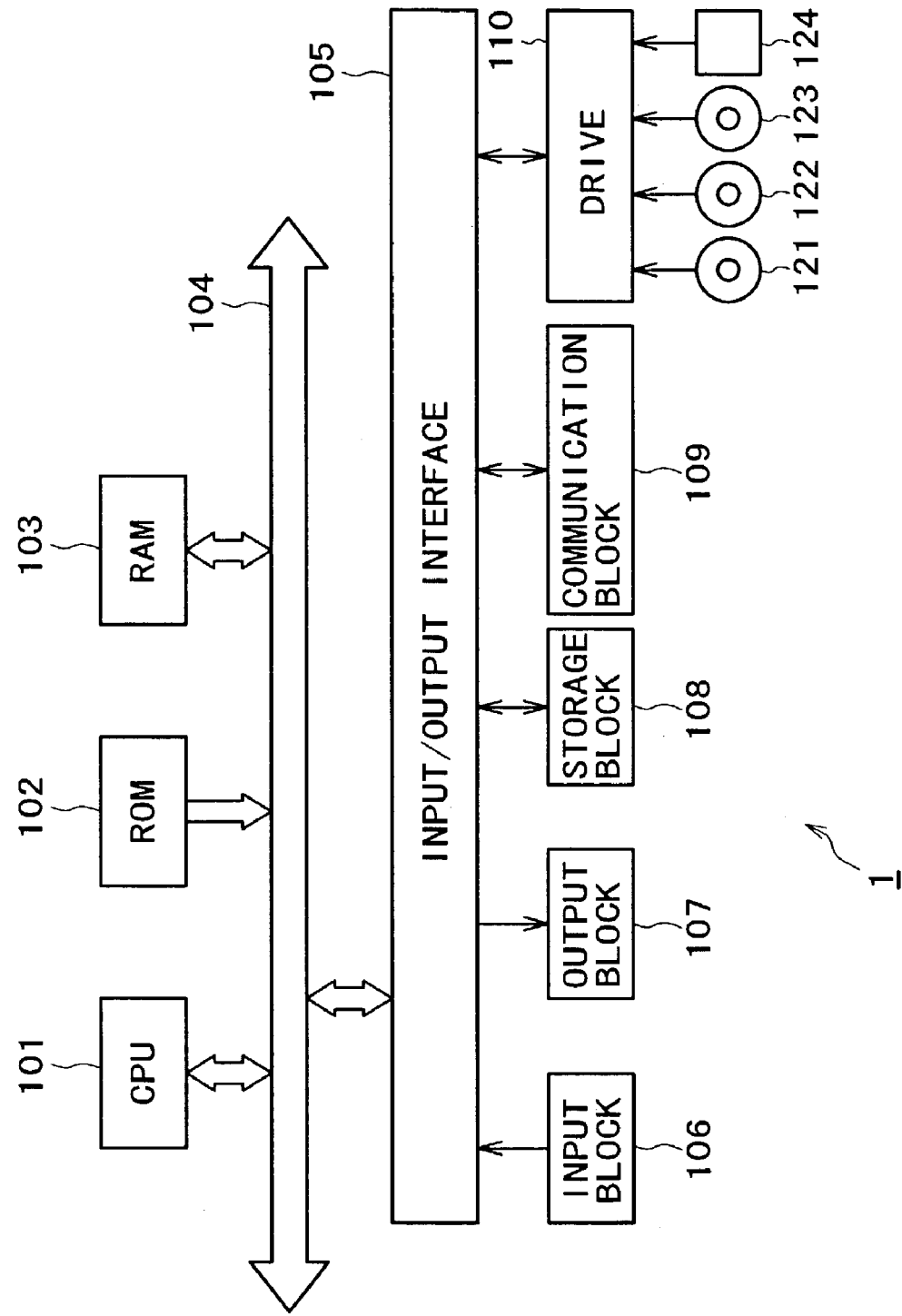

US 7,120,105 B2

RECORDING MEDIUM, REPRODUCING APPARATUS, AND RECORDING APPARATUS

BACKGROUND OF THE INVENTION

The present invention relates generally to a recording medium on which data are recorded and reproduced in a predetermined signal format, a reproducing apparatus for reproducing the data recorded to the above-mentioned recording medium, and a recording apparatus for recording data to the above-mentioned recording medium in the predetermined signal format.

In conventional optical disk apparatuses, synchronous patterns are inserted in continuous data and, with reference to these synchronous patterns, the loss of synchronization of clock is corrected to properly reproduce the data. Further, with conventional optical disk apparatuses, plural types of synchronous patterns smaller in number than the number of frames forming one sector are used in combination, thereby effectively evading the increase in the redundancy caused by the synchronous patterns and, at the same time, allowing the identification of each frame on the basis of a result of the reproduction of these synchronous patterns.

However, the above-mentioned optical disk apparatuses present a problem that, as the speed of reading data from an optical disk increases, a synchronous pattern detection error occurs.

SUMMARY OF THE INVENTION

It is therefore an object of the present invention to provide a recording medium in which a synchronous pattern is attached to each of divided data having a predetermined length to form a frame, a data part is constituted by the predetermined number of the frames, a preamble part having a plurality of synchronous patterns is attached to a start portion of the data part and a postamble part having a plurality of synchronous patterns is attached to an end portion of the data part to form a cluster, and information is recorded to the recording medium in units of the cluster; wherein at least one of the plurality of synchronous patterns attached to the preamble part and the postamble part is different from those attached to the data part.

It is another object of the present invention to provide a recording medium reproducing apparatus for reproducing a recording medium in which a synchronous pattern is attached to each of divided data having a predetermined length to form a frame, a data part is constituted by the predetermined number of the frames, a preamble part having a plurality of synchronous patterns is attached to a start portion of the data part and a postamble part having a plurality of synchronous patterns is attached to an end portion of the data part to form a cluster, and information is recorded to the recording medium in units of the cluster, the recording medium reproducing apparatus including: synchronous pattern detecting means for detecting each of the plurality of synchronous pattern; and reproducing position identifying means for identifying, from a combination of at least two of the plurality of synchronous patterns detected by the synchronous pattern detecting means, the frame of one of the preamble part and the data part.

It is still another object of the present invention to provide a recording medium recording apparatus for recording information including a data part, a preamble part, and a postamble part to a recording medium, including: synchronous pattern attaching means for attaching synchronous patterns in a predetermined sequence to each of frames constituting the data part and attaching the synchronous patterns to the preamble part and the postamble part each being configured on a frame basis such that the data part includes at least one synchronous pattern that is different from the synchronous patterns to be attached to each of the frames; and recording means for recording, to the recording medium, information attached with the preamble part and the postamble part by the synchronous pattern attaching means.

As described and according to the recording medium of the present invention, at least one synchronous pattern not attached to the data part is attached to the amble part, so that the amble part and the data part may easily be distinguished from each other.

As described and according to the recording medium reproducing apparatus and method of the present invention, synchronous patterns are detected from the recording medium and a combination of at least two synchronous patterns is used to identify the amble part or the data part and, if the data part is identified, identify which of the frames thereof, so that the amble part and the data part may easily be distinguished from each other.

As described and according to the recording medium recording apparatus and method of the present invention, synchronous patterns not attached to the data part are attached to each frame of the amble part, so that the amble part and the data part may easily be distinguished from each other.

As described and according to the recording medium of the present invention, the frame sync channel bit patterns in the data area and the frame sync arrangements are shared with the DVR, so that the processing of the data part may be executed by the modulator/demodulator of the DVR. In addition, the recording medium of the present invention allows the sharing of the frame synchronous circuit portion with MD-Data2 only by changing the parameters in the different portion of the frame synchronous circuit practiced in MD-Data2 which is a format similar to the format of the present invention.

BRIEF DESCRIPTION OF THE DRAWINGS

These and other objects of the invention will be seen by reference to the description, taken in connection with the accompanying drawing, in which:

FIG. 3 is a diagram illustrating an exemplary data format of data recorded on a magneto-optical disk;

FIG. 4 is a diagram illustrating a format of the data for one data sector shown in FIG. 3;

FIGS. 5A, 5B, and 5C are diagrams illustrating exemplary sequences of synchronous patterns;

FIG. 6 is a diagram illustrating an exemplary structure of synchronous patterns;

FIG. 7 is a diagram illustrating another exemplary structure of synchronous patterns;

FIG. 8 is a diagram illustrating still another exemplary structure of synchronous patterns;

FIG. 21 is a diagram illustrating exemplary data for use in frame number determination;

FIG. 22 is a diagram illustrating the data continued from FIG. 21 for use by frame number determination;

FIG. 23 is a diagram illustrating exemplary data for use in frame number determination;

FIG. 24 is a diagram illustrating the data continued from FIG. 23 for use by frame number determination;

FIG. 25 is a diagram illustrating an exemplary format of data which can be reproduced on a magneto-optical disk;

FIG. 26 is a diagram illustrating a format of the data for one data sector shown in FIG. 12;

FIGS. 27A, 27B, and 27C are diagrams illustrating an exemplary sequence of synchronous patterns in the data shown in FIG. 12;

FIG. 28 is a diagram illustrating exemplary data for use in frame number determination;

FIG. 29 is a diagram illustrating the exemplary data continued from FIG. 28 for use in frame number determination;

FIG. 30 is a diagram illustrating exemplary data for use in frame number determination;

FIG. 31 is a diagram illustrating the exemplary data continued from FIG. 30 for use in frame number determination;

FIG. 32 is a diagram illustrating a synchronous pattern structure in DVR format;

FIG. 33 is a diagram illustrating a synchronous pattern sequence in DVR format; and FIG. 34 is a block diagram illustrating an exemplary configuration of another optical disk apparatus to which the present invention is applied.

DETAILED DESCRIPTION OF THE PREFERRED EMBODIMENTS

Figure 1:
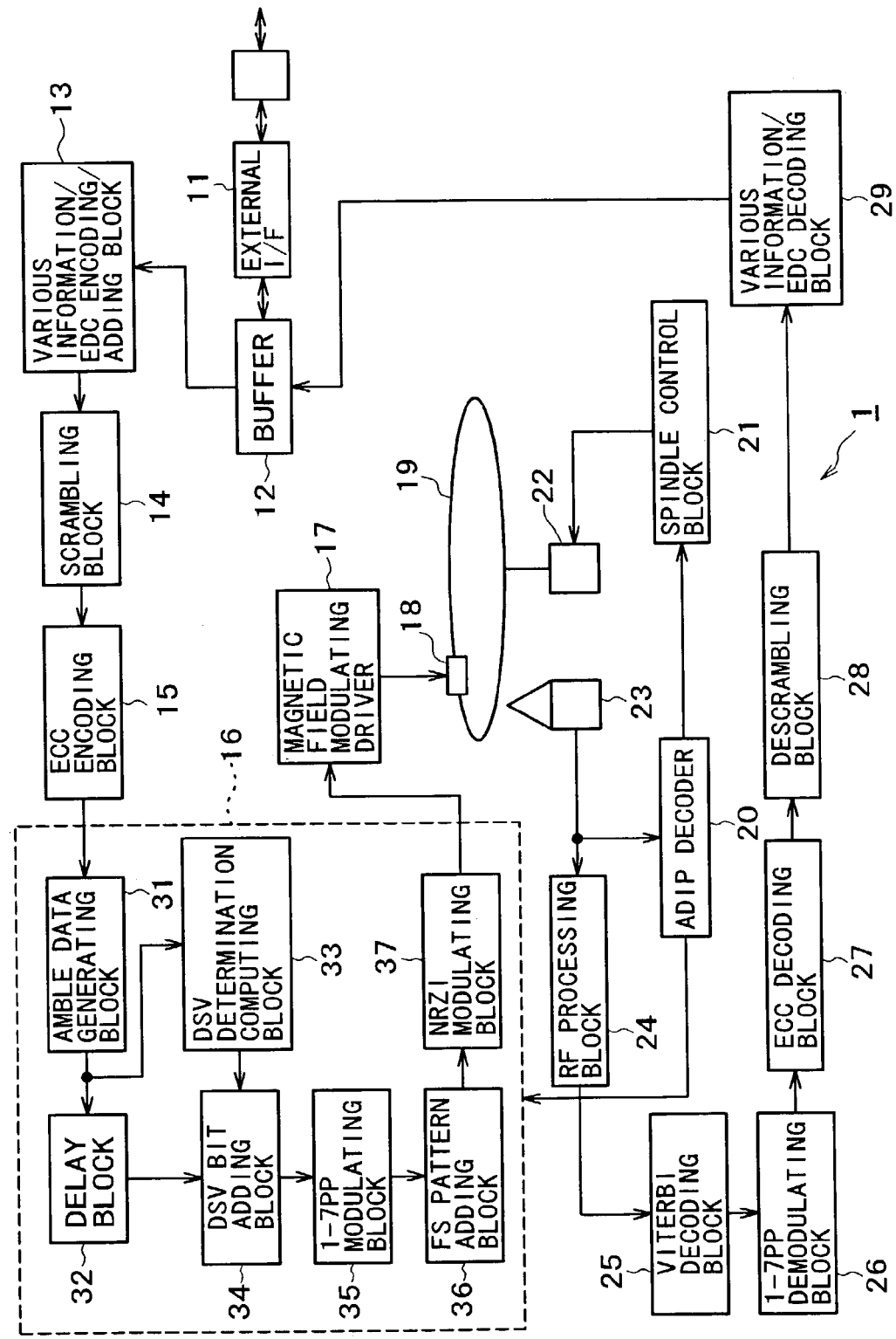
FIG. 1 is a block diagram illustrating an exemplary configuration of an optical disk apparatus to which the present invention is applied.

This invention will be described in further detail by way of example with reference to the accompanying drawings. Now, with reference to FIG. 1, there is shown a block diagram illustrating an exemplary configuration of an optical disk apparatus 1 practiced as one embodiment of the invention. As shown in FIG. 1, a buffer 12 temporarily stores the data entered through an external interface 11 and appropriately supplies this information to a various information/EDC (Error Detection Code) encoding/adding block 13. In addition, the buffer 12 temporarily stores the data supplied from a various information EDC decoding block 29 and appropriately supplies the stored data to other circuits and devices, not shown, via the external interface 11.

The various information/EDC encoding/adding block 13 adds various information to the data supplied from the buffer 12 and, at the same time, adds EDC for error correction and outputs the resultant data. A scrambling block 14 scrambles the data outputted from the various information/EDC encoding/adding block 13.

An ECC (Error Correction Code) encoding block 15 adds ECC for error correction to the data outputted from the scrambling block 14. A modulating block 16 performs predetermined modulation on the data outputted from the ECC encoding block 15 on the basis of a cluster synchronous signal supplied from an ADIP decoder 20 and then adds a synchronous pattern to the modulated data, supplying the resultant data to a magnetic field modulating driver 17.

To be more specific, an amble data generating block 31 in the modulating block 16 generates preamble and postamble data, attaches the generated preamble and postamble data to the data outputted from the ECC encoding block 15, and supplies the resultant data to a delay block 32 and a DSV determination computing block 33. It should be noted that preamble and postamble will hereafter be generically referred to as amble unless they need not be distinguished from each other.

The DSV (Digital Sum Value) determination computing block 33 computationally determines the DSV bit to be added to the data outputted from the amble data generating block 31. The delay block 32 temporarily holds the data supplied from the amble data generating block 31 and supplies the data to a DSV bit adding block 34 in a predetermined timed relation. The DSV bit adding block 34 adds the DSV bit determined by the DSV determination computing block 33 to the data supplied from the delay block 32 in a predetermined timed relation and supplies the resultant data to a 1–7 pp (parity preserve) modulating block 35.

The 1–7 pp modulating block 35 performs predetermined modulation on the data supplied from the DSV bit adding block 34 and supplies the modulated data to an FS (Frame Sync) pattern adding block 36.

The FS pattern adding block 36 adds an FS pattern, which is a synchronous signal for each frame, to the data supplied from the 1–7 pp modulating block 35 and supplies the resultant data to an NRZI (Non Return to Zero Inverted) modulating block 37.

The NRZI modulating block 37 modulates the data supplied from the FS pattern adding block 36 in an NRZI manner with "1" inverted and "0" not inverted, and supplies the modulated data to the magnetic field modulating driver 17.

The magnetic field modulating driver 17 drives a magnetic field coil 18 in accordance with the data supplied from the NRZI modulating block 37 of the modulating block 16 to apply a magnetic field to an area of recording on a magneto-optical disk 19.

An optical pickup 23 radiates a laser beam for recording or reproduction onto the magneto-optical disk 19 and photoelectrically converts the laser beam for reproduction reflected from the magneto-optical disk 19 into an electrical signal and supplies the signal to the ADIP decoder 20 and an RF processing block 24.

The ADIP decoder 20 generates a modulation center frequency and a cluster synchronous signal on the basis of an address in pre-groove (ADIP) signal included in the electrical signal supplied from the optical pickup 23 with information recorded by frequency modulation in a pre-groove of the magneto-optical disk 19. The cluster synchronous signal is supplied to the modulating block 16 and the modulation center frequency is supplied to a spindle control block 21. The spindle control block 21 controls a spindle motor 22 on the basis of the modulation center frequency supplied from the ADIP decoder 20. The spindle motor 22 rotates the magneto-optical disk 19 as controlled by the spindle control block 21.

The RF processing block 24 generates and output a reproduction RF signal on the basis of the electrical signal supplied from the optical pickup 23.

A Viterbi decoding block 25 decodes the reproduction RF signal from the RF processing block 24 in a Viterbi manner to generate binary data and supplies the generated binary data to a 1–7 pp demodulating block 26.

The 1–7 pp demodulating block 26 performs predetermined demodulation processing on the binary data supplied from the Viterbi decoding block 25 and outputs the obtained data to an ECC decoding block 27.

The ECC decoding block 27 performs predetermined error correction processing on the data supplied from the 1–7 pp demodulating block 26 and supplies the corrected data to a descrambling block 28.

The descrambling block 28 descrambles the data supplied from the ECC decoding block 27 and outputs the descrambled data to the various information/EDC decoding block 29.

The various information/EDC decoding block 29 extracts various information and the EDC from the data outputted from the descrambling block 28 and determines whether or not the reproduced data include an error. Then, the various information/EDC decoding block 29 supplies the data to the buffer 12.

Figure 2:
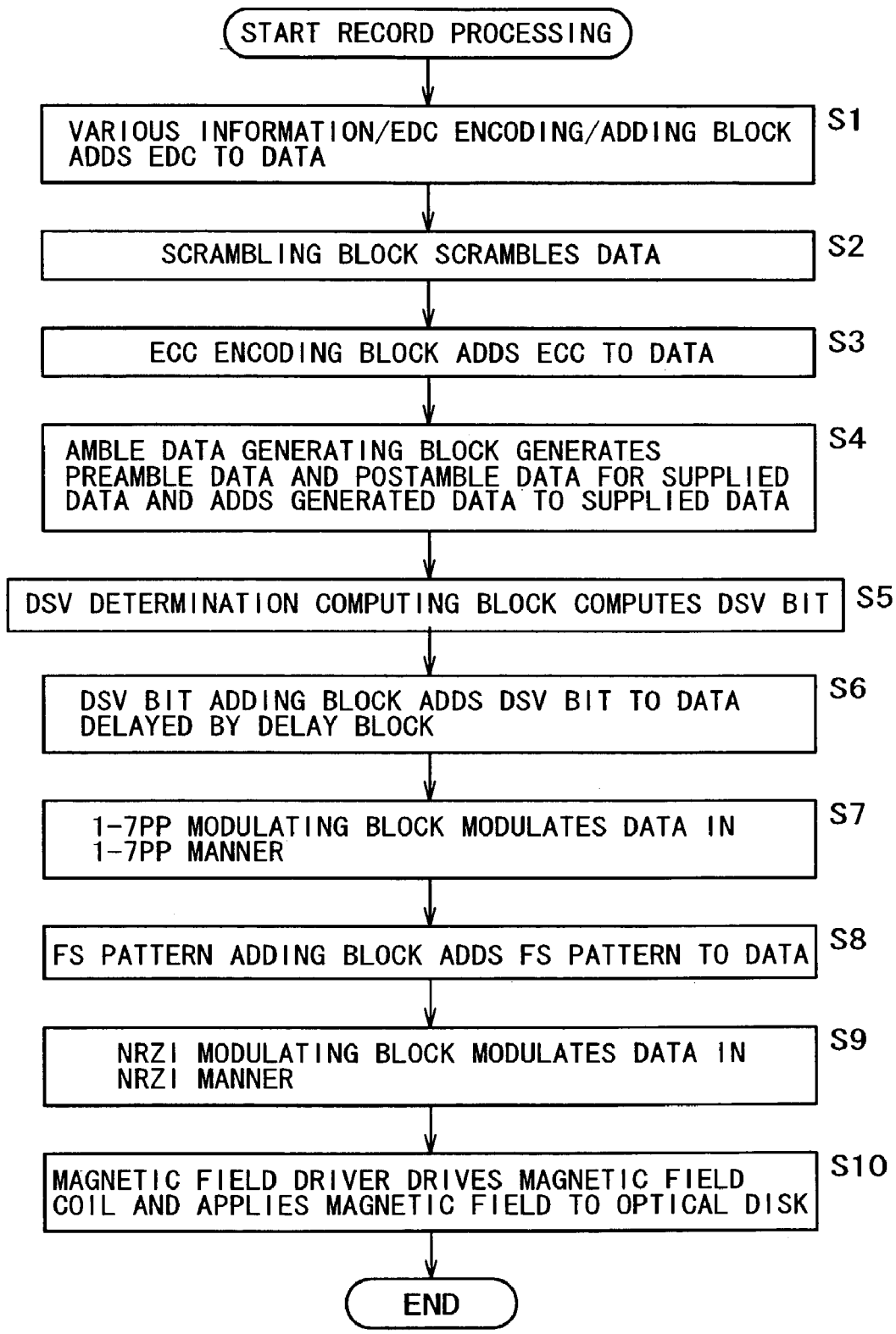
FIG. 2 is a flowchart describing the processing of recoding data to a magneto-optical disk loaded on the optical disk apparatus of FIG. 1.

The following describes the processing of recording data on the optical disk apparatus 1 with reference to the flowchart shown in FIG. 2.

The data entered via the external interface 11 are temporarily stored in the buffer 12 and then outputted to the various information/EDC encoding/adding block 13. In step S1, the various information/EDC encoding/adding block 13 adds EDC for error detection and other appropriate information to the data outputted from the buffer 12 and supplies the resultant data to the scrambling block 14.

In step S2, the scrambling block 14 scrambles the data to be recorded to the magneto-optical disk 19 and outputs the scrambled data to the ECC encoding block 15.

In step S3, the ECC encoding block 15 adds ECC to the data supplied from the scrambling block 14. The user data, which are the data added with ECC by the ECC encoding block 15, are supplied to the amble data generating block 31 in the modulating block 16.

In step S4, the amble data generating block 31 generates preamble and postamble data and adds the generated preamble and postamble data to the data supplied from the ECC encoding block 15. Then, the data added with the amble data are supplied to the delay block 32 and the DSV determination computing block 33.

In step 5, the DSV determination computing block 33 computationally determines the DSV bit to be added to the data outputted from the amble data generating block 31.

The following describes the DSV bit. In recording to the magneto-optical disk 19 or in data transmission thereto, encoding modulation suitable for the transmission is performed. If a direct-current component is included in the modulation coding, various error signals such as a tracking error in the servo control of the optical disk apparatus 1 may easily fluctuate or jitters may easily occur, for example. Therefore, the direct-current component may preferably be included as little as possible. For this purpose, control of DSV is proposed. DSV denotes a sum obtained by level-encoding a code sequence which is a channel bit sequence by performing NRZI processing and adding the codes with "1" as +1 and "0" as −1 in a bit sequence which is the symbol of the data. DSV provides a guideline for the direct-current component of each code sequence. As the absolute value of DSV is lowered, namely, when DSV control is performed, the direct-current component of each code sequence is suppressed. DSV control is performed by performing DSV computation at predetermined channel bit sequence intervals and inserting a predetermined DSV control bit into each code sequence.

Returning to FIG. 2, in step S6, the DSV bit adding block 34 inserts the DSV bit determined by the DSV determination computing block 33 into the data added with the amble data supplied from the delay block 32 in a predetermined timed relation and supplies the resultant data to the 1–7 pp modulating block 35.

In step S7, the 1–7 pp modulating block 35 performs predetermined 1–7 pp modulation processing on the data supplied from the DSV bit adding block 34 and supplies the modulated data to the FS (Frame Synch) pattern adding block 36. It should be noted that the 1–7 pp modulation processing converts a data word into a code word in accordance with a predetermined coding rule in order to efficiently perform DSV control.

In step S8, the FS pattern adding block 36 adds an FS pattern, which is a synchronous signal, to the data supplied from the 1–7 pp modulating block 35 and supplies the resultant data to the NRZI (Non Return to Zero Inverted) modulating block 37.

In step S9, the NRZI modulating block 37 NRZI-modulates the data supplied from the FS pattern adding block 36 and supplies the modulated data to the magnetic field modulating driver 17.

In step S10, the magnetic field modulating driver 17 drives the magnetic field coil 18 to apply a magnetic field to the area of recording on the magneto-optical disk 19.

The data entered through the external interface 11 are recorded to the magneto-optical disk 19 as described above.

Referring to FIG. 3, there is shown an exemplary format of the data to be recorded to the magneto-optical disk 19 as described above. In FIG. 3, the data for one cluster, which is the minimum rewrite unit, is shown. On the magneto-optical disk 19, a plurality of clusters shown in FIG. 3 are recorded in a predetermined arrangement. As shown outside the left column of FIG. 3, each cluster is configured by a preamble part attached to the head, 16 data sectors composed of data sector 0 through data sector 15, which are referred to as a data part, and a postamble part attached to the end.

In FIG. 3, each of the lines from top to bottom corresponds to a frame, which is the minimum unit of divided data. Namely, the preamble part shown outside the left column and at top is configured by 10 frames 1 through 10.

The 16 data sectors, 0 through 15, shown outside the left column and below the preamble part are each configured by 31 frames.

The postamble part shown outside the left column and below the data part in FIG. 3 is configured by 6 frames, frame 6 through frame 1 from bottom.

PrA0 through PrA9 shown on line 1 through line 10 from top row in the leftmost column in FIG. 3 are numbers called frame numbers in the order of recording obtained by assigning frame numbers to the 10 frames forming the preamble part for the convenience of description. Therefore, these numbers are not actually recorded to the magneto-optical disk 19.

Likewise, DS0_0 through DS2_30 shown on line 11 through line 28 from above in the leftmost column in FIG. 3 and DS14_29 through DS15_30 shown on line 14 through line 7 from below are numbers obtained by assigning numbers to 31 frames of each data sector in the order of recording for the convenience of description. Therefore, these numbers are not actually recorded to the magneto-optical disk 19.

Namely, "x" of "DSx_y" denotes the sequence obtained by counting data sectors from above on a data sector basis and "y" denotes the sequence obtained by counting frames from above in a data sector.

Likewise, PoA0 through PoA5 shown on line 6 through line 1 from below in the leftmost column in FIG. 3 are frame numbers obtained by assigning numbers to the 6 frames forming the postamble part in the order of recording for the convenience of description. Therefore, these numbers are not actually recorded on the magneto-optical disk 19.

The portion to be recorded to the magneto-optical disk 19 is the 2 columns on the right side in FIG. 3. Namely, in the second column from the right side of FIG. 3, frame sync (FS) areas (FS areas), which are synchronous patterns attached to the user data in step S8 of FIG. 2 are shown. In the rightmost column of FIG. 3, preamble data areas or user data recording areas are shown. As shown at the bottom of FIG. 3, each frame sync is formed by 30 channel bits. Each amble data and each user data are configured by 1902 channel bits each.

As shown in line 1 through line 10 from top in FIG. 3, the preamble part is configured by preamble data areas 0 through 9 and preamble FS areas 0 through 9 corresponding to preamble data areas 0 through 9.

As shown in line 6 through line 1 from bottom of FIG. 3, the postamble part is configured by postamble data areas 0 through 5 and postamble FS areas 0 through 5 corresponding to postamble data areas 0 through 5.

FIG. 4 shows data sector 0 extracted from line 11 through line 16 in FIG. 3. In FIG. 4, data sector 0 is configured by 31 frames, DS0_0 through DS0_30 and each frame is configured by user data areas 0_0 through 0_30 and data sector FS areas 0_0 through 0_30 corresponding to user data areas 0_0 through 0_30. As shown at the bottom of FIG. 4, the data sector FS area in each frame is configured by 30 channel bits and the user data area is configured by 1902 channel bits. Data sector 0 is configured as described above.

Returning to FIG. 3, the internal configuration of each of data sectors 1 through 15 is the same as that of data sector 0.

The following describes frame sync patterns called FS patterns to be recorded in each FS area with reference to FIGS. 5A, 5B, and 5C.

In one embodiment of the present invention, 7 different synchronous patterns FS0 through FS7 are employed as FS patterns by way of example. At the time of reproducing the magneto-optical disk 19, the optical disk apparatus 1 can identify, on the basis of the arrangement sequence of these synchronous patterns, whether the current point of reproduction on the magneto-optical disk 19 is the preamble part, the postamble part, the data part, and can identify which frame in which data sector is being reproduced.

FIG. 5A shows the frame patterns of the preamble part. In FIG. 5A, the frames, PrA0 through PrA9, in the left-side column correspond to PrA0 through PrA9 in the preamble part of FIG. 3. The FS patterns shown in the right-side column of FIG. 5A are recorded to the preamble FS areas 0 through 9 shown in FIG. 3.

As shown in FIG. 5A, in the preamble part, FS7 is recorded to frame PrA0, FS7 to frame PrA1, FS7 to frame PrA2, FS7 to frame PrA3, FS7 to frame PrA4, FS1 to frame PrA5, FS4 to frame PrA6, FS7 to frame PrA7, FS4 to frame PrA8 , the FS2 to frame PrA9.

The frame syncs shown in FIG. 5A are arranged in accordance with the rules shown below.

To be more specific, let nth frame of frames PrA0 through PrA9 in the preamble part be PrA(n), then the frame syncs are arranged so that at least three of the following four items are satisfied, provided that arrangement "FS7—FS7" be excluded.

1. The arrangement of FS pattern of PrA(n-1) and FS pattern of PrA(n) does not occur at two or more positions for n=0 through 9.

2. The arrangement of FS pattern of PrA(n-2) and FS pattern of PrA(n) does not occur at two or more positions for n=0 through 9.

3. The arrangement of FS pattern of PrA(n-3) and FS pattern of PrA(n) does not occur at two or more positions for n=0 through 9.

4. The arrangement of FS pattern of PrA(n-4) and FS pattern of PrA(n) does not occur at two or more positions for n=0 through 9.

In the preamble part, the frame syncs are arranged in the preamble FS area of each frame in accordance with the above-mentioned rules.

FIG. 5B shows the FS patterns in the postamble part. In FIG. 5B, frames PoA0 through PoA5 in the left-side column correspond to PoA0 through PoA5 in the postamble part shown in FIG. 3. The FS patterns shown in the right-side column of FIG. 5B are recorded to postamble FS areas 0 through 5 shown in FIG. 3.

As shown in FIG. 5B, in the postamble part, FS7 is recorded to each of frames PoA0 through PoA5.

FIG. 5C shows the FS patterns of frame syncs to be recorded to 31 frames DSX0 through DSX30 in each of data sectors 0 through 15 shown in FIG. 3. In FIG. 5C, frames DSX0 through DSX30 in the left-side column correspond to 31 frames in each of data sectors 0 through 15 shown in FIG. 3, DS0_0 through DS0_30 in data sector 0 for example. The FS patterns shown in the right-side column of FIG. 5C are recorded to 31 data sector FS areas in each of data sectors 0 through 15 in FIG. 3, data sector FS areas 0_0 through 0_30 in data sector 0 for example.

Namely, as shown in FIG. 5C, FS0 is recorded to frame DSX0, FS1 is recorded to DSX1, and FS2 is recorded to DSX2, and so on up to DSX30.

It should be noted that, in FIG. 5C, FS patterns FS0 through FS7 are arranged in accordance with the following rules. The rules described below are applied to all of frames DSX0 through DSX30 in the data sector shown in FIG. 5C.

To be more specific, let nth frame of frames DSX0 through DSX30 in the data sector shown in FIG. 5C be DSX(n), then the frame syncs are arranged so that at least three of the following four items are satisfied.

1. The arrangement of FS pattern of DSX(n-1) and FS FS pattern of DSX(n) does not occur at two or more positions for n=0 through 30.

2. The arrangement of FS pattern of DSX(n-2) and FS pattern of DSX(n) does not occur at two or more positions for n=0 through 30.

3. The arrangement of FS pattern of DSX(n-3) and FS pattern of DSX(n) does not occur at two or more positions for n=0 through 30.

4. The arrangement of FS pattern of DSX(n-4) and FS pattern of DSX(n) does not occur at two or more positions for n=0 through 30.

In the case of extension over the preamble part and the data sector part, the frame syncs are arranged so that the above-mentioned rules are satisfied for each of DSX(n) and corresponding PrA(m), PrA(m-1), PrA(m-2), and PrA(m-3).

The frame syncs are also arranged so that FS pattern FS0 is not used outside DSX0. Further, in the data sector, the frame sync of FS pattern FS7 is not used.

In accordance with the above-mentioned rules, the frame syncs are recorded to the data sector FS area in each frame of the data sector.

As described, by not using FS7 in the data sector and by using FS7 only in the amble parts, the optical disk apparatus 1 can easily identify, at the time of reproducing the magneto-optical disk 19, the amble parts and the data sectors which form the data part.

Without using FS7 for all FS patterns of the frame syncs in the preamble part by including other FS patterns, namely FS pattern FS1 of frame PrA5, FS pattern FS4 of frame PrA6, FS pattern FS4 of frame PrA8 , and FS pattern FS2 of frame PrA9 shown in FIG. 5A, the optical disk apparatus 1 can easily identify, at the time of reproducing the magneto-optical disk 19, the position of reproduction in the preamble part.

The following describes the data structure of the frame syncs of FS patterns FS0 through FS7 with reference to FIG. 6.

The table of FIG. 6 lists the frame sync structures of FS patterns FS0 through FS7. "Sync No" in the left-side column of FIG. 6 shows FS patterns FS0 through FS7 and the right-side two columns of FIG. 6 show the frame sync structures for the FS patterns. To be more specific, "Sync body" in the center column is divided into two columns; "1'b*" is shown in the left-side column in "Sync body" and "23'h280402" is shown in the right-side column.

In this structure, "1'b*" is configured by 1 bit; namely, "1" is recorded if 1–7 pp modulation terminate processing has been performed at the end of a preceding frame and "0" is recorded if the terminate processing has not been performed at the end of a preceding frame. "23'h280402" is configured by 23 bits; in hexadecimal notation, a binary number representing "280402" is recorded.

The right-side column "Sync ID" of the table shown in FIG. 6 is configured by 6 bits on the side of data area; on the 2 digits from the right side of each line, the data to be recorded are represented in hexadecimal notation.

To be more specific, in FIG. 6, FS0 is configured by "1'b*", "23'h280402" and "6'h01" in this order. The binary equivalent of this is as follows:
01 010 000 000 010 000 000 010 000 001

It should be noted that # is "1" if the terminate processing has been performed at the end of a preceding frame and "0" if the terminate processing has not been performed.

In the above-mentioned binary notation, "#" at the left corresponds to "1'b". The second position through the 24th position "01 010 000 000 010 000 000 010" from the left correspond to "23'h280402". The 25th position to the 30th position "000 001" from the left correspond to "6'h01".

In FIG. 6, FS1 is configured by "1'b*", "23'h280402" and "6'h12" in this order. The binary equivalent of "6'h12" is as follows:
010 010

It should be noted that the notations of "1'b*" and "23'h280402" are the same of that of FS0 and therefore their descriptions will be skipped.

Likewise, in FIG. 6, FS2 is configured by "1'b*", "23'h280402" and "6'h28" in this order. The binary representation of "6'h28" is as follows:
101 000

In FIG. 6, FS3 is configured by "1'b*", "23'h280402" and "6'h21" in this order. The binary representation of "6'h21" is as follows:
100 001

In FIG. 6, FS4 is configured by "1'b*", "23'h280402" and "6'h04" in this order. The binary representation of "6'h04" is as follows:
000 100

In FIG. 6, FS5 is configured by "1'b*", "23'h280402" and "6'h09" in this order. The binary representation of "6'h09" is as follows:
001 001

In FIG. 6, FS6 is configured by "1'b*", "23'h280402" and "6'h10" in this order. The binary representation of "6'h10" is as follows:
010 000

In FIG. 6, FS7 is configured by "1'b*", "23'h280402" and "6'h29" in this order. The binary representation of "6'h29" is as follows:
101 001

Thus, the 8 different FS patterns are set. It should be noted that, if data are recorded to the magneto-optical disk 19 by use of the synchronous patterns having the structures shown in FIG. 6, the data may be recorded by following the 1–7 pp modulation rules (Tmin, Tmax, RMTR (Repeated Minimum Transition Runlength).

Meanwhile, for the frame sync FS pattern, one of FS7-0 through FS7-7 shown in FIG. 7 may be set for FS7 of FIG. 6.

To be more specific, the table of FIG. 7 shows an example of frame sync structures of FS patterns FS7-0 through FS7-7 which are different from those shown in FIG. 6. "Candidate of FS7" on the left side of the table of FIG. 7 shows patterns FS7-0 through FS7-7 which can be set for FS7. The right-side two columns in FIG. 7 show the frame sync structures corresponding to FS patterns. The center column "Sync body" is divided into two columns; the left-side column shows "1'b*" and the right-side column shows "23'h280402".

Like the table shown in FIG. 6, "1'b*" is configured by 1 bit in FIG. 7; if the terminate processing has been performed at the end of a preceding frame in the data to be recorded to the magneto-optical disk 19, "1" is recorded for this bit and, if the terminate processing has not been performed, "0" is recorded. "23'h280402" is configured by 23 bits; in hexadecimal notation, a binary number representing "280402" is recorded.

To be more specific, if one of FS7-0 through FS7-7 in FIG. 7 is used for FS7 shown in FIG. 6 to record data to the magneto-optical disk 19, the data may also be recorded by following the 1–7 pp modulation rules. If combinations of these are used, FS0 through FS6 remain the same as with DVR.

In addition, it is practicable to set the frame sync FS patterns as shown in FIG. 8, in addition to the arrangements shown in FIGS. 6 and 7.

To be more specific, the table shown in FIG. 8 shows an example of FS patterns FS0 through FS7 and sync frame structures which are different from those shown in FIGS. 6 and 7. "Sync No" on the left-side column of the table in FIG. 8 shows FS patterns FS0 through FS7. The right-side two columns in FIG. 8 show the frame sync structures corresponding to the FS patterns. To be more specific, the center column "Sync body" is divided into two columns; the left-side column shows "1'b*" and the right-side column shows "23'h280402".

Like the table shown in FIG. 6, "1'b*" is configured by 1 bit in FIG. 8; if terminate processing has been performed at the end of a preceding frame in the data to be recorded to the magneto-optical disk 19, "1" is recorded and, if the terminate processing has not been performed, "0" is recorded. "23'h280402" is configured by 23 bits; in hexadecimal notation, a binary number representing "280402" is recorded.

"Sync ID" of the right-side column in FIG. 8 is configured by 6 bits on the side of data area; on the 2 digits from the right side of each line, the data to be recorded are represented in hexadecimal notation.

To be more specific, in FIG. 8, FS0 is configured by "1'b*", "23'h280402" and "6'h01" in this order. FS1 is configured by "1'b*", "23'h280402" and "6'h04" in this order. FS2 is configured by "1'b*", "23'h280402" and "6'h09" in this order. FS3 is configured by "1'b*", "23'h280402" and "6'h10" in this order. FS4 is configured by "1'b*", "23'h280402" and "6'h12" in this order. FS5 is configured by "1'b*", "23'h280402" and "6'h21" in this order. FS6 is configured by "1'b*", "23'h280402" and "6'h24" in this order. FS7 is configured by "1'b*", "23'h280402" and "6'h29" in this order.

It should be noted that if data are recorded to the magneto-optical disk 19 by use of the FS patterns having the structures shown in FIG. 8, two or more Hamming distances may be taken between Sync IDs.

Figure 9:
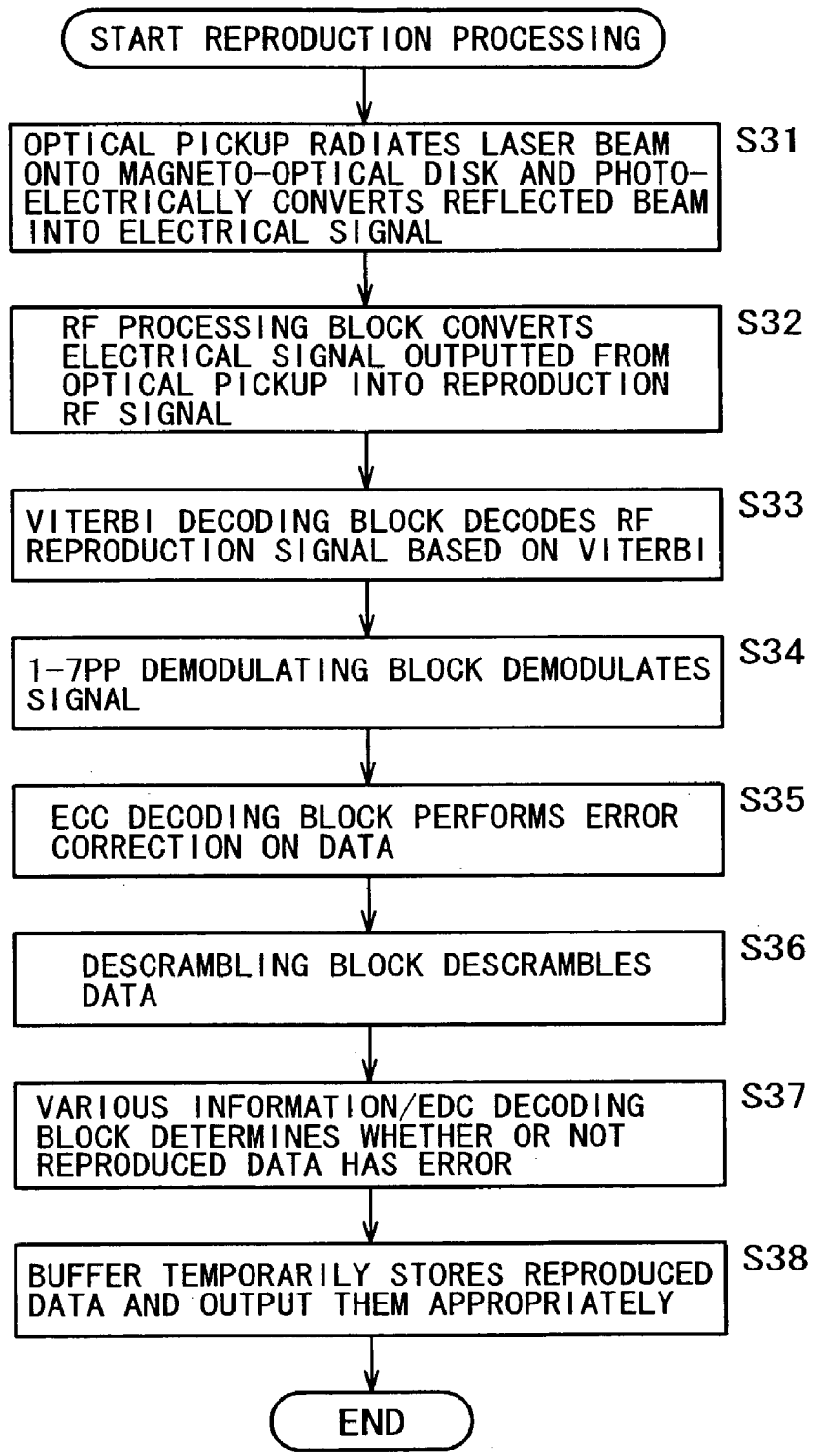
FIG. 9 is a flowchart describing the processing of reproducing data from a magneto-optical disk loaded on the optical disk apparatus of FIG. 1.

The following describes the magneto-optical disk reproduction processing by the optical disk apparatus 1 with reference to the flowchart shown in FIG. 9.

In step S31, the optical pickup 23 radiates a laser beam for reproduction lower in intensity than a recording laser beam onto the magneto-optical disk 19 and photoelectrically converts the reproduction laser beam reflected from the magneto-optical disk 19 into an electrical signal, supplying it to the ADIP decoder 20 and the RF processing block 24.

In step S32, the RF processing block 24 generates a reproduction RF signal from the electrical signal supplied from the optical pickup 23 and outputs the generated signal RF signal to the Viterbi decoding block 25.

In step S33, the Viterbi decoding block 25 decodes the reproduction RF signal supplied from the RF processing block 24 in a Viterbi manner to generate binary data and supplies the generated binary data to the 1–7 pp demodulating block 26.

In step S34, the 1–7 pp demodulating block 26 performs predetermined demodulation processing on the binary data supplied from the Viterbi decoding block 25 and outputs the demodulated data to the ECC decoding block 27. It should be noted that the part of the processing performed by the 1–7 pp demodulating block 26 will be detailed later.

In step S35, the ECC decoding block 27 performs error correction processing on the data supplied from the 1–7 pp demodulating block 26 and supplies the corrected data to the descrambling block 28.

In step S36, the descrambling block 28 descrambles the data outputted from the ECC decoding block 27 and supplies the descrambled data to the various information/EDC decoding block 29.

In step S37, the various information/EDC decoding block 29 extracts various pieces of information from the data supplied from the descrambling block 28 and, at the same time, extracts EDC to determine whether an error is included in the reproduced data. Then, the data are supplied to the buffer 12.

In step S38, the buffer 12 temporarily stores the data supplied from the various information/EDC decoding block 29 and appropriately supplies the stored data to circuits, not shown, through the external interface 11.

Thus, the optical disk apparatus 1 reproduces data from the magneto-optical disk 19.

Figure 10:
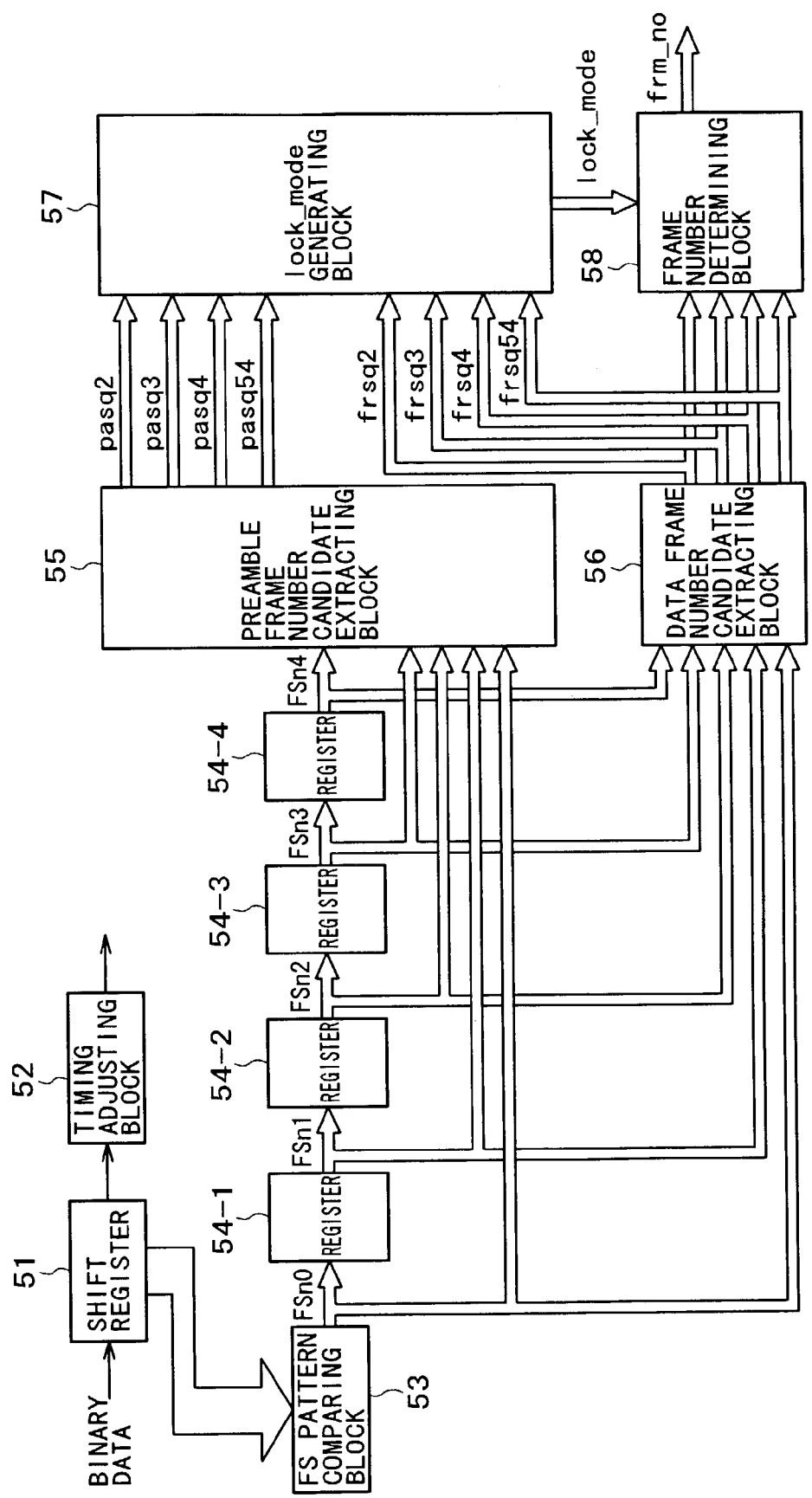
FIG. 10 is a diagram illustrating the details of a portion of a 1–7 pp demodulating block in the optical disk of FIG. 1.

The following describes, with reference to FIG. 10, frame number detection processing, which is a part of data demodulation processing shown in step S34 of the flowchart of FIG. 9.

FIG. 10 is a block diagram illustrating the details of a partial configuration of the inside of the 1–7 pp demodulating block 26. In FIG. 10, a shift register 51 is a register having the number of bits of frame sync, namely, 30 bits, in which the binary data are entered from the Viterbi decoding block 25. The output of the shift register 51 is entered in an FS pattern comparing block 53.

The FS pattern comparing block 53 compares the entered binary data with the FS patterns shown in FIG. 6 or FIGS. 7 and 8 to detect FS patterns. If FS patterns are detected, the FS pattern comparing block 53 outputs, from a register 54-1, an FS pattern called FSn1 reproduced 1932 bits before equivalent to 1 frame from the start of a FS pattern called FSn0 detected in the FS pattern comparing block 53, outputs, from register 54-2, an FS pattern called FSn2 reproduced 3864 bits before equivalent to 2 frames from the start of the detected data FSn0, outputs, from a register 54-3, an FS pattern called FSn3 reproduced 5796 bit before equivalent to 3 frames from the start of the detected data FSn0, and outputs, from a register 54-4, an FS pattern called FSn4 reproduced 7728 bits before equivalent to 4 frames from the start of the detected data FSn0.

Data FSn0, FSn1, FSn2, FSn3, and FSn4 outputted from the FS pattern comparing block 53 and the shift registers 54-1 through 54-4 are supplied to a preamble frame number candidate extracting block 55 and a data frame number candidate extracting block 56.

The preamble frame number candidate extracting block 55 extracts a frame number candidate of FSn0 on the basis of the arrangement of the FS patterns of entered data FSn0, FSn1, FSn2, FSn3, and FSn4 in accordance with the flowcharts shown in FIGS. 11 through 14. The frame number candidate extracted on the basis of the two arrangements of FSn0 and FSn1 is referred to as pasq2. The frame number candidate extracted on the basis of the three arrangements of FSn0, FSn1, and FSn2 is referred to as pasq3. The frame number candidate extracted on the basis of the four arrangements of FSn0, FSn1, FSn2, and FSn3 is referred to as pasq4. The frame number candidate extracted on the basis of the four arrangement of FSn0, FSn1, FSn3, and FSn4 is referred to as pasq54.

The preamble frame number candidate extracting block 55 extracts frame number candidates of the preamble part. If frame number candidates are extracted from entered data FSn0, FSn1, FSn2, FSn3, and FSn4, the preamble frame number candidate extracting block 55 outputs a candidate frame number from pasq2, pasq3, pasq4, and pasq54. If none of the frame number candidates for entered data FSn0, FSn1, FSn2, FSn3, and FSn4 is extracted from pasq2, pasq3, pasq4, and pasq54, "7" is outputted for the output not extracted of the preamble frame number candidate extracting block 55.

The data frame number candidate extracting block 56 extracts a frame number candidate of FSn0 on the basis of the arrangement of FS patterns of entered data FSn0, FSn1, FSn2, FSn3, and FSn4 in accordance with the flowcharts shown in FIGS. 15 through 18. It should be noted that data frame number candidate extracting block 56 extracts the candidates of frame numbers of the frames in the data part. The frame number candidate extracted on the basis of the two arrangements of FSn0 and FSn1 is referred to as frsq2. The frame number candidate extracted on the basis of the three arrangements of FSn0, FSn1, and FSn2 is referred to as frsq3. The frame number candidate extracted on the basis of the four arrangements of FSn0, FSn1, FSn2, and FSn3 is referred to as frsq4. The frame number candidate extracted on the basis of the four arrangements of FSn0, FSn1, FSn3, and FSn4 is referred to as frsq54.

If frame number candidates are extracted from entered data FSn0, FSn1, FSn2, FSn3, and FSn4, the data frame number candidate extracting block 56 outputs a candidate frame number from frsq2, frsq3, frsq4, and frsq54. If none of the frame number candidates for entered data FSn0, FSn1, FSn2, FSn3, and FSn4 is extracted from frsq2, frsq3, frsq4, and frsq54, "31" is outputted for the output not extracted of the data frame number candidate extracting block 56.

Figure 19:
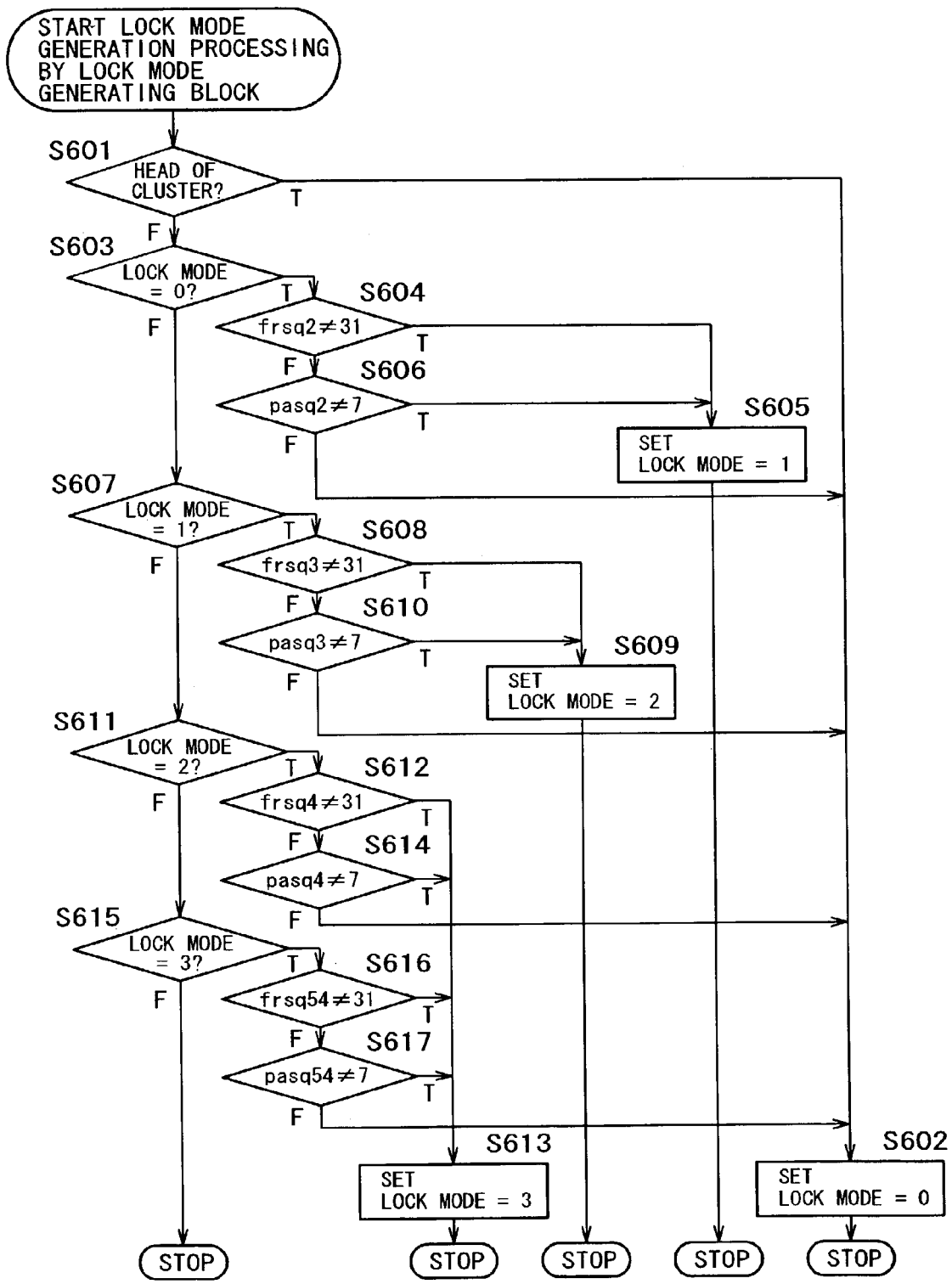
FIG. 19 is a flowchart describing the clock mode generation processing of a clock mode generating block.

In accordance with the flowchart shown in FIG. 19, every time the shift registers 54-1 through 54-4 are updated, a lock-mode generating block 57 generates and outputs the lock mode. The lock-mode generating block 57 sets the lock mode to 0 at the beginning of each cluster. If the shift registers 54-1 through 54-4 have been updated and if at least one of that frsq2 among the outputs of the data frame number candidate extracting block 56 is not "31" and that pasq2 among the outputs of the preamble frame number candidate extracting block 55 is not "7" is satisfied, then the lock-mode generating block 57 counts up the lock mode to set the lock mode to 1 and outputs the lock mode to a frame number determining block 58.

Then, if at least one of that frsq3 among the outputs of the data frame number candidate extracting block 56 is not "31" and that pasq3 among the outputs of the preamble frame number candidate extracting block 55 is not "7" is satisfied when the shift registers 54-1 through 54-4 are updated, the lock-mode generating block 57 counts up the lock mode to set the lock mode to 2 and outputs the lock mode to the frame number determining block 58.

Next, if at least one of that frsq4 among the outputs of the data frame number candidate extracting block 56 is not "31" and that pasq4 among the outputs of the preamble frame number candidate extracting block 55 is not "7" is satisfied when the shift registers 54-1 through 54-4 are updated, the lock-mode generating block 57 counts up the lock mode to set the lock mode to 3 and outputs the lock mode to the frame number determining block 58.

Then, if at least one of that frsq54 among the outputs of the data frame number candidate extracting block 56 is not "31" and that pasq54 among the outputs of the preamble frame number candidate extracting block 55 is not "7" is satisfied when the shift registers 54-1 through 54-4 are updated, the lock-mode generating block 57 maintains the lock mode at 3 and outputs the lock mode to the frame number determining block 58.

If the lock mode is set to any of 0 to 3 and if the output concerned of the data frame number candidate extracting block 56 is "31" and the output concerned of the preamble frame number candidate extracting block 55 is "7" in accordance with the lock mode at the updating of the shift registers 54-1 through 54-4, the lock-mode generating block 57 sets the lock mode to 0 and outputs the lock mode to the frame number determining block 58.

Figure 20:
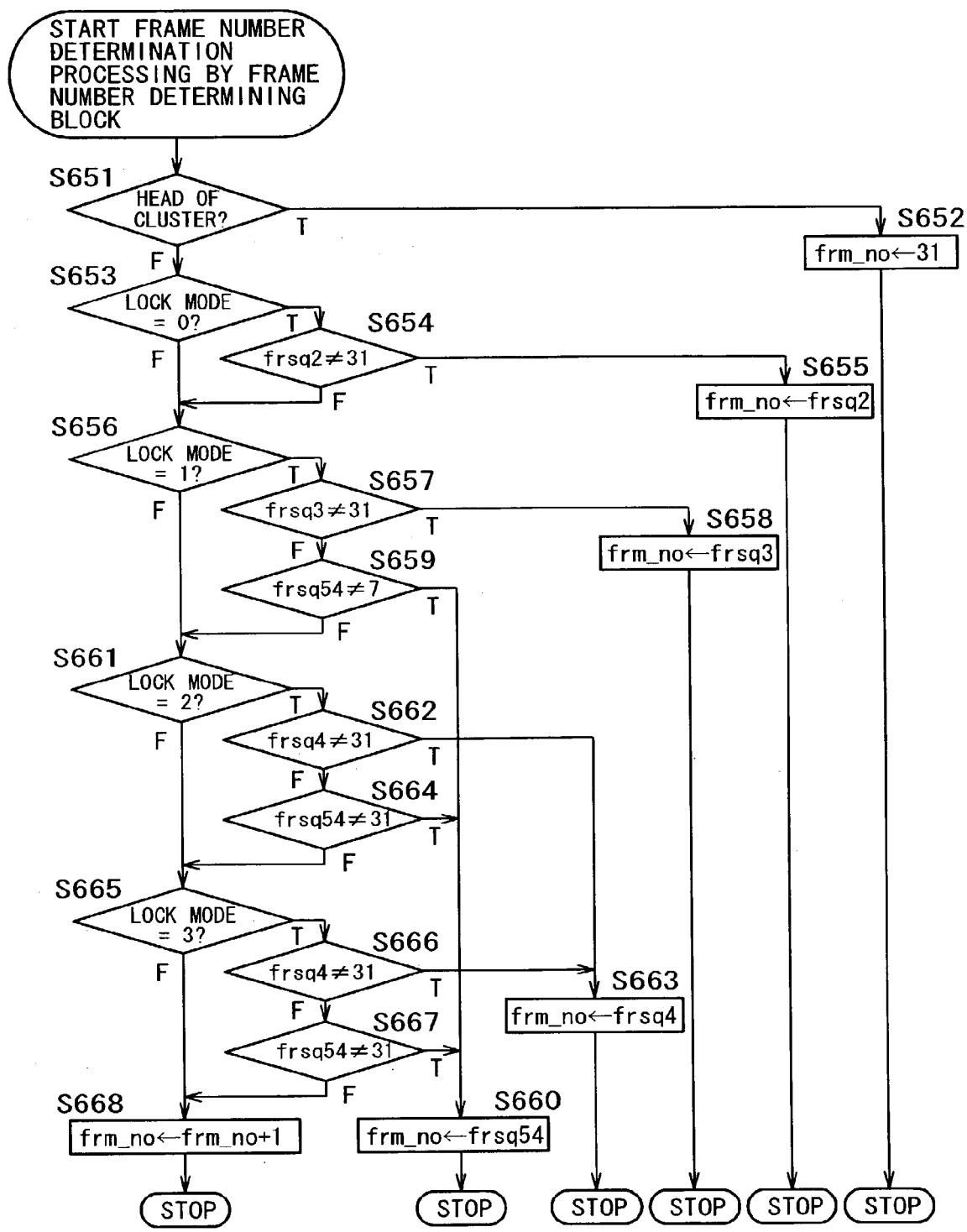
FIG. 20 is a flowchart describing the frame number determination processing of a frame number determining block.

In accordance with the flowchart shown in FIG. 20, the frame number determining block 58 determines the frame number of the entered data on the basis of the lock mode supplied from the lock-mode generating block 57 and the data frame number candidate supplied from the data frame number candidate extracting block 56.

First, at the beginning of the cluster, the frame number determining block 58 sets frm_no, its output, to "31" indicative of the amble part. Next, every time the shift registers 54-1 through 54-4 are updated, the frame number determining block 58 sets frm_no as described below.

If the value of frsq2 among the inputs from the data frame number candidate extracting block 56 is not "31" when the lock mode is "0", the frame number determining block 58 sets frsq2 to its output frm_no; if the value of frsq2 is "31", the frame number determining block 58 sets frm_no+1 to frm_no by unsigned 5-bit addition. If frm_no=31, this value is maintained.

If the value of frsq3 among the inputs from the data frame number candidate extracting block 56 is not "31" when the lock mode is "1", the frame number determining block 58 sets frsq3 to its output frm_no. If this value is "31", the frame number determining block 58 determines whether the value of frsq54 among the inputs from the data frame number candidate extracting block 56 is "31". If the value of frsq54 is found not "31", then the frame number determining block 58 sets frsq54 to frm_no; if the value is found "31", the frame number determining block 58 sets frm_no+1 to frm_no by unsigned 5-bit addition. If frm_no=31, this value is maintained.

If the value of frsq4 among the inputs from the data frame number candidate extracting block 56 is not "31" when the lock mode is "2" or "3", then the frame number determining block 58 sets frsq4 to its output frm_no. If the value is "31", the frame number determining block 58 determines whether the value of frsq54 among the inputs from the data frame number candidate extracting block 56 is "31". If the value of frsq54 is found not "31", the frame number determining block 58 sets frsq54 to frm_no; if the value is found "31", the frame number determining block 58 sets frm_no+1 to frm_no by unsigned 5-bit addition. If frm_no=31, this value is maintained.

The following describes the principle of frame number candidate extraction with reference to FIGS. 21 through 24. The tables shown in FIGS. 21 through 24 are tables of reference for use in the extraction of frame number candidates. It should be noted that the table shown in FIG. 22 is the continuation from the table shown in FIG. 21 and the table shown in FIG. 24 is the continuation from the table shown in FIG. 23.

In the tables shown in FIGS. 21 through 24, the leftmost column "Frame No" is referred to as column 1 and the column "FS(n)" on the right of column 1 is referred to as column 2. The leftmost column "FSn0 FSn1" under column "Cluster Heads" (in FIGS. 23 and 24, "Cluster Intermediacies") is referred to as column 3. The subsequent column "FSn0 FSn1 FSn2" is referred to as column 4. The subsequent column "FSn0 FSn1 FSn2 FSn3" is referred to as column 5. The right-most column "FSn0 FSn1 FSn3 FSn4" is referred to as column 6.

In the following description, the row just below each header, the row on which "PrA0" is written below header "Frame No" in FIG. 21 is referred to as row 1 followed by row 2, row 3 and so on, for example.

The tables shown in FIGS. 21 and 22 shows the reference information for extracting the frame number candidates of the preamble part and data sector 0. The tables shown in FIGS. 23 and 24 show the reference information for extracting the frame number candidates of data sectors 1 through 15.

The arrangements of FS patterns is as shown in FIGS. 5A, 5B, and 5C. Column 1 in the tables shown in FIGS. 21 through 24 indicates the frames corresponding to those in FIG. 5. To be more specific, PrA0 through PrA9 shown on rows 1 through 10 in column 1 "Frame No" in the table shown in FIG. 21 correspond to PrA0 through PrA9 shown in the left column shown in FIG. 5A. DSX0 through DSX10 in rows 11 through 21 in column 1 "Frame No" in the table of FIG. 21 and DSX0 through DSX10 in rows 1 through 11 in column 1 "Frame No" in the table of FIG. 23 correspond to DSX0 through DSX10 in the left column of FIG. 5C. DSX11 through DSX 30 in rows 1 through 20 in column 1 "Frame No" in the tables of FIGS. 22 and 24 correspond to DSX11 through DSX30 in the left column of FIG. 5C.

The numerals in rows 1 through 10 in column 2 "FS(n)" in the table of FIG. 21 are the numbers of the FS patterns shown in the right column of FIG. 5A. Namely, 7, 7, 7, 7, 7, 1, 4, 7, 4, 2 in rows 1 through 10 in column 2 "FS(n)" in the table of FIG. 21 denote FS7, FS7, FS7, FS7, FS7, FS1, FS4, FS7, FS4, FS2 in the right column of FIG. 5A.

Column 3 "FSn0 FSn1" in the tables of FIGS. 21 and 22 shows numerals when 2 FS patterns shown in column 2 are arranged. Namely, row 2 from top in column 3 "FSn0 FSn1" in the table of FIG. 21 shows "7" in row 1 from top in column 2 representing the FS pattern of PrA0 and "7" in row 2 from top in column 2 representing the FS pattern of PrA1, as "77" in the order of PrA1 and PrA0

Likewise, row 3 from top in column 3 "FSn0 FSn1" in the table of FIG. 21 shows "7" in row 2 from top in column 2 representing the FS pattern of PrA1 and "7" in row 3 from top in column 2 representing the FS pattern of PrA2, as "77" in the order of PrA2 and PrA1.

Likewise, row 4 from top in column 3 "FSn0 FSn1" in the table of FIG. 21 shows "7" in row 3 from top in column 2 representing the FS pattern of PrA2 and "7" in row 4 from top in column 2 representing the FS pattern of PrA3, as "77" in the order of PrA3 and PrA2.

Likewise, row 5 from top in column 3 "FSn0 FSn1" in the table of FIG. 21 shows "7" in row 4 from top in column 2 representing the FS pattern of PrA3 and "7" in row 5 from top in column 2 representing the FS pattern of PrA4, as "77" in the order of PrA4 and PrA3.

Likewise, row 6 from top in column 3 "FSn0 FSn1" in the table of FIG. 21 shows "7" in row 5 from top in column 2 representing the FS pattern of PrA4 and "1" in row 6 from top in column 2 representing the FS pattern of PrA5, as "17" in the order of PrA5 and PrA4.

Likewise, row 7 from top in column 3 "FSn0 FSn1" in the table of FIG. 21 shows "1" in row 6 from top in column 2 representing the FS pattern of PrA5 and "4" in row 7 from top in column 2 representing the FS pattern of PrA6, as "41" in the order of PrA6 and PrA5.

Likewise, row 8 from top in column 3 "FSn0 FSn1" in the table FIG. 21 shows "4" in row 7 from top in column 2 representing the FS pattern of PrA6 and "7" in row 8 from top in column 2 representing the FS pattern of PrA7, as "74" in the order of PrA7 and PrA6.

Likewise, row 9 from top in column 3 "FSn0 FSn1" in the table of FIG. 21 shows "7" in row 8 from top in column 2 representing the FS pattern of PrA7 and "4" in row 9 from top in column 2 representing the FS pattern of PrA8, as "47" in the order of PrA8 and PrA7.

Likewise, row 10 from top in column 3 "FSn0 FSn1" in the table of FIG. 21 shows "4" in row 9 from top in column 2 representing the FS pattern of PrA8 and "2" in row 10 from top in column 2 representing the FS pattern of PrA9, as "24" in the order of PrA9 and PrA8.

Likewise, row 11 from top in column 3 "FSn0 FSn1" in the table of FIG. 21 shows "2" in row 10 from top in column 2 representing the FS pattern of PrA9 and "0" in row 11 from top in column 2 representing the FS pattern of DSX0, as "02" in the order of DSX0 and PrA9.

Likewise, row 12 from top in column 3 "FSn0 FSn1" in the table of FIG. 21 shows "0" in row 11 from top in column 2 representing the FS pattern of DSX0 and "1" in row 12 from top in column 2 representing the FS pattern of DSX1, as "10" in the order of DSX1 and DSX0.

Likewise, row 13from top in column 3 "FSn0 FSn1" in the table of FIG. 21 shows "1" in row 12 from top in column 2 representing the FS pattern of DSX1 and "2" in row 13from top in column 2 representing the FS pattern of DSX2, as "21" in the order of DSX2 and DSX1.

Likewise, row 14 from top in column 3 "FSn0 FSn1" in the table of FIG. 21 shows "2" in row 13 from top in column 2 representing the FS pattern of DSX2 and "3" in row 14 from top in column 2 representing the FS pattern of DSX3, as "32" in the order of DSX3 and DSX2.

Likewise, row 15 from top in column 3 "FSn0 FSn1" in the table of FIG. 21 shows "3" in row 14 from top in column 2 representing the FS pattern of DSX3 and "3" in row 15 from top in column 2 representing the FS pattern of DSX4, as "33" in the order of DSX4 and DSX3.

Likewise, row 16 from top in column 3 "FSn0 FSn1" in the table of FIG. 21 shows "3" in row 15 from top in column 2 representing the FS pattern of DSX4 and "1" in row 16 from top in column 2 representing the FS pattern of DSX5, as "13" in the order of DSX5 and DSX4.

Likewise, row 17 from top in column 3 "FSn0 FSn1" in the table of FIG. 21 shows "1" in row 16 from top in column 2 representing the FS pattern of DSX5 and "4" in row 17 from top in column 2 representing the FS pattern of DSX6, as "41" in the order of DSX6 and DSX5.

Likewise, row 18 from top in column 3 "FSn0 FSn1" in the table of FIG. 21 shows "4" in row 17 from top in column 2 representing the FS pattern of DSX6 and "1" in row 18 from top in column 2 representing the FS pattern of DSX7, as "14" in the order of DSX7 and DSX6.

Likewise, row 19 from top in column 3 "FSn0 FSn1" in the table of FIG. 21 shows "1" in row 18 from top in column 2 representing the FS pattern of DSX7 and "5" in row 19 from top in column 2 representing the FS pattern of DSX8, as "51" in the order of DSX8 and DSX7.

Likewise, row 20 from top in column 3 "FSn0 FSn1" in the table of FIG. 21 shows "5" in row 19 from top in column 2 representing the FS pattern of DSX8 and "5" in row 20 from top in column 2 representing the FS pattern of DSX9, as "55" in the order of DSX9 and DSX8.

Likewise, row 21 from top in column 3 "FSn0 FSn1" in the table of FIG. 21 shows "5" in row 20 from top in column 2 representing the FS pattern of DSX9 and "4" in row 21 from top in column 2 representing the FS pattern of DSX10, as "45" in the order of DSX10 and DSX9.

Now referring to FIG. 22, row 1 from top in column 3 "FSn0 FSn1" in the table of FIG. 22 shows "4" in row 21 from top in column 2 representing the FS pattern of DSX10 in FIG. 21 and "3" in row 1 from top in column 2 representing the FS pattern of DSX11, as "34" in the order of DSX11 and DSX10.

Likewise, row 2 from top in column 3 "FSn0 FSn1" in the table of FIG. 22 shows "3" in row 1 from top in column 2 representing the FS pattern of DSX11 and "4" in row 2 from top in column 2 representing the FS pattern of DSX12, as "43" in the order of DSX12 and DSX11.

Likewise, row 3 from top in column 3 "FSn0 FSn1" in the table of FIG. 22 shows "4" in row 2 from top in column 2 representing the FS pattern of DSX12 and "6" in row 3 from top in column 2 representing the FS pattern of DSX13, as "64" in the order of DSX13 and DSX12.

Likewise, row 4 from top in column 3 "FSn0 FSn1" in the table of FIG. 22 shows "6" in row 3 from top in column 2 representing the FS pattern of DSX13 and "6" in row 4 from top in column 2 representing the FS pattern of DSX14, as "66" in the order of DSX14 and DSX13.

Likewise, row 5 from top in column 3 "FSn0 FSn1" in the table of FIG. 22 shows "6" in row 4 from top in column 2 representing the FS pattern of DSX14 and "3" in row 5 from top in column 2 representing the FS pattern of DSX15, as "36" in the order of DSX15 and DSX14.

Likewise, row 6 from top in column 3 "FSn0 FSn1" in the table of FIG. 22 shows "3" in row 5 from top in column 2 representing the FS pattern of DSX15 and "5" in row 6 from top in column 2 representing the FS pattern of DSX16, as "53" in the order of DSX16 and DSX15.

Likewise, row 7 from top in column 3 "FSn0 FSn1" in the table of FIG. 22 shows "5" in row 6 from top in column 2 representing the FS pattern of DSX16 and "3" in row 7 from top in column 2 representing the FS pattern of DSX17, as "35" in the order of DSX17 and DSX16.

Likewise, row 8 from top in column 3 "FSn0 FSn1" in the table of FIG. 22 shows "3" in row 7 from top in column 2 representing the FS pattern of DSX17 and "2" in row 8 from top in column 2 representing the FS pattern of DSX18, as "23" in the order of DSX18 and DSX17.

Likewise, row 9 from top in column 3 "FSn0 FSn1" in the table of FIG. 22 shows "2" in row 8 from top in column 2 representing the FS pattern of DSX18 and "2" in row 9 from top in column 2 representing the FS pattern of DSX19, as "22" in the order of DSX19 and DSX18.

Likewise, row 10 from top in column 3 "FSn0 FSn1" in the table of FIG. 22 shows "2" in row 9 from top in column 2 representing the FS pattern of DSX19 and "5" in row 10 from top in column 2 representing the FS pattern of DSX20, as "52" in the order of DSX20 and DSX19.

Likewise, row 11 from top in column 3 "FSn0 FSn1" in the table of FIG. 22 shows "5" in row 10 from top in column 2 representing the FS pattern of DSX20 and "6" in row 11 from top in column 2 representing the FS pattern of DSX21, as "65" in the order of DSX21 and DSX20

Likewise, row 12 from top in column 3 "FSn0 FSn1" in the table of FIG. 22 shows "6" in row 11 from top in column 2 representing the FS pattern of DSX21 and "5" in row 12 from top in column 2 representing the FS pattern of DSX22, as "56" in the order of DSX22 and DSX21.

Likewise, row 13 from top in column 3 "FSn0 FSn1" in the table of FIG. 22 shows "1" in row 12 from top in column 2 representing the FS pattern of DSX22 and "5" in row 13from top in column 2 representing the FS pattern of DSX23, as "15" in the order of DSX23 and DSX22.

Likewise, row 14 from top in column 3 "FSn0 FSn1" in the table of FIG. 22 shows "1" in row 13 from top in column 2 representing the FS pattern of DSX23 and "1" in row 14 from top in column 2 representing the FS pattern of DSX24, as "11" in the order of DSX24 and DSX23.

Likewise, row 15 from top in column 3 "FSn0 FSn1" in the table of FIG. 22 shows "1" in row 14 from top in column 2 representing the FS pattern of DSX24 and "6" in row 15 from top in column 2 representing the FS pattern of DSX25, as "61" in the order of DSX25 and DSX24.

Likewise, row 16 from top in column 3 "FSn0 FSn1" in the table of FIG. 22 shows "6" in row 15 from top in column 2 representing the FS pattern of DSX25 and "2" in row 16 from top in column 2 representing the FS pattern of DSX26, as "26" in the order of DSX26 and DSX25.

Likewise, row 17 from top in column 3 "FSn0 FSn1" in the table of FIG. 22 shows "2" in row 16 from top in column 2 representing the FS pattern of DSX26 and "6" in row 17 from top in column 2 representing the FS pattern of DSX27, as "62" in the order of DSX27 and DSX26.

Likewise, row 18 from top in column 3 "FSn0 FSn1" in the table of FIG. 22 shows "6" in row 17 from top in column 2 representing the FS pattern of DSX27 and "4" in row 18 from top in column 2 representing the FS pattern of DSX28, as "46" in the order of DSX28 and DSX27.

Likewise, row 19 from top in column 3 "FSn0 FSn1" in the table of FIG. 22 shows "4" in row 18 from top in column 2 representing the FS pattern of DSX28 and "4" in row 19 from top in column 2 representing the FS pattern of DSX29, as "44" in the order of DSX29 and DSX28.

Likewise, row 20 from top in column 3 "FSn0 FSn1" in the table of FIG. 22 shows "4" in row 19 from top in column 2 representing the FS pattern of DSX29 and "2" in row 20 from top in column 2 representing the FS pattern of DSX30, as "24" in the order of DSX30 and DSX29.

As described above, in column 3 "FSn0 FSn1" in each of the tables of FIG. 21 and FIG. 22, nth row from top (provided that the row numbers are assigned throughout FIG. 21 and FIG. 22) shows the FS pattern of n-1 row from top of column 2 and the FS pattern of nth row from top of column 2, in the order of the pattern of nth row and the pattern of n-1 row. It should be noted that n is up to 30.

Next, column 4 "FSn0 FSn1 FSn2" in each of the tables of FIG. 21 and FIG. 22 shows numerals representing three FS patterns. To be more specific, the third row from top in column 4 "FSn0 FSn1 FSn2" shown in FIG. 21 shows "7" in row 1 from top of column 2 representing the FS pattern of PrA0, "7" in row 2 from top of column 2 representing the FS pattern of PrA1, and "7" in row 3 from top of column 2 representing the FS pattern of PrA2, as "777" in the order of PrA2, PrA1, and PrA0.

Likewise, row 4 from top in column 4 "FSn0 FSn1 FSn2" shows "7" in row 2 from top in column 2 representing the FS pattern of PrA1, "7" in row 3 from top in column 2 representing the FS pattern of PrA2, and "7" in row 4 from top in column 2 representing the FS pattern of PrA3, as "777" in the order of PrA3, PrA2, and PrA1.

Likewise, row 5 from top in column 4 "FSn0 FSn1 FSn2" shows "7" in row 3 from top in column 2 representing the FS pattern of PrA2, "7" in row 4 from top in column 2 representing the FS pattern of PrA3, and "7" in row 5 from top in column 2 representing the FS pattern of PrA4, as "777" in the order of PrA4, PrA3, and PrA2.

Likewise, row 6 from top in column 4 "FSn0 FSn1 FSn2" shows "7" in row 4 from top in column 2 representing the FS pattern of PrA3, "7" in row 5 from top in column 2 representing the FS pattern of PrA4, and "1" in row 6 from top in column 2 representing the FS pattern of PrA5, as "177" in the order of PrA5, PrA4, and PrA3.

Likewise, row 7 from top in column 4 "FSn0 FSn1 FSn2" shows "7" in row 5 from top in column 2 representing the FS pattern of PrA4, "1" in row 6 from top in column 2 representing the FS pattern of PrA5, and "4" in row 7 from top in column 2 representing the FS pattern of PrA6, as "417" in the order of PrA6, PrA5, and PrA4.

Likewise, row 8 from top in column 4 "FSn0 FSn1 FSn2" shows "1" in row 6 from top in column 2 representing the FS pattern of PrA5, "4" in row 7 from top in column 2 representing the FS pattern of PrA6, and "7" in row 8 from top in column 2 representing the FS pattern of PrA7, as "741" in the order of PrA7, PrA6, and PrA5.

Likewise, row 9 from top in column 4 "FSn0 FSn1 FSn2" shows "4" in row 7 from top in column 2 representing the FS pattern of PrA6, "7" in row 8 from top in column 2 representing the FS pattern of PrA7, and "4" in row 9 from top in column 2 representing the FS pattern of PrA8, as "474" in the order of PrA8, PrA7, and PrA6.

Likewise, row 10 from top in column 4 "FSn0 FSn1 FSn2" shows "7" in row 8 from top in column 2 representing the FS pattern of PrA7, "4" in row 9 from top in column 2 representing the FS pattern of PrA8, and "2" in row 10 from top in column 2 representing the FS pattern of PrA9, as "247" in the order of PrA9, PrA8, and PrA7.

Likewise, row 11 from top in column 4 "FSn0 FSn1 FSn2" shows "4" in row 9 from top in column 2 representing the FS pattern of PrA8, "2" in row 10 from top in column 2 representing the FS pattern of PrA9, and "0" in row 11 from top in column 2 representing the FS pattern of DSX0, as "024" in the order of DSX0, PrA9, and PrA8.

Likewise, row 12 from top in column 4 "FSn0 FSn1 FSn2" shows "2" in row 10 from top in column 2 representing the FS pattern of PrA9, "0" in row 11 from top in column 2 representing the FS pattern of DSX0, and "1" in row 12 from top in column 2 representing the FS pattern of DSX1, as "102" in the order of DSX1, DSX0, and PrA9.

Likewise, row 13 from top in column 4 "FSn0 FSn1 FSn2" shows "0" in row 11 from top in column 2 representing the FS pattern of DSX0, "1" in row 12 from top in column 2 representing the FS pattern of DSX1, and "2" in row 13 from top in column 2 representing the FS pattern of DSX2, as "210" in the order of DSX2, DSX1, and DSX0.

Likewise, row 14 from top in column 4 "FSn0 FSn1 FSn2" shows "1" in row 12 from top in column 2 top in column 2 representing the FS pattern of DSX2, and "3" in row 14 from top in column 2 representing the FS pattern of DSX3, as "321" in the order of DSX3, DSX2, and DSX1.

Likewise, row 15 from top in column 4 "FSn0 FSn1 FSn2" shows "2" in row 13 from top in column 2 representing the FS pattern of DSX2, "3" in row 14 from top in column 2 representing the FS pattern of DSX3, and "3" in row 15 from top in column 2 representing the FS pattern of DSX4, as "332" in the order of DSX4, DSX3, and DSX2.

Likewise, row 16 from top in column 4 "FSn0 FSn1 FSn2" shows "3" in row 14 from top in column 2 representing the FS pattern of DSX3, "3" in row 15 from top in column 2 representing the FS pattern of DSX4, and "1" in row 16 from top in column 2 representing the FS pattern of DSX5, as "133" in the order of DSX5, DSX4, and DSX3.

Likewise, row 17 from top in column 4 "FSn0 FSn1 FSn2" shows "3" in row 15 from top in column 2 representing the FS pattern of DSX4, "1" in row 16 from top in column 2 representing the FS pattern of DSX5, and "4" in row 17 from top in column 2 representing the FS pattern of DSX6, as "413" in the order of DSX6, DSX5, and DSX4.

Likewise, row 18 from top in column 4 "FSn0 FSn1 FSn2" shows "1" in row 16 from top in column 2 representing the FS pattern of DSX5, "4" in row 17 from top in column 2 representing the FS pattern of DSX6, and "1" in row 18 from top in column 2 representing the FS pattern of DSX7, as "141" in the order of DSX7, DSX6, and DSX5.

Likewise, row 19 from top in column 4 "FSn0 FSn1 FSn2" shows "4" in row 17 from top in column 2 representing the FS pattern of DSX6, "1" in row 18 from top in column 2 representing the FS pattern of DSX7, and "5" in row 19 from top in column 2 representing the FS pattern of DSX8, as "514" in the order of DSX8, DSX7, and DSX6.

Likewise, row 20 from top in column 4 "FSn0 FSn1 FSn2" shows "1" in row 18 from top in column 2 representing the FS pattern of DSX7, "5" in row 19 from top in column 2 representing the FS pattern of DSX8, and "5" in row 20 from top in column 2 representing the FS pattern of DSX9, as "551" in the order of DSX9, DSX8, and DSX7.

Likewise, row 21 from top in column 4 "FSn0 FSn1 FSn2" shows "5" in row 19 from top in column 2 representing the FS pattern of DSX8, "5" in row 20 from top in column 2 representing the FS pattern of DSX9, and "4" in row 21 from top in column 2 representing the FS pattern of DSX10, as "455" in the order of DSX10, DSX9, and DSX8.

Now, continuing to FIG. 22, row 1 from top in column 4 "FSn0 FSn1 FSn2" shows "5" in row 20 from top in column 2 of FIG. 21 representing the FS pattern of DSX9, "4" in row 21 from top in column 2 of FIG. 21 representing the FS pattern of DSX10, and "3" in row 1 from top of column 2 of FIG. 22 representing the FS pattern of DSX11, as "345" in the order of DSX11, DSX10, and DSX9.

Likewise, row 2 from top in column 4 "FSn0 FSn1 FSn2" shows "4" in row 21 from top in column 2 of FIG. 21 representing the FS pattern of DSX10, "3" in row 1 from top in column 2 of FIG. 22 representing the FS pattern of DSX11, and "4" in row 2 from top in column 2 of FIG. 22 representing the FS pattern of DSX12, as "434" in the order of DSX12, DSX11, and DSX10.

Likewise, row 3 from top in column 4 "FSn0 FSn1 FSn2" shows "3" in row 1 from top in column 2 representing the FS pattern of DSX11, "4" in row 2 from top in column 2 representing the FS pattern of DSX12, and "6" in row 3 from top in column 2 representing the FS pattern of DSX13, as "643" in the order of DSX13, DSX12, and DSX11.

Likewise, row 4 from top in column 4 "FSn0 FSn1 FSn2" shows "4" in row 2 from top in column 2 representing the FS pattern of DSX12, "6" in row 3 from top in column 2 representing the FS pattern of DSX13, and "6" in row 4 from top in column 2 representing the FS pattern of DSX14, as "664" in the order of DSX14, DSX13, and DSX12.

Likewise, row 5 from top in column 4 "FSn0 FSn1 FSn2" shows "6" in row 3 from top in column 2 representing the FS pattern of DSX13, "6" in row 4 from top in column 2 representing the FS pattern of DSX14, and "3" in row 5 from top in column 2 representing the FS pattern of DSX15, as "366" in the order of DSX15, DSX14, and DSX13.

Likewise, row 6 from top in column 4 "FSn0 FSn1 FSn2" shows "6" in row 4 from top in column 2 representing the FS pattern of DSX14, "3" in row 5 from top in column 2 representing the FS pattern of DSX15, and "5" in row 6 from top in column 2 representing the FS pattern of DSX16, as "536" in the order of DSX16, DSX15, and DSX14.

Likewise, row 7 from top in column 4 "FSn0 FSn1 FSn2" shows "3" in row 5 from top in column 2 representing the FS pattern of DSX15, "5" in row 6 from top in column 2 representing the FS pattern of DSX16, and "3" in row 7 from top in column 2 representing the FS pattern of DSX17, as "353" in the order of DSX17, DSX16, and DSX15.

Likewise, row 8 from top in column 4 "FSn0 FSn1 FSn2" shows "5" in row 6 from top in column 2 representing the FS pattern of DSX16, "3" in row 7 from top in column 2 representing the FS pattern of DSX17, and "2" in row 8 from top in column 2 representing the FS pattern of DSX18, as "235" in the order of DSX18, DSX17, and DSX16.

Likewise, row 9 from top in column 4 "FSn0 FSn1 FSn2" shows "3" in row 7 from top in column 2 representing the FS pattern of DSX17, "2" in row 8 from top in column 2 representing the FS pattern of DSX18, and "2" in row 9 from top in column 2 representing the FS pattern of DSX19, as "223" in the order of DSX19, DSX18, and DSX17.

Likewise, row 10 from top in column 4 "FSn0 FSn1 FSn2" shows "2" in row 8 from top in column 2 representing the FS pattern of DSX18, "2" in row 9 from top in column 2 representing the FS pattern of DSX19, and "5" in row 10 from top in column 2 representing the FS pattern of DSX20, as "522" in the order of DSX20, DSX19, and DSX18.

Likewise, row 11 from top in column 4 "FSn0 FSn1 FSn2" shows "2" in row 9 from top in column 2 representing the FS pattern of DSX19, "5" in row 10 from top in column 2 representing the FS pattern of DSX20, and "6" in row 11 from top in column 2 representing the FS pattern of DSX21, as "652" in the order of DSX21, DSX20, and DSX19.

Likewise, row 12 from top in column 4 "FSn0 FSn1 FSn2" shows "5" in row 10 from top in column 2 representing the FS pattern of DSX20, "6" in row 11 from top in column 2 representing the FS pattern of DSX21, and "5" in row 12 from top in column 2 representing the FS pattern of DSX22, as "565" in the order of DSX22, DSX21, and DSX20

Likewise, row 13 from top in column 4 "FSn0 FSn1 FSn2" shows "6" in row 11 from top in column 2 representing the FS pattern of DSX21, "5" in row 12 from top in column 2 representing the FS pattern of DSX22, and "1" in row 13 from top in column 2 representing the FS pattern of DSX23, as "156" in the order of DSX23, DSX22, and DSX21.

Likewise, row 14 from top in column 4 "FSn0 FSn1 FSn2" shows "5" in row 12 from top in column 2 representing the FS pattern of DSX22, "1" in row 13 from top in column 2 representing the FS pattern of DSX23, and "1" in row 14 from top in column 2 representing the FS pattern of DSX24, as "115" in the order of DSX24, DSX23, and DSX22.

Likewise, row 15 from top in column 4 "FSn0 FSn1 FSn2" shows "1" in row 13 from top in column 2 representing the FS pattern of DSX23, "1" in row 14 from top in column 2 representing the FS pattern of DSX24, and "6" in row 15 from top in column 2 representing the FS pattern of DSX25, as "611" in the order of DSX25, DSX24, and DSX23.

Likewise, row 16 from top in column 4 "FSn0 FSn1 FSn2" shows "1" in row 14 from top in column 2 representing the FS pattern of DSX24, "6" in row 15 from top in column 2 representing the FS pattern of DSX25, and "2" in row 16 from top in column 2 representing the FS pattern of DSX26, as "261" in the order of DSX26, DSX25, and DSX24.

Likewise, row 17 from top in column 4 "FSn0 FSn1 FSn2" shows "6" in row 15 from top in column 2 representing the FS pattern of DSX25, "2" in row 16 from top in column 2 representing the FS pattern of DSX26, and "6" in row 17 from top in column 2 representing the FS pattern of DSX27, as "626" in the order of DSX27, DSX26, and DSX25.

Likewise, row 18 from top in column 4 "FSn0 FSn1 FSn2" shows "2" in row 16 from top in column 2 representing the FS pattern of DSX26, "6" in row 17 from top in column 2 representing the FS pattern of DSX27, and "4" in row 18 from top in column 2 representing the FS pattern of DSX28, as "462" in the order of DSX28, DSX27, and DSX26.

Likewise, row 19 from top in column 4 "FSn0 FSn1 FSn2" shows "6" in row 17 from top in column 2 representing the FS pattern of DSX27, "4" in row 18 from top in column 2 representing the FS pattern of DSX28, and "4" in row 19 from top in column 2 representing the FS pattern of DSX29, as "446" in the order of DSX29, DSX28, and DSX27.

Likewise, row 20 from top in column 4 "FSn0 FSn1 FSn2" shows "4" in row 18 from top in column 2 representing the FS pattern of DSX28, "4" in row 19 from top in column 2 representing the FS pattern of DSX29, and "2" in row 20 from top in column 2 representing the FS pattern of DSX30, as "244" in the order of DSX30, DSX29, and DSX28.

As described above, nth row from top in column 4 "FSn0 FSn1 FSn2" in FIGS. 21 and 22 (provided that the row numbers are assigned throughout FIG. 21 and FIG. 22) shows the FS pattern of n-2 row from top of column 2, the FS pattern of n-1 row from top of column 2, and the FS pattern of nth row from top of column 2, in the order of the pattern of nth row from top of column 2, the pattern of n-1 row from top of column 2, and the pattern of n-2 row from top of column 2. It should be noted that n is up to 30.

Next, column 5 "FSn0 FSn1 FSn2 FSn3" in each of the tables of FIG. 21 and FIG. 22 shows numerals representing four FS patterns in column 2. To be more specific, row 4 from top in column 5 "FSn0 FSn1 FSn2 FSn3" shown in FIG. 21 shows "7" in row 1 from top of column 2 representing the FS pattern of PrA0, "7" in row 2 from top of column 2 representing the FS pattern of PrA1, "7" in row 3 from top of column 2 representing the FS pattern of PrA2, and "7" in row 4 from top of column 2 representing the FS pattern of PrA3, as "7777" in the order of PrA3, PrA2, PrA1, and PrA0.

Likewise, row 5 from top in column 5 "FSn0 FSn1 FSn2 FSn3" shows "7" in row 2 from top of column 2 representing the FS pattern of PrA1, "7" in row 3 from top of column 2 representing the FS pattern of PrA2, "7" in row 4 from top of column 2 representing the FS pattern of PrA3, and "7" in row 5 from top of column 2 representing the FS pattern of PrA4, as "7777" in the order of PrA4, PrA3, PrA2, and PrA1.

Likewise, row 6 from top in column 5 "FSn0 FSn1 FSn2 FSn3" shows "7" in row 3 from top of column 2 representing the FS pattern of PrA2, "7" in row 4 from top of column 2 representing the FS pattern of PrA3, "7" in row 5 from top of column 2 representing the FS pattern of PrA4, and "1" in row 6 from top of column 2 representing the FS pattern of PrA5, as "1777" in the order of PrA5, PrA4, PrA3, and PrA2.

Likewise, row 7 from top in column 5 "FSn0 FSn1 FSn2 FSn3" shows "7" in row 4 from top of column 2 representing the FS pattern of PrA3, "7" in row 5 from top of column 2 representing the FS pattern of PrA4, "1" in row 6 from top of column 2 representing the FS pattern of PrA5, and "4" in row 7 from top of column 2 representing the FS pattern of PrA6, as "4177" in the order of PrA6, PrA5, PrA4, and PrA3.

Likewise, row 8 from top in column 5 "FSn0 FSn1 FSn2 FSn3" shows "7" in row 5 from top of column 2 representing the FS pattern of PrA4, "1" in row 6 from top of column 2 representing the FS pattern of PrA5, "4" in row 7 from top of column 2 representing the FS pattern of PrA6, and "7" in row 8 from top of column 2 representing the FS pattern of PrA7, as "7417" in the order of PrA7, PrA6, PrA5, and PrA4.

Likewise, row 9 from top in column 5 "FSn0 FSn1 FSn2 FSn3" shows "1" in row 6 from top of column 2 representing the FS pattern of PrA5, "4" in row 7 from top of column 2 representing the FS pattern of PrA6, "7" in row 8 from top of column 2 representing the FS pattern of PrA7, and "4" in row 9 from top of column 2 representing the FS pattern of PrA8, as "4741" in the order of PrA8 , PrA7, PrA6, and PrA5.

Likewise, row 10 from top in column 5 "FSn0 FSn1 FSn2 FSn3" shows "4" in row 7 from top of column 2 representing the FS pattern of PrA6, "7" in row 8 from top of column 2 representing the FS pattern of PrA7, "4" in row 9 from top of column 2 representing the FS pattern of PrA8 , and "2" in row 10 from top of column 2 representing the FS pattern of PrA9, as "2474" in the order of PrA9, PrA8 , PrA7, and PrA6.

Likewise, row 11 from top in column 5 "FSn0 FSn1 FSn2 FSn3" shows "7" in row 8 from top of column 2 representing the FS pattern of PrA7, "4" in row 9 from top of column 2 representing the FS pattern of PrA8, "2" in row 10 from top of column 2 representing the FS pattern of PrA9, and "0" in row 11 from top of column 2 representing the FS pattern of DSX0, as "0247" in the order of DSX0, PrA9, PrA8 , and PrA7.

Likewise, row 12 from top in column 5 "FSn0 FSn1 FSn2 FSn3" shows "4" in row 9 from top of column 2 representing the FS pattern of PrA8, "2" in row 10 from top of column 2 representing the FS pattern of PrA9, "0" in row 11 from top of column 2 representing the FS pattern of DSX0, and "1" in row 12 from top of column 2 representing the FS pattern of DSX1, as "1024" in the order of DSX1, DSX0, PrA9, and PrA8.

Likewise, row 13 from top in column 5 "FSn0 FSn1 FSn2 FSn3" shows "2" in row 10 from top of column 2 representing the FS pattern of PrA9, "0" in row 11 from top of column 2 representing the FS pattern of DSX0, "1" in row 12 from top of column 2 representing the FS pattern of DSX1, and "2" in row 13 from top of column 2 representing the FS pattern of DSX2, as "2102" in the order of DSX2, DSX1, DSX0, and PrA9.

Likewise, row 14 from top in column 5 "FSn0 FSn1 FSn2 FSn3" shows "0" in row 11 from top of column 2 representing the FS pattern of DSX0, "1" in row 12 from top of column 2 representing the FS pattern of DSX1, "2" in row 13 from top of column 2 representing the FS pattern of DSX2, and "3" in row 14 from top of column 2 representing the FS pattern of DSX3, as "3210" in the order of DSX3, DSX2, DSX1, and DSX0.

Likewise, row 15 from top in column 5 "FSn0 FSn1 FSn2 FSn3" shows "1" in row 12 from top of column 2 representing the FS pattern of DSX1, "2" in row 13 from top of column 2 representing the FS pattern of DSX2, "3" in row 14 from top of column 2 representing the FS pattern of DSX3, and "3" in row 15 from top of column 2 representing the FS pattern of DSX4, as "3321" in the order of DSX4, DSX3, DSX2, and DSX1.

Likewise, row 16 from top in column 5 "FSn0 FSn1 FSn2 FSn3" shows "2" in row 13 from top of column 2 representing the FS pattern of DSX2, "3" in row 14 from top of column 2 representing the FS pattern of DSX3, "3" in row 15 from top of column 2 representing the FS pattern of DSX4, and "1" in row 16 from top of column 2 representing the FS pattern of DSX5, as "1332" in the order of DSX5, DSX4, DSX3, and DSX2.

Likewise, row 17 from top in column 5 "FSn0 FSn1 FSn2 FSn3" shows "3" in row 14 from top of column 2 representing the FS pattern of DSX3, "3" in row 15 from top of column 2 representing the FS pattern of DSX4, "1" in row 16 from top of column 2 representing the FS pattern of DSX5, and "4" in row 17 from top of column 2 representing the FS pattern of DSX6, as "4133" in the order of DSX6, DSX5, DSX4, and DSX3.

Likewise, row 18 from top in column 5 "FSn0 FSn1 FSn2 FSn3" shows "3" in row 15 from top of column 2 representing the FS pattern of DSX4, "1" in row 16 from top of column 2 representing the FS pattern of DSX5, "4" in row 17 from top of column 2 representing the FS pattern of DSX6, and "1" in row 18 from top of column 2 representing the FS pattern of DSX7, as "1413" in the order of DSX7, DSX6, DSX5, and DSX4.

Likewise, row 19 from top in column 5 "FSn0 FSn1 FSn2 FSn3" shows "1" in row 16 from top of column 2 representing the FS pattern of DSX5, "4" in row 17 from top of column 2 representing the FS pattern of DSX6, "1" in row 18 from top of column 2 representing the FS pattern of DSX7, and "5" in row 19 from top of column 2 representing the FS pattern of DSX8, as "5141" in the order of DSX8, DSX7, DSX6, and DSX5.

Likewise, row 20 from top in column 5 "FSn0 FSn1 FSn2 FSn3" shows "4" in row 17 from top of column 2 representing the FS pattern of DSX6, "1" in row 18 from top of column 2 representing the FS pattern of DSX7, "5" in row 19 from top of column 2 representing the FS pattern of DSX8, and "5" in row 20 from top of column 2 representing the FS pattern of DSX, as "5514" in the order of DSX, DSX8, DSX7, and DSX6.

Likewise, row 21 from top in column 5 "FSn0 FSn1 FSn2 FSn3" shows "1" in row 18 from top of column 2 representing the-FS pattern of DSX7, "5" in row 19 from top of column 2 representing the FS pattern of DSX8, "5" in row 20 from top of column 2 representing the FS pattern of DSX, and "4" in row 21 from top of column 2 representing the FS pattern of DSX10, as "4551" in the order of DSX10, DSX, DSX8, and DSX7.

Now continuing to FIG. 22, row 1 from top in column 5 "FSn0 FSn1 FSn2 FSn3" of FIG. 22 shows "5" in row 19 from top of column 2 of FIG. 21 representing the FS pattern of DSX8, "5" in row 20 from top of column 2 of FIG. 21 representing the FS pattern of DSX9, "4" in row 21 from top of column 2 of FIG. 21 representing the FS pattern of DSX10, and "3" in row 1 from top of column 2 of FIG. 22 representing the FS pattern of DSX11, as "3455" in the order of DSX11, DSX10, DSX, and DSX8.

Likewise, row 2 from top in column 5 "FSn0 FSn1 FSn2 FSn3" shows "5" in row 20 from top of column 2 of FIG.

21 representing the FS pattern of DSX9, "4" in row 21 from top of column 2 of FIG. 21 representing the FS pattern of DSX10, "3" in row 1 from top of column 2 of FIG. 22 representing the FS pattern of DSX11, and "4" in row 2 from top of column 2 of FIG. 22 representing the FS pattern of DSX12, as "4345" in the order of DSX12, DSX11, DSX10, and DSX9.

Likewise, row 3 from top in column 5 "FSn0 FSn1 FSn2 FSn3" shows "4" in row 21 from top of column 2 of FIG. 21 representing the FS pattern of DSX10, "3" in row 1 from top of column 2 of FIG. 22 representing the FS pattern of DSX11, "4" in row 2 from top of column 2 of FIG. 22 representing the FS pattern of DSX12, and "6" in row 3 from top of column 2 of FIG. 22 representing the FS pattern of DSX13, as "6434" in the order of DSX13, DSX12, DSX11, and DSX10.

Likewise, row 4 from top in column 5 "FSn0 FSn1 FSn2 FSn3" shows "3" in row 1 from top of column 2 representing the FS pattern of DSX11, "4" in row 2 from top of column 2 representing the FS pattern of DSX12, "6" in row 3 from top of column 2 representing the FS pattern of DSX13, and "6" in row 4 from top of column 2 representing the FS pattern of DSX14, as "6643" in the order of DSX14, DSX13, DSX12, and DSX11.

Likewise, row 5 from top in column 5 "FSn0 FSn1 FSn2 FSn3" shows "4" in row 2 from top of column 2 representing the FS pattern of DSX12, "6" in row 3 from top of column 2 representing the FS pattern of DSX13, "6" in row 4 from top of column 2 representing the FS pattern of DSX14, and "3" in row 5 from top of column 2 representing the FS pattern of DSX15, as "3664" in the order of DSX15, DSX14, DSX13, and DSX12.

Likewise, row 6 from top in column 5 "FSn0 FSn1 FSn2 FSn3" shows "6" in row 3 from top of column 2 representing the FS pattern of DSX13, "6" in row 4 from top of column 2 representing the FS pattern of DSX14, "3" in row 5 from top of column 2 representing the FS pattern of DSX15, and "5" in row 6 from top of column 2 representing the FS pattern of DSX16, as "5366" in the order of DSX16, DSX15, DSX14, and DSX13.

Likewise, row 7 from top in column 5 "FSn0 FSn1 FSn2 FSn3" shows "6" in row 4 from top of column 2 representing the FS pattern of DSX14, "3" in row 5 from top of column 2 representing the FS pattern of DSX15, "5" in row 6 from top of column 2 representing the FS pattern of DSX16, and "3" in row 7 from top of column 2 representing the FS pattern of DSX17, as "3536" in the order of DSX17, DSX16, DSX15, and DSX14.

Likewise, row 8 from top in column 5 "FSn0 FSn1 FSn2 FSn3" shows "3" in row 5 from top of column 2 representing the FS pattern of DSX15, "5" in row 6 from top of column 2 representing the FS pattern of DSX16, "3" in row 7 from top of column 2 representing the FS pattern of DSX17, and "2" in row 8 from top of column 2 representing the FS pattern of DSX18, as "2353" in the order of DSX18, DSX17, DSX16, and DSX15.

Likewise, row 9 from top in column 5 "FSn0 FSn1 FSn2 FSn3" shows "5" in row 6 from top of column 2 representing the FS pattern of DSX16, "3" in row 7 from top of column 2 representing the FS pattern of DSX17, "2" in row 8 from top of column 2 representing the FS pattern of DSX18, and "2" in row 9 from top of column 2 representing the FS pattern of DSX19, as "2235" in the order of DSX19, DSX18, DSX17, and DSX16.

Likewise, row 10 from top in column 5 "FSn0 FSn1 FSn2 FSn3" shows "3" in row 7 from top of column 2 representing the FS pattern of DSX17, "2" in row 8 from top of column 2 representing the FS pattern of DSX18, "2" in row 9 from top of column 2 representing the FS pattern of DSX19, and "5" in row 10 from top of column 2 representing the FS pattern of DSX20, as "5223" in the order of DSX20, DSX19, DSX18, and DSX17.

Likewise, row 11 from top in column 5 "FSn0 FSn1 FSn2 FSn3" shows "2" in row 8 from top of column 2 representing the FS pattern of DSX18, "2" in row 9 from top of column 2 representing the FS pattern of DSX19, "5" in row 10 from top of column 2 representing the FS pattern of DSX20, and "6" in row 11 from top of column 2 representing the FS pattern of DSX21, as "6522" in the order of DSX21, DSX20, DSX19, and DSX18.

Likewise, row 12 from top in column 5 "FSn0 FSn1 FSn2 FSn3" shows "2" in row 9 from top of column 2 representing the FS pattern of DSX19, "5" in row 10 from top of column 2 representing the FS pattern of DSX20, "6" in row 11 from top of column 2 representing the FS pattern of DSX21, and "5" in row 12 from top of column 2 representing the FS pattern of DSX22, as "5652" in the order of DSX22, DSX21, DSX20, and DSX19.

Likewise, row 13 from top in column 5 "FSn0 FSn1 FSn2 FSn3" shows "5" in row 10 from top of column 2 representing the FS pattern of DSX20, "6" in row 11 from top of column 2 representing the FS pattern of DSX21, "5" in row 12 from top of column 2 representing the FS pattern of DSX22, and "1" in row 13 from top of column 2 representing the FS pattern of DSX23, as "1565" in the order of DSX23, DSX22, DSX21, and DSX20

Likewise, row 14 from top in column 5 "FSn0 FSn1 FSn2 FSn3" shows "6" in row 11 from top of column 2 representing the FS pattern of DSX21, "5" in row 12 from top of column 2 representing the FS pattern of DSX22, "1" in row 13 from top of column 2 representing the FS pattern of DSX23, and "1" in row 14 from top of column 2 representing the FS pattern of DSX24, as "1156" in the order of DSX24, DSX23, DSX22, and DSX21.

Likewise, row 15 from top in column 5 "FSn0 FSn1 FSn2 FSn3" shows "5" in row 12 from top of column 2 representing the FS pattern of DSX22, "1" in row 13 from top of column 2 representing the FS pattern of DSX23, "1" in row 14 from top of column 2 representing the FS pattern of DSX24, and "6" in row 15 from top of column 2 representing the FS pattern of DSX25, as "6115" in the order of DSX25, DSX24, DSX23, and DSX22.

Likewise, row 16 from top in column 5 "FSn0 FSn1 FSn2 FSn3" shows "1" in row 13 from top of column 2 representing the FS pattern of DSX23, "1" in row 14 from top of column 2 representing the FS pattern of DSX24, "6" in row 15 from top of column 2 representing the FS pattern of DSX25, and "2" in row 16 from top of column 2 representing the FS pattern of DSX26, as "2611" in the order of DSX26, DSX25, DSX24, and DSX23.

Likewise, row 17 from top in column 5 "FSn0 FSn1 FSn2 FSn3" shows "1" in row 14 from top of column 2 representing the FS pattern of DSX24, "6" in row 15 from top of column 2 representing the FS pattern of DSX25, "2" in row 16 from top of column 2 representing the FS pattern of DSX26, and "6" in row 17 from top of column 2 representing the FS pattern of DSX27, as "6261" in the order of DSX27, DSX26, DSX25, and DSX24.

Likewise, row 18 from top in column 5 "FSn0 FSn1 FSn2 FSn3" shows "6" in row 15 from top of column 2 representing the FS pattern of DSX25, "2" in row 16 from top of column 2 representing the FS pattern of DSX26, "6" in row 17 from top of column 2 representing the FS pattern of DSX27, and "4" in row 18 from top of column 2 representing the FS pattern of DSX28, as "4626" in the order of DSX28, DSX27, DSX26, and DSX25.

Likewise, row 19 from top in column 5 "FSn0 FSn1 FSn2 FSn3" shows "2" in row 16 from top of column 2 representing the FS pattern of DSX26, "6" in row 17 from top of column 2 representing the FS pattern of DSX27, "4" in row 18 from top of column 2 representing the FS pattern of DSX28, and "4" in row 19 from top of column 2 representing the FS pattern of DSX29, as "4462" in the order of DSX29, DSX28, DSX27, and DSX26.

Likewise, row 20 from top in column 5 "FSn0 FSn1 FSn2 FSn3" shows "6" in row 17 from top of column 2 representing the FS pattern of DSX27, "4" in row 18 from top of column 2 representing the FS pattern of DSX28, "4" in row 19 from top of column 2 representing the FS pattern of DSX29, and "2" in row 20 from top of column 2 representing the FS pattern of DSX30, as "2446" in the order of DSX30, DSX29, DSX28, and DSX27.

As described above, nth row from top in column 5 "FSn0 FSn1 FSn2 FSn3" in FIGS. 21 and 22 (provided that the row numbers are assigned throughout FIG. 21 and FIG. 22) shows the FS pattern of n-3 row from top of column 2, the FS pattern in n-2 row from top of column 2, the FS pattern in n-1 row from top of column 2, and the FS pattern of nth row from top of column 2, in the order of the pattern of nth row from top of column 2, the pattern of n-1 row from top in column 2, the pattern of n-2 row from top of column 2, and the pattern of n-3 row from top of column 2. It should be noted that n is up to 30.

Next, column 6 "FSn0 FSn1 FSn3 FSn4" in each of the tables of FIG. 21 and FIG. 22 shows numerals representing four FS patterns in column 2. To be more specific, row 5 from top in column 6 "FSn0 FSn1 FSn3 FSn4" shown in FIG. 21 shows "7" in row 1 from top of column 2 representing the FS pattern of PrA0, "7" in row 2 from top of column 2 representing the FS pattern of PrA1, "7" in row 4 from top of column 2 representing the FS pattern of PrA3, and "7" in row 5 from top of column 2 representing the FS pattern of PrA4, as "7777" in the order of PrA4, PrA3, PrA1, and PrA0.

Likewise, row 6 from top in column 6 "FSn0 FSn1 FSn3 FSn4" shows "7" in row 2 from top of column 2 representing the FS pattern of PrA1, "7" in row 3 from top of column 2 representing the FS pattern of PrA2, "7" in row 5 from top of column 2 representing the FS pattern of PrA4, and "1" in row 6 from top of column 2 representing the FS pattern of PrA5, as "1777" in the order of PrA5, PrA4, PrA2, and PrA1.

Likewise, row 7 from top in column 6 "FSn0 FSn1 FSn3 FSn4" shows "7" in row 3 from top of column 2 representing the FS pattern of PrA2, "7" in row 4 from top of column 2 representing the FS pattern of PrA3, "1" in row 6 from top of column 2 representing the FS pattern of PrA5, and "4" in row 7 from top of column 2 representing the FS pattern of PrA6, as "4177" in the order of PrA6, PrA5, PrA3, and PrA2.

Likewise, row 8 from top in column 6 "FSn0 FSn1 FSn3 FSn4" shows "7" in row 4 from top of column 2 representing the FS pattern of PrA3, "7" in row 5 from top of column 2 representing the FS pattern of PrA4, "4" in row 7 from top of column 2 representing the FS pattern of PrA6, and "7" in row 8 from top of column 2 representing the FS pattern of PrA7, as "7477" in the order of PrA7, PrA6, PrA4, and PrA3.

Likewise, row 9 from top in column 6 "FSn0 FSn1 FSn3 FSn4" shows "7" in row 5 from top of column 2 representing the FS pattern of PrA4, "1" in row 6 from top of column 2 representing the FS pattern of PrA5, "7" in row 8 from top of column 2 representing the FS pattern of PrA7, and "4" in row 9 from top of column 2 representing the FS pattern of PrA8, as "4717" in the order of PrA8, PrA7, PrA5, and PrA4.

Likewise, row 10 from top in column 6 "FSn0 FSn1 FSn3 FSn4" shows "1" in row 6 from top of column 2 representing the FS pattern of PrA5, "4" in row 7 from top of column 2 representing the FS pattern of PrA6, "4" in row 9 from top of column 2 representing the FS pattern of PrA8, and "2" in row 10 from top of column 2 representing the FS pattern of PrA9, as "2441" in the order of PrA9, PrA8, PrA6, and PrA5.

Likewise, row 11 from top in column 6 "FSn0 FSn1 FSn3 FSn4" shows "4" in row 7 from top of column 2 representing the FS pattern of PrA6, "7" in row 8 from top of column 2 representing the FS pattern of PrA7, "2" in row 10 from top of column 2 representing the FS pattern of PrA9, and "0" in row 11 from top of column 2 representing the FS pattern of DSX0, as "0274" in the order of DSX0, PrA9, PrA7, and PrA6.

Likewise, row 12 from top in column 6 "FSn0 FSn1 FSn3 FSn4" shows "7" in row 8 from top of column 2 representing the FS pattern of PrA7, "4" in row 9 from top of column 2 representing the FS pattern of PrA8, "0" in row 11 from top of column 2 representing the FS pattern of DSX0, and "1" in row 12 from top of column 2 representing the FS pattern of DSX1, as "1047" in the order of DSX1, DSX0, PrA8, and PrA7.

Likewise, row 13 from top in column 6 "FSn0 FSn1 FSn3 FSn4" shows "4" in row 9 from top of column 2 representing the FS pattern of PrA8, "2" in row 10 from top of column 2 representing the FS pattern of PrA9, "1" in row 12 from top of column 2 representing the FS pattern of DSX1, and "2" in row 13 from top of column 2 representing the FS pattern of DSX2, as "2124" in the order of DSX2, DSX1, PrA9, and PrA8.

Likewise, row 14 from top in column 6 "FSn0 FSn1 FSn3 FSn4" shows "2" in row 10 from top of column 2 representing the FS pattern of PrA9, "0" in row 11 from top of column 2 representing the FS pattern of DSX0, "2" in row 13 from top of column 2 representing the FS pattern of DSX2, and "3" in row 14 from top of column 2 representing the FS pattern of DSX3, as "3202" in the order of DSX3, DSX2, DSX0, and PrA9.

Likewise, row 15 from top in column 6 "FSn0 FSn1 FSn3 FSn4" shows "0" in row 11 from top of column 2 representing the FS pattern of DSX0, "1" in row 12 from top of column 2 representing the FS pattern of DSX1, "3" in row 14 from top of column 2 representing the FS pattern of DSX3, and "3" in row 15 from top of column 2 representing the FS pattern of DSX4, as "3310" in the order of DSX4, DSX3, DSX1, and DSX0.

Likewise, row 16 from top in column 6 "FSn0 FSn1 FSn3 FSn4" shows "1" in row 12 from top of column 2 representing the FS pattern of DSX1, "2" in row 13 from top of column 2 representing the FS pattern of DSX2, "3" in row 15 from top of column 2 representing the FS pattern of DSX4, and "1" in row 16 from top of column 2 representing the FS pattern of DSX5, as "1321" in the order of DSX5, DSX4, DSX2, and DSX1.

Likewise, row 17 from top in column 6 "FSn0 FSn1 FSn3 FSn4" shows "2" in row 13 from top of column 2 representing the FS pattern of DSX2, "3" in row 14 from top of column 2 representing the FS pattern of DSX3, "1" in row 16 from top of column 2 representing the FS pattern of DSX5, and "4" in row 17 from top of column 2 representing the FS pattern of DSX6, as "4132" in the order of DSX6, DSX5, DSX3, and DSX2.

Likewise, row 18 from top in column 6 "FSn0 FSn1 FSn3 FSn4" shows "3" in row 14 from top of column 2 representing the FS pattern of DSX3, "3" in row 15 from top of column 2 representing the FS pattern of DSX4, "4" in row 17 from top of column 2 representing the FS pattern of DSX6, and "1" in row 18 from top of column 2 representing the FS pattern of DSX7, as "1433" in the order of DSX7, DSX6, DSX4, and DSX3.

Likewise, row 19 from top in column 6 "FSn0 FSn1 FSn3 FSn4" shows "3" in row 15 from top of column 2 representing the FS pattern of DSX4, "1" in row 16 from top of column 2 representing the FS pattern of DSX5, "1" in row 18 from top of column 2 representing the FS pattern of DSX7, and "5" in row 19 from top of column 2 representing the FS pattern of DSX8, as "5113" in the order of DSX8, DSX7, DSX5, and DSX4.

Likewise, row 20 from top in column 6 "FSn0 FSn1 FSn3 FSn4" shows "1" in row 16 from top of column 2 representing the FS pattern of DSX5, "4" in row 17 from top of column 2 representing the FS pattern of DSX6, "5" in row 19 from top of column 2 representing the FS pattern of DSX8, and "5" in row 20 from top of column 2 representing the FS pattern of DSX, as "5541" in the order of DSX, DSX8, DSX6, and DSX5.

Likewise, row 21 from top in column 6 "FSn0 FSn1 FSn3 FSn4" shows "4" in row 17 from top of column 2 representing the FS pattern of DSX6, "1" in row 18 from top of column 2 representing the FS pattern of DSX7, "5" in row 20 from top of column 2 representing the FS pattern of DSX, and "4" in row 21 from top of column 2 representing the FS pattern of DSX10, as "4514" in the order of DSX10, DSX, DSX7, and DSX6.

Now, continuing to FIG. 22, row 1 from top in column 6 "FSn0 FSn1 FSn3 FSn4" of FIG. 22 shows "1" in row 18 from top of column 2 of FIG. 21 representing the FS pattern of DSX7, "5" in row 19 from top of column 2 of FIG. 21 representing the FS pattern of DSX8, "4" in row 21 from top of column 2 of FIG. 21 representing the FS pattern of DSX10, and "3" in row 1 from top of column 2 of FIG. 22 representing the FS pattern of DSX11, as "3451" in the order of DSX11, DSX10, DSX8, and DSX7.

Likewise, row 2 from top in column 6 "FSn0 FSn1 FSn3 FSn4" of FIG. 22 shows "5" in row 19 from top of column 2 of FIG. 21 representing the FS pattern of DSX8, "5" in row 20 from top of column 2 of FIG. 21 representing the FS pattern of DSX9, "3" in row 1 from top of column 2 of FIG. 22 representing the FS pattern of DSX11, and "4" in row 2 from top of column 2 of FIG. 22 representing the FS pattern of DSX12, as "4355" in the order of DSX12, DSX11, DSX, and DSX8.

Likewise, row 3 from top in column 6 "FSn0 FSn1 FSn3 FSn4" of FIG. 22 shows "5" in row 20 from top of column 2 of FIG. 21 representing the FS pattern of DSX9, "4" in row 21 from top of column 2 of FIG. 21 representing the FS pattern of DSX10, "4" in row 2 from top of column 2 of FIG. 22 representing the FS pattern of DSX12, and "6" in row 3 from top of column 2 of FIG. 22 representing the FS pattern of DSX13, as "6445" in the order of DSX13, DSX12, DSX10, and DSX9.

Likewise, row 4 from top in column 6 "FSn0 FSn1 FSn3 FSn4" of FIG. 22 shows "4" in row 21 from top of column 2 of FIG. 21 representing the FS pattern of DSX10, "3" in row 1 from top of column 2 of FIG. 22 representing the FS pattern of DSX11, "6" in row 3 from top of column 2 of FIG. 22 representing the FS pattern of DSX13, and "6" in row 4 from top of column 2 of FIG. 22 representing the FS pattern of DSX14, as "6634" in the order of DSX14, DSX13, DSX11, and DSX10.

Likewise, row 5 from top in column 6 "FSn0 FSn1 FSn3 FSn4" shows "3" in row 1 from top of column 2 representing the FS pattern of DSX11, "4" in row 2 from top of column 2 representing the FS pattern of DSX12, "6" in row 4 from top of column 2 representing the FS pattern of DSX14, and "3" in row 5 from top of column 2 representing the FS pattern of DSX15, as "3643" in the order of DSX15, DSX14, DSX12, and DSX11.

Likewise, row 6 from top in column 6 "FSn0 FSn1 FSn3 FSn4" shows "4" in row 2 from top of column 2 representing the FS pattern of DSX12, "6" in row 3 from top of column 2 representing the FS pattern of DSX13, "3" in row 5 from top of column 2 representing the FS pattern of DSX15, and "5" in row 6 from top of column 2 representing the FS pattern of DSX16, as "5364" in the order of DSX16, DSX15, DSX13, and DSX12.

Likewise, row 7 from top in column 6 "FSn0 FSn1 FSn3 FSn4" shows "6" in row 3 from top of column 2 representing the FS pattern of DSX13, "6" in row 4 from top of column 2 representing the FS pattern of DSX14, "5" in row 6 from top of column 2 representing the FS pattern of DSX16, and "3" in row 7 from top of column 2 representing the FS pattern of DSX17, as "3566" in the order of DSX17, DSX16, DSX14, and DSX13.

Likewise, row 8 from top in column 6 "FSn0 FSn1 FSn3 FSn4" shows "6" in row 4 from top of column 2 representing the FS pattern of DSX14, "3" in row 5 from top of column 2 representing the FS pattern of DSX15, "3" in row 7 from top of column 2 representing the FS pattern of DSX17, and "2" in row 8 from top of column 2 representing the FS pattern of DSX18, as "2336" in the order of DSX18, DSX17, DSX15, and DSX14.

Likewise, row 9 from top in column 6 "FSn0 FSn1 FSn3 FSn4" shows "3" in row 5 from top of column 2 representing the FS pattern of DSX15, "5" in row 6 from top of column 2 representing the FS pattern of DSX16, "2" in row 8 from top of column 2 representing the FS pattern of DSX18, and "2" in row 9 from top of column 2 representing the FS pattern of DSX19, as "2253" in the order of DSX19, DSX18, DSX16, and DSX15.

Likewise, row 10 from top in column 6 "FSn0 FSn1 FSn3 FSn4" shows "5" in row 6 from top of column 2 representing the FS pattern of DSX16, "3" in row 7 from top of column 2 representing the FS pattern of DSX17, "2" in row 9 from top of column 2 representing the FS pattern of DSX19, and "5" in row 10 from top of column 2 representing the FS pattern of DSX20, as "5235" in the order of DSX20, DSX19, DSX17, and DSX16.

Likewise, row 11 from top in column 6 "FSn0 FSn1 FSn3 FSn4" shows "3" in row 7 from top of column 2 representing the FS pattern of DSX17, "2" in row 8 from top of column 2 representing the FS pattern of DSX18, "5" in row 10 from top of column 2 representing the FS pattern of DSX20, and "6" in row 11 from top of column 2 representing the FS pattern of DSX21, as "6523" in the order of DSX21, DSX20, DSX18, and DSX17.

Likewise, row 12 from top in column 6 "FSn0 FSn1 FSn3 FSn4" shows "2" in row 8 from top of column 2 representing the FS pattern of DSX18, "2" in row 9 from top of column 2 representing the FS pattern of DSX19, "6" in row 11 from top of column 2 representing the FS pattern of DSX21, and "5" in row 12 from top of column 2 representing the FS pattern of DSX22, as "5622" in the order of DSX22, DSX21, DSX19, and DSX18.

Likewise, row 13 from top in column 6 "FSn0 FSn1 FSn3 FSn4" shows "2" in row 9 from top of column 2 representing the FS pattern of DSX19, "5" in row 10 from top of column 2 representing the FS pattern of DSX20, "5" in row 12 from top of column 2 representing the FS pattern of DSX22, and "1" in row 13 from top of column 2 representing the FS pattern of DSX23, as "1552" in the order of DSX23, DSX22, DSX20, and DSX19.

Likewise, row 14 from top in column 6 "FSn0 FSn1 FSn3 FSn4" shows "5" in row 10 from top of column 2 representing the FS pattern of DSX20, "6" in row 11 from top of column 2 representing the FS pattern of DSX21, "1" in row 13 from top of column 2 representing the FS pattern of DSX23, and "1" in row 14 from top of column 2 representing the FS pattern of DSX24, as "1165" in the order of DSX24, DSX23, DSX21, and DSX20

Likewise, row 15 from top in column 6 "FSn0 FSn1 FSn3 FSn4" shows "6" in row 11 from top of column 2 representing the FS pattern of DSX21, "5" in row 12 from top of column 2 representing the FS pattern of DSX22, "1" in row 14 from top of column 2 representing the FS pattern of DSX24, and "6" in row 15 from top of column 2 representing the FS pattern of DSX25, as "6156" in the order of DSX25, DSX24, DSX22, and DSX21.

Likewise, row 16 from top in column 6 "FSn0 FSn1 FSn3 FSn4" shows "5" in row 12 from top of column 2 representing the FS pattern of DSX22, "1" in row 13 from top of column 2 representing the FS pattern of DSX23, "6" in row 15 from top of column 2 representing the FS pattern of DSX25, and "2" in row 16 from top of column 2 representing the FS pattern of DSX26, as "2615" in the order of DSX26, DSX25, DSX23, and DSX22.

Likewise, row 17 from top in column 6 "FSn0 FSn1 FSn3 FSn4" shows "1" in row 13 from top of column 2 representing the FS pattern of DSX23, "1" in row 14 from top of column 2 representing the FS pattern of DSX24, "2" in row 16 from top of column 2 representing the FS pattern of DSX26, and "6" in row 17 from top of column 2 representing the FS pattern of DSX27, as "6211" in the order of DSX27, DSX26, DSX24, and DSX23.

Likewise, row 18 from top in column 6 "FSn0 FSn1 FSn3 FSn4" shows "1" in row 14 from top of column 2 representing the FS pattern of DSX24, "6" in row 15 from top of column 2 representing the FS pattern of DSX25, "6" in row 17 from top of column 2 representing the FS pattern of DSX27, and "4" in row 18 from top of column 2 representing the FS pattern of DSX28, as "4661" in the order of DSX28, DSX27, DSX25, and DSX24.

Likewise, row 19 from top in column 6 "FSn0 FSn1 FSn3 FSn4" shows "6" in row 15 from top of column 2 representing the FS pattern of DSX25, "2" in row 16 from top of column 2 representing the FS pattern of DSX26, "4" in row 18 from top of column 2 representing the FS pattern of DSX28, and "4" in row 19 from top of column 2 representing the FS pattern of DSX29, as "4426" in the order of DSX29, DSX28, DSX26, and DSX25.

Likewise, row 20 from top in column 6 "FSn0 FSn1 FSn3 FSn4" shows "2" in row 16 from top of column 2 representing the FS pattern of DSX26, "6" in row 17 from top of column 2 representing the FS pattern of DSX27, "4" in row 19 from top of column 2 representing the FS pattern of DSX29, and "2" in row 20 from top of column 2 representing the FS pattern of DSX30, as "2462" in the order of DSX30, DSX29, DSX27, and DSX26.

As described above, nth row from top in column 6 "FSn0 FSn1 FSn3 FSn4" in FIGS. 21 and 22 (provided that the row numbers are assigned throughout FIG. 21 and FIG. 22) shows the FS pattern of n-4 row from top of column 2, the FS pattern in n-3 row from top of column 2, the FS pattern in n-1 row from top of column 2, and the FS pattern of nth row from top of column 2, in the order of the pattern of nth row from top of column 2, the pattern of n-1 row from top in column 2, the pattern of n-3 row from top of column 2, and the pattern of n-4 row from top of column 2. It should be noted that n is up to 30.

The following describes FIG. 23 and FIG. 24 which illustrate the reference information for extracting the frame number candidates for data sectors 1 through 15. As with row 3 in FIG. 21 and FIG. 22, column 3 "FSn0 FSn1" in each of the tables of FIG. 23 and FIG. 24 shows numerals representing two FS patterns in column 2. To be more specific, row 1 from top of column 3 "FSn0 FSn1" shows "2" in row 20 from top of column 2 in FIG. 22 or FIG. 24 representing the FS pattern of DSX30 of the immediately preceding data sector and "0" in row 1 from top of column 2 in FIG. 23 representing the FS pattern of DSX0, as "02" in the order of DSX0 and DSX30.

Likewise, row 2 from top of column 3 "FSn0 FSn1" shows "0" in row 1 from top of column 2 representing the FS pattern of DSX0 and "1" in row 2 from top of column 2 representing the FS pattern of DSX1, as "10" in the order of DSX1 and DSX0.

Likewise, row 3 from top of column 3 "FSn0 FSn1" shows "1" in row 2 from top of column 2 representing the FS pattern of DSX1 and "2" in row 3 from top of column 2 representing the FS pattern of DSX2, as "21" in the order of DSX2 and DSX1.

In what follows, as described above, in FIG. 23 and FIG. 24, nth row from top of column 3 "FSn0 FSn1" shows (if the row numbers are assigned through FIG. 23 and FIG. 24) the FS pattern on row n-1 from top of column 2 and the FS pattern of nth row from top of column 2 in the order of the FS pattern on nth row from top of column 2 and the FS pattern on n-1 row from top of column 2. It should be noted that n is up to 30.

Next, as with column 4 in FIG. 21 and FIG. 22, column 4 "FSn0 FSn1 FSn2" in the tables of FIG. 23 and FIG. 24 shows the numerals representing three FS patterns in column 2. To be more specific, row 1 from top of column 4 "FSn0 FSn1 FSn2" shows "4" in row 19 from top of column 2 of FIG. 22 or FIG. 24 representing the FS pattern of DSX29 of the immediately preceding data sector, "2" in row 20 from top of column 2 of FIG. 22 or FIG. 24 representing the FS pattern of DSX30, and "0" in row 1 from top of column 2 of FIG. 23 representing the FS pattern of DSX0, as "024" in the order of DSX0, DSX30, and DSX29.

Likewise, row 2 from top of column 4 "FSn0 FSn1 FSn2" shows "2" in row 20 from top of column 2 of FIG. 22 or FIG. 24 representing the FS pattern of DSX30, "0" in row 1 from top of column 2 of FIG. 23 representing the FS pattern of DSX0, and "1" in row 2 from top of column 2 of FIG. 23 representing the FS pattern of DSX1, as "102" in the order of DSX1, DSX0, and DSX30.

Likewise, row 3 from top of column 4 "FSn0 FSn1 FSn2" shows "0" in row 1 from top of column 2 representing the FS pattern of DSX0, "1" in row 2 from top of column 2 representing the FS pattern of DSX1, and "2" in row 3 from top of column 2 representing the FS pattern of DSX2, as "210" in the order of DSX2, DSX1, and DSX0.

In what follows, as described above, in FIG. 23 and FIG. 24, nth row from top of column 4 "FSn0 FSn1 FSn2" shows (if the row numbers are assigned through FIG. 23 and FIG. 24) the FS pattern on row n-2 from top of column 2, the FS pattern in row n-1 from top of column 2, and the FS pattern of nth row from top of column 2 in the order of the FS pattern on nth row from top of column 2, FS pattern in n-1 row from top of column 2, and the FS pattern on n-2 row from top of column 2. It should be noted that n is up to 30.

Next, as with column 5 in FIG. 21 and FIG. 22, column 5 "FSn0 FSn1 FSn2 FSn3" in the tables of FIG. 23 and FIG. 24 shows the numerals representing four FS patterns in column 2. To be more specific, row 1 from top of column 5 "FSn0 FSn1 FSn2 FSn3" shows "4" in row 18 from top of column 2 of FIG. 22 or FIG. 24 representing the FS pattern of DSX28, "4" in row 19 from top of column 2 of FIG. 22 or FIG. 24 representing the FS pattern of DSX29, "2" in row 20 from top of column 2 in FIG. 22 or FIG. 24 representing the FS pattern of DSX30, and "0" in row 1 from top of column 2 of FIG. 23 representing the FS pattern of DSX0, as "0244" in the order of DSX0, DSX30, DSX29, and DSX28.

Likewise, row 2 from top of column 5 "FSn0 FSn1 FSn2 FSn3" shows "4" in row 19 from top of column 2 of FIG. 22 or FIG. 24 representing the FS pattern of DSX29, "2" in row 20 from top of column 2 of FIG. 22 or FIG. 24 representing the FS pattern of DSX30, "0" in row 1 from top of column 2 in FIG. 23 representing the FS pattern of DSX0, and "1" in row 2 from top of column 2 of FIG. 23 representing the FS pattern of DSX1, as "1024" in the order of DSX1, DSX0, DSX30, and DSX29.

Likewise, row 3 from top of column 5 "FSn0 FSn1 FSn2 FSn3" shows "2" in row 20 from top of column 2 of FIG. 22 or FIG. 24 representing the FS pattern of DSX30, "0" in row 1 from top of column 2 of FIG. 23 representing the FS pattern of DSX0, "1" in row 2 from top of column 2 in FIG. 23 representing the FS pattern of DSX1, and "2" in row 3 from top of column 2 of FIG. 23 representing the FS pattern of DSX2, as "2102" in the order of DSX2, DSX1, DSX0, and DSX30.

In what follows, as described above, in FIG. 23 and FIG. 24, nth row from top of column 5 "FSn0 FSn1 FSn2 FSn3" shows (if the row numbers are assigned through FIG. 23 and FIG. 24) the FS pattern on row n-3 from top of column 2, the FS pattern in row n-2 from top of column 2, the FS pattern in row n-1 from top of column 2, and the FS pattern of nth row from top of column 2 in the order of the FS pattern on nth row from top of column 2, FS pattern in n-1 row from top of column 2, the FS pattern in n-2 row from top of column 2, and the FS pattern on n-3 row from top of column 2. It should be noted that n is up to 30.

Next, as with column 6 in FIG. 21 and FIG. 22, column 6 "FSn0 FSn1 FSn3 FSn4" in the tables of FIG. 23 and FIG. 24 shows the numerals representing four FS patterns in column 2. To be more specific, row 1 from top of column 6 "FSn0 FSn1 FSn3 FSn4" shows "6" in row 17 from top of column 2 of FIG. 22 or FIG. 24 representing the FS pattern of DSX27, "4" in row 18 from top of column 2 of FIG. 22 or FIG. 24 representing the FS pattern of DSX28, "2" in row 20 from top of column 2 in FIG. 22 or FIG. 24 representing the FS pattern of DSX30, and "0" in row 11 from top of column 2 of FIG. 23 representing the FS pattern of DSX0, as "0246" in the order of DSX0, DSX30, DSX28, and DSX27.

Likewise, row 2 from top of column 6 "FSn0 FSn1 FSn3 FSn4" shows "4" in row 18 from top of column 2 of FIG. 22 or FIG. 24 representing the FS pattern of DSX28, "4" in row 19 from top of column 2 of FIG. 22 or FIG. 24 representing the FS pattern of DSX29, "0" in row 1 from top of column 2 in FIG. 23 representing the FS pattern of DSX0, and "1" in row 2 from top of column 2 of FIG. 23 representing the FS pattern of DSX1, as "1044" in the order of DSX1, DSX0, DSX29, and DSX28.

Likewise, row 3 from top of column 6 "FSn0 FSn1 FSn3 FSn4" shows "4" in row 19 from top of column 2 of FIG. 22 or FIG. 24 representing the FS pattern of DSX29, "2" in row 20 from top of column 2 of FIG. 22 or FIG. 24 representing the FS pattern of DSX30, "1" in row 1 from top of column 2 in FIG. 23 representing the FS pattern of DSX1, and "2" in row 3 from top of column 2 of FIG. 23 representing the FS pattern of DSX2, as "2124" in the order of DSX2, DSX1, DSX30, and DSX29.

In what follows, as described above, in FIG. 23 and FIG. 24, nth row from top of column 6 "FSn0 FSn1 FSn3 FS4" shows (if the row numbers are assigned through FIG. 23 and FIG. 24) the FS pattern on row n-4 from top of column 2, the FS pattern in row n-3 from top of column 2, the FS pattern in row n-1 from top of column 2, and the FS pattern of nth row from top of column 2 in the order of the FS pattern on nth row from top of column 2, FS pattern in n-1 row from top of column 2, the FS pattern in n-3 row from top of column 2, and the FS pattern on n-4 row from top of column 2. It should be noted that n is up to 30.

The preamble frame number candidate extracting block 55 and the data frame number candidate extracting block 56 reference the above-mentioned tables shown in FIGS. 21 through 24 to search for entered FS patterns of FSn0, FSn1, FSn2, FSn3, and FSn4 for preamble frame and data frame candidates.

Figure 11:
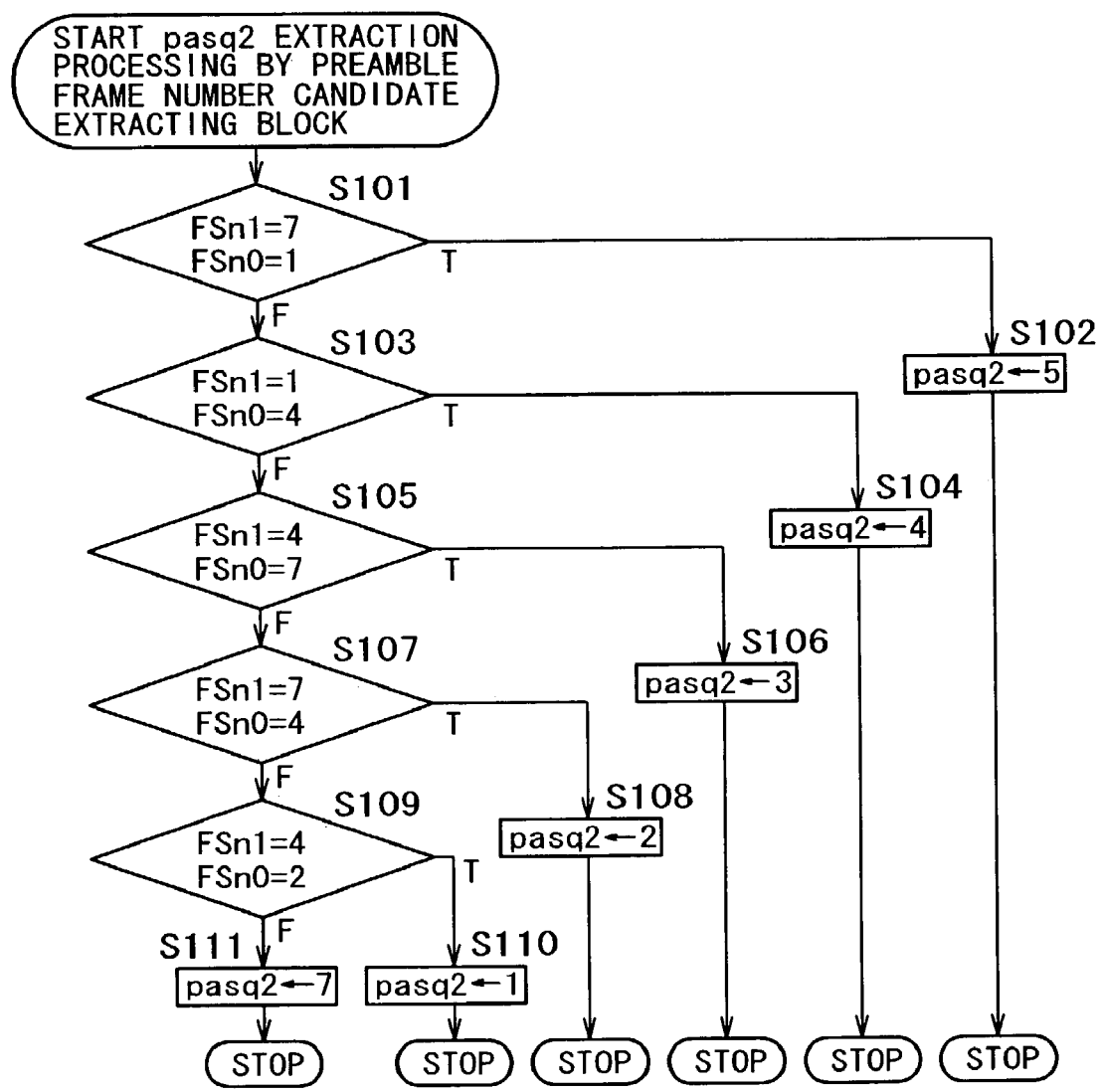
FIG. 11 is a flowchart describing the pasq2 extraction processing of a preamble frame number candidate extracting block.

To be more specific, the preamble frame number candidate extracting block 55 executes the processing shown in the flowchart of FIG. 11 to determine whether or not the same arrangement as that of the FS patterns of entered FSn0 and FSn1 is found in PrA0 through PrA9, which are the rows forming the preamble part in column 3 of FIG. 21. If a frame number candidate of the preamble part is found as a result of the above-mentioned determination, the preamble frame number candidate extracting block 55 outputs the detected frame number candidate of the preamble part to the lock-mode generating block 57 as pasq2. If the frame number candidate of the preamble part is not detected, the preamble frame number candidate extracting block 55 outputs "7" to the lock-mode generating block 57 as pasq2.

Figure 12:
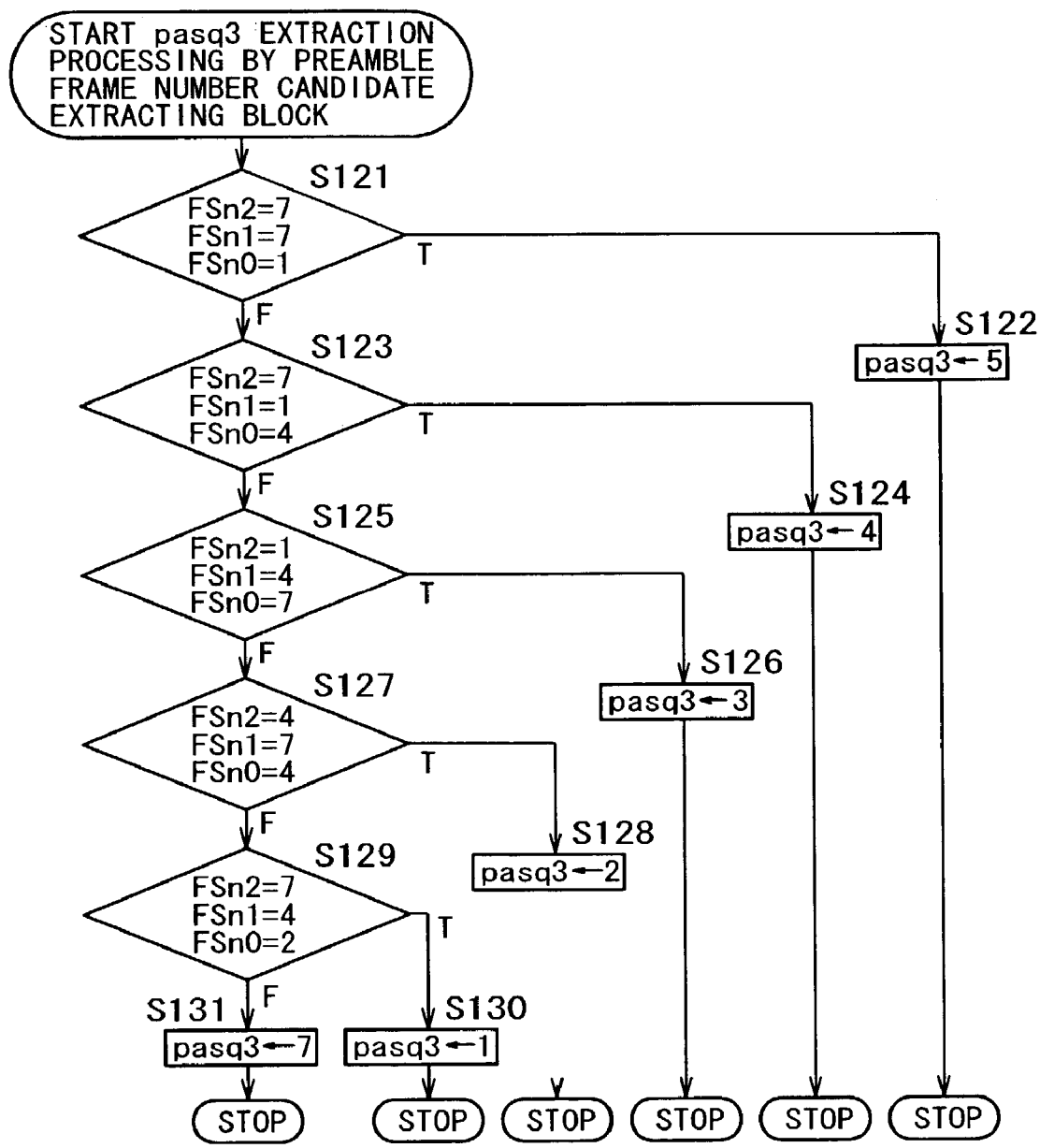
FIG. 12 is a flowchart describing the pasq3 extraction processing of the preamble frame number candidate extracting block.

In addition, the preamble frame number candidate extracting block 55 executes the processing shown in the flowchart of FIG. 12 to determine whether or not the same arrangement as that of the FS patterns of entered FSn0, FSn1, and FSn2 is found in PrA0 through PrA9, which are the rows forming the preamble part in column 4 of FIG. 21. If a frame number candidate of the preamble part is found as a result of the above-mentioned determination, the preamble frame number candidate extracting block 55 outputs the detected frame number candidate of the preamble part to the lock-mode generating block 57 as pasq3. If the frame number candidate of the preamble part is not detected, the preamble frame number candidate extracting block 55 outputs "7" to the lock-mode generating block 57 as pasq3.

Figure 13:
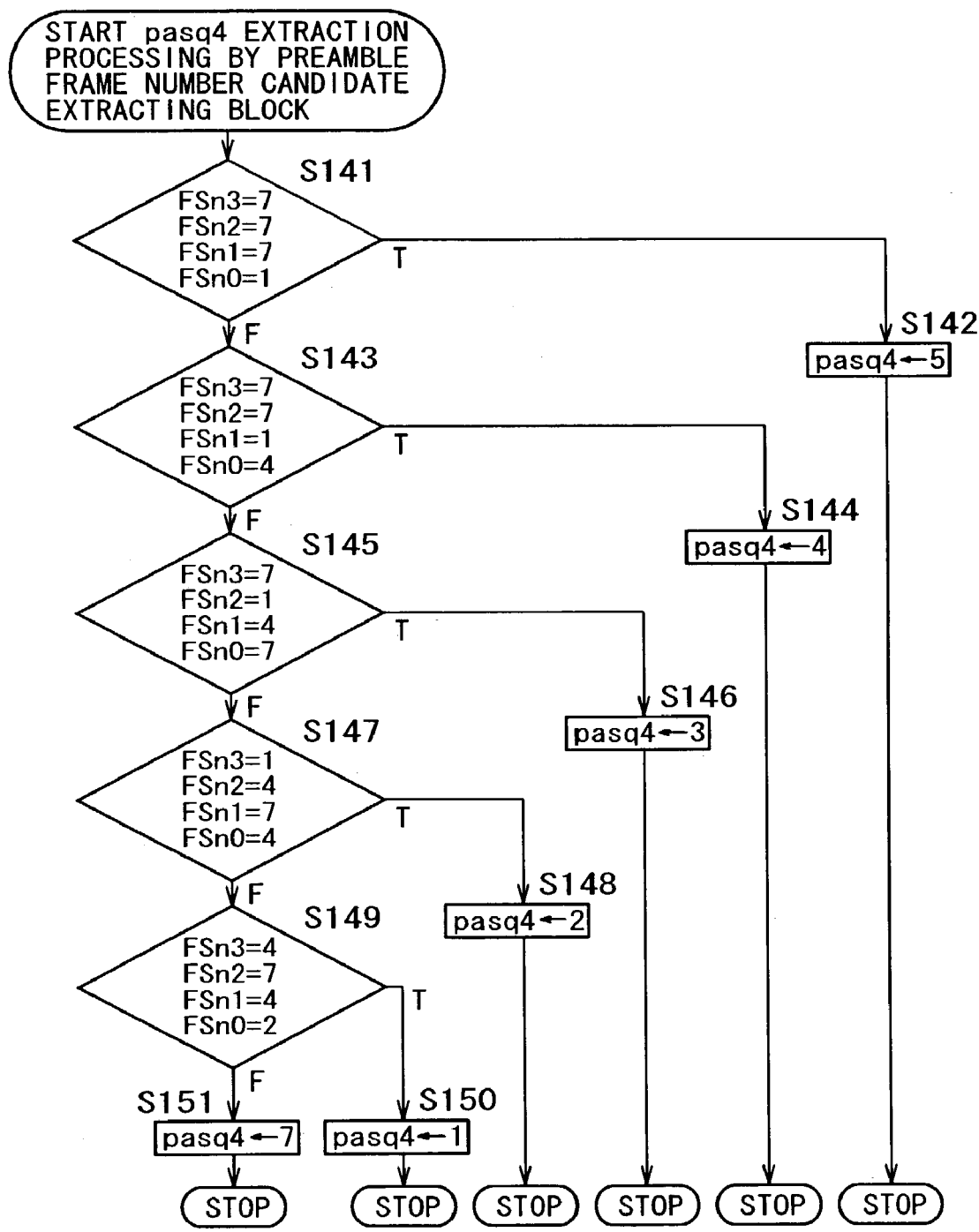
FIG. 13 is a flowchart describing the pasq4 extraction processing of the preamble frame number candidate extracting block.

Moreover, the preamble frame number candidate extracting block 55 executes the processing shown in the flowchart of FIG. 13 to determine whether or not the same arrangement as that of the FS patterns of entered FSn0, FSn1, FSn2, and FSn3 is found in PrA0 through PrA9, which are the rows forming the preamble part in column 5 of FIG. 21. If a frame number candidate of the preamble part is found as a result of the above-mentioned determination, the preamble frame number candidate extracting block 55 outputs the detected frame number candidate of the preamble part to the lock-mode generating block 57 as pasq4. If the frame number candidate of the preamble part is not detected, the preamble frame number candidate extracting block 55 outputs "7" to the lock-mode generating block 57 as pasq4.

Figure 14:
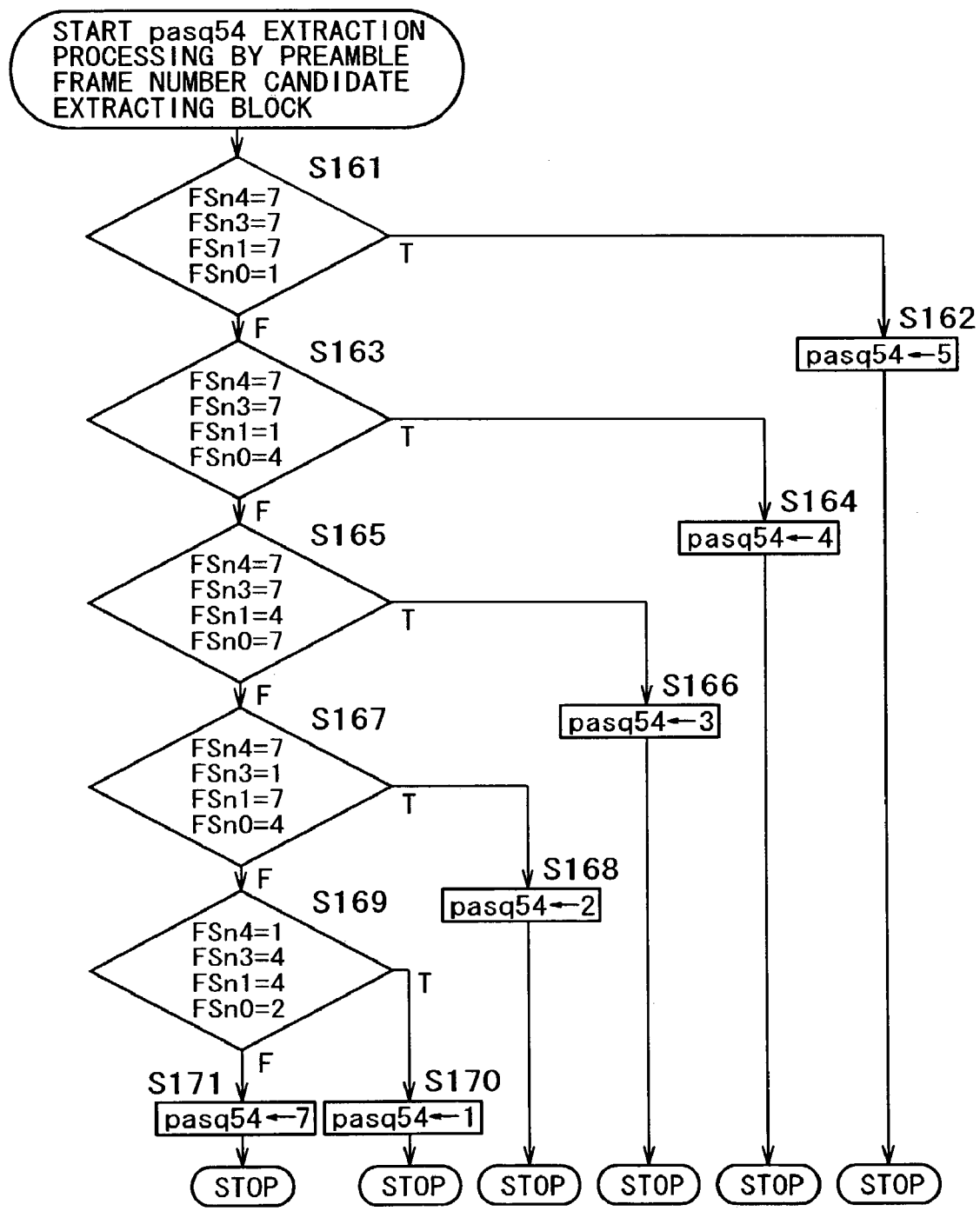
FIG. 14 is a flowchart describing the pasq54 extraction processing of the preamble frame number candidate extracting block.

Further, the preamble frame number candidate extracting block 55 executes the processing shown in the flowchart of FIG. 14 to determine whether or not the same arrangement as that of the FS patterns of entered FSn0, FSn1, FSn3, and FSn4 is found in PrA0 through PrA9, which are the rows forming the preamble part in column 6 of FIG. 21. If a frame number candidate of the preamble part is found as a result of the above-mentioned determination, the preamble frame number candidate extracting block 55 outputs the detected frame number candidate of the preamble part to the lock-mode generating block 57 as pasq54. If the frame number candidate of the preamble part is not detected, the preamble frame number candidate extracting block 55 outputs "7" to the lock-mode generating block 57 as pasq54.

Figure 15:
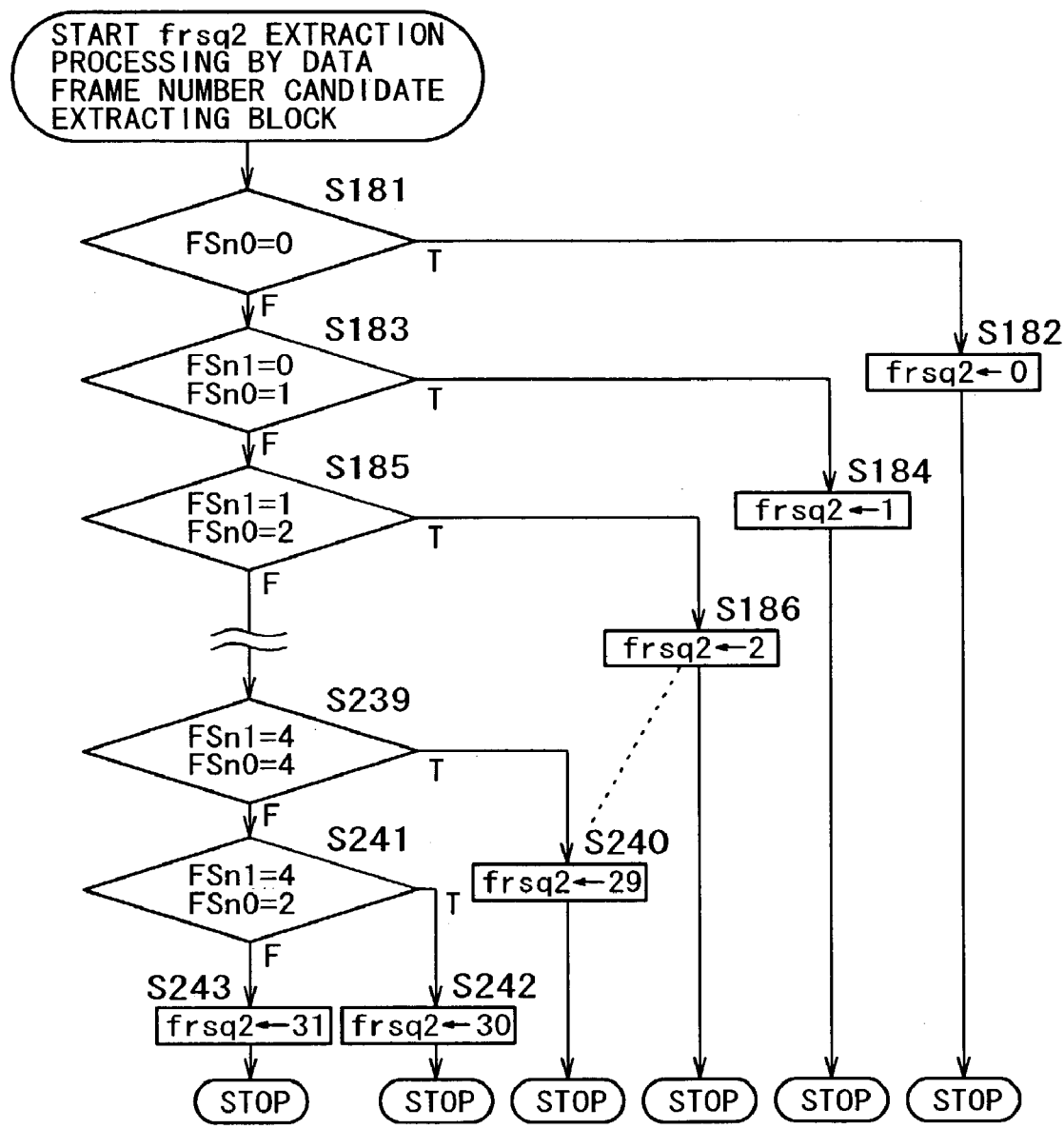
FIG. 15 is a flowchart describing the frsq2 extraction processing of a data frame number candidate extracting block.

The data frame number candidate extracting block 56 executes the processing shown in the flowchart of FIG. 15 to determine whether or not the same arrangement as that of the FS patterns of entered FSn0 and FSn1 is found in DSX0 through DSX30, which are the rows forming the data part in column 3 of FIG. 21 through FIG. 24. If a frame number candidate of the data part is found as a result of the above-mentioned determination, the data frame number candidate extracting block 56 outputs the detected frame number candidate of the data part to the lock-mode generating block 57 and the frame number determining block 58 as frsq2. If the frame number candidate of the data part is not detected, the data frame number candidate extracting block 56 outputs "31" to the lock-mode generating block 57 and the frame number determining block 58 as frsq2.

Figure 16:
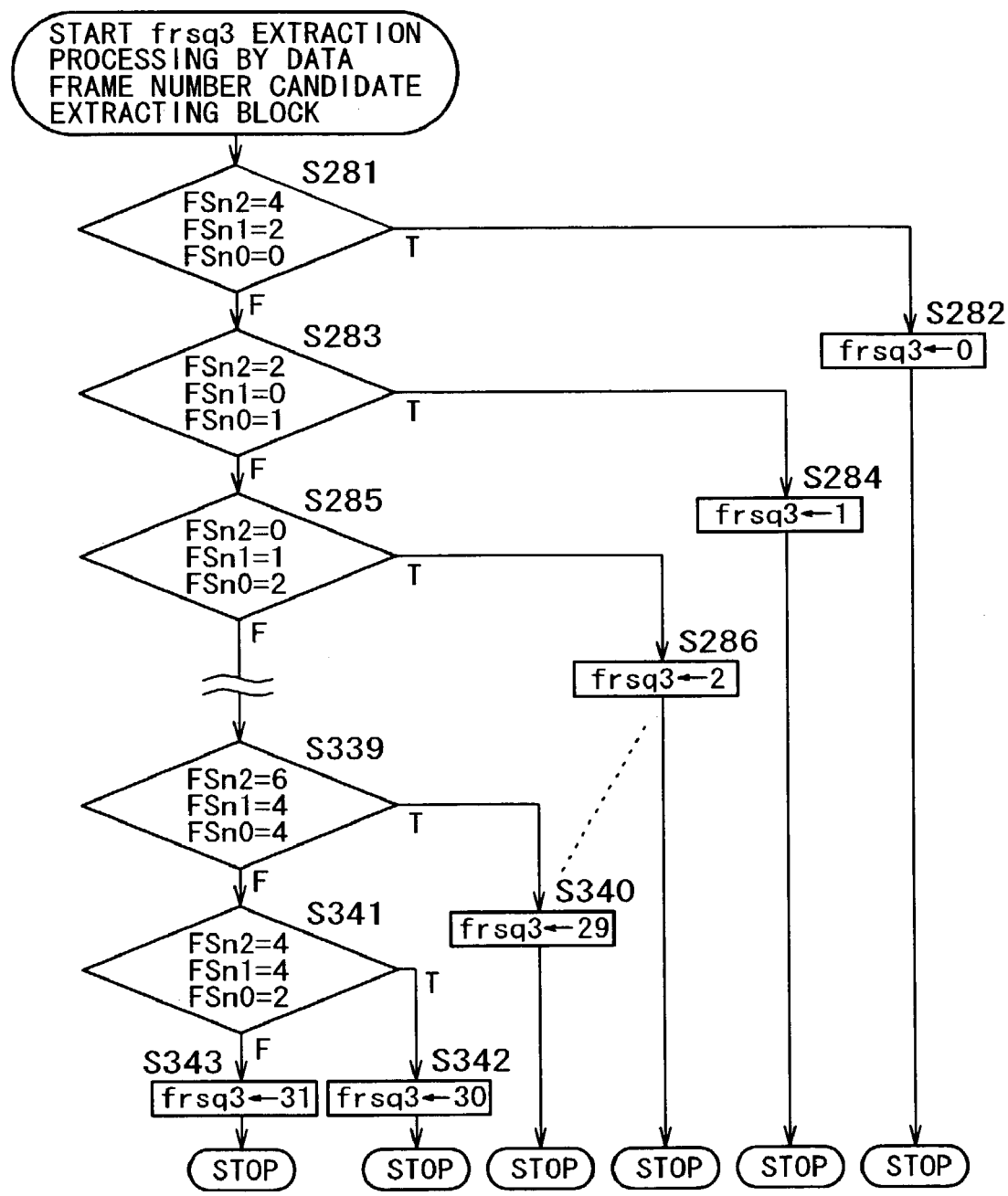
FIG. 16 is a flowchart describing the frsq3 extraction processing of the data frame number candidate extracting block.

In addition, the data frame number candidate extracting block 56 executes the processing shown in the flowchart of FIG. 16 to determine whether or not the same arrangement as that of the FS patterns of entered FSn0, FSn1, and FSn2 is found in DSX0 through DSX30, which are the rows forming the data part in column 4 of FIG. 21 through FIG. 24. If a frame number candidate of the data part is found as a result of the above-mentioned determination, the data frame number candidate extracting block 56 outputs the detected frame number candidate of the data part to the lock-mode generating block 57 and the frame number determining block 58 as frsq3. If the frame number candidate frsq3 of the data part is not detected, the data frame number candidate extracting block 56 outputs "31" to the lock-mode generating block 57 and the frame number determining block 58 as frsq3.

Figure 17:
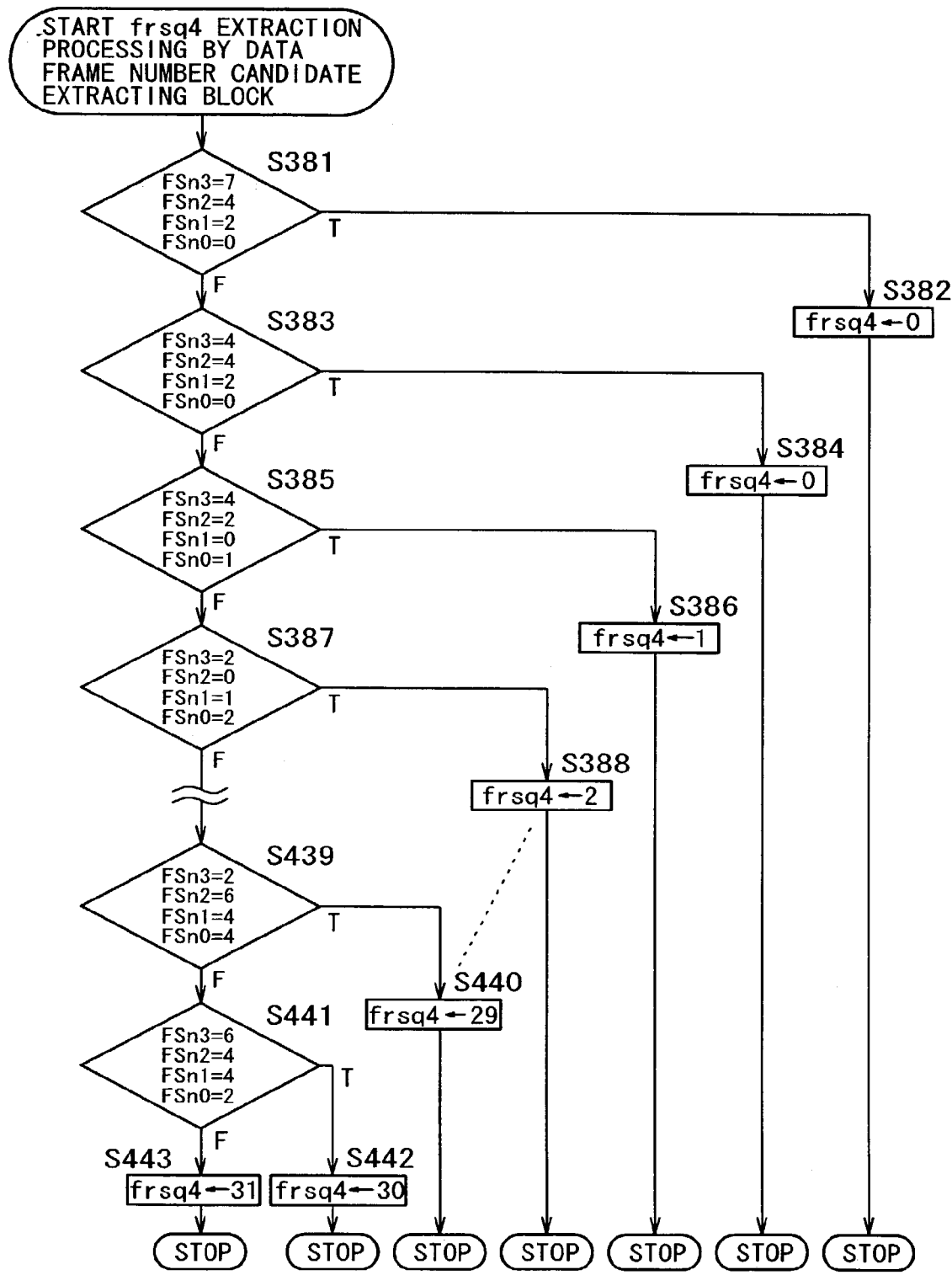
FIG. 17 is a flowchart describing the frsq4 extraction processing of the data frame number candidate extracting block.

Moreover, the data frame number candidate extracting block 56 executes the processing shown in the flowchart of FIG. 17 to determine whether or not the same arrangement as that of the FS patterns of entered FSn0, FSn1, FSn2, and FSn3 is found in DSX0 through DSX30, which are the rows forming the data part in column 5 of FIG. 21 through FIG. 24. If a frame number candidate of the data part is found as a result of the above-mentioned determination, the data frame number candidate extracting block 56 outputs the detected frame number candidate of the data part to the lock-mode generating block 57 and the frame number determining block 58 as frsq4. If the frame number candidate frsq4 of the data part is not detected, the data frame number candidate extracting block 56 outputs "31" to the lock-mode generating block 57 and the frame number determining block 58 as frsq4.

Figure 18:
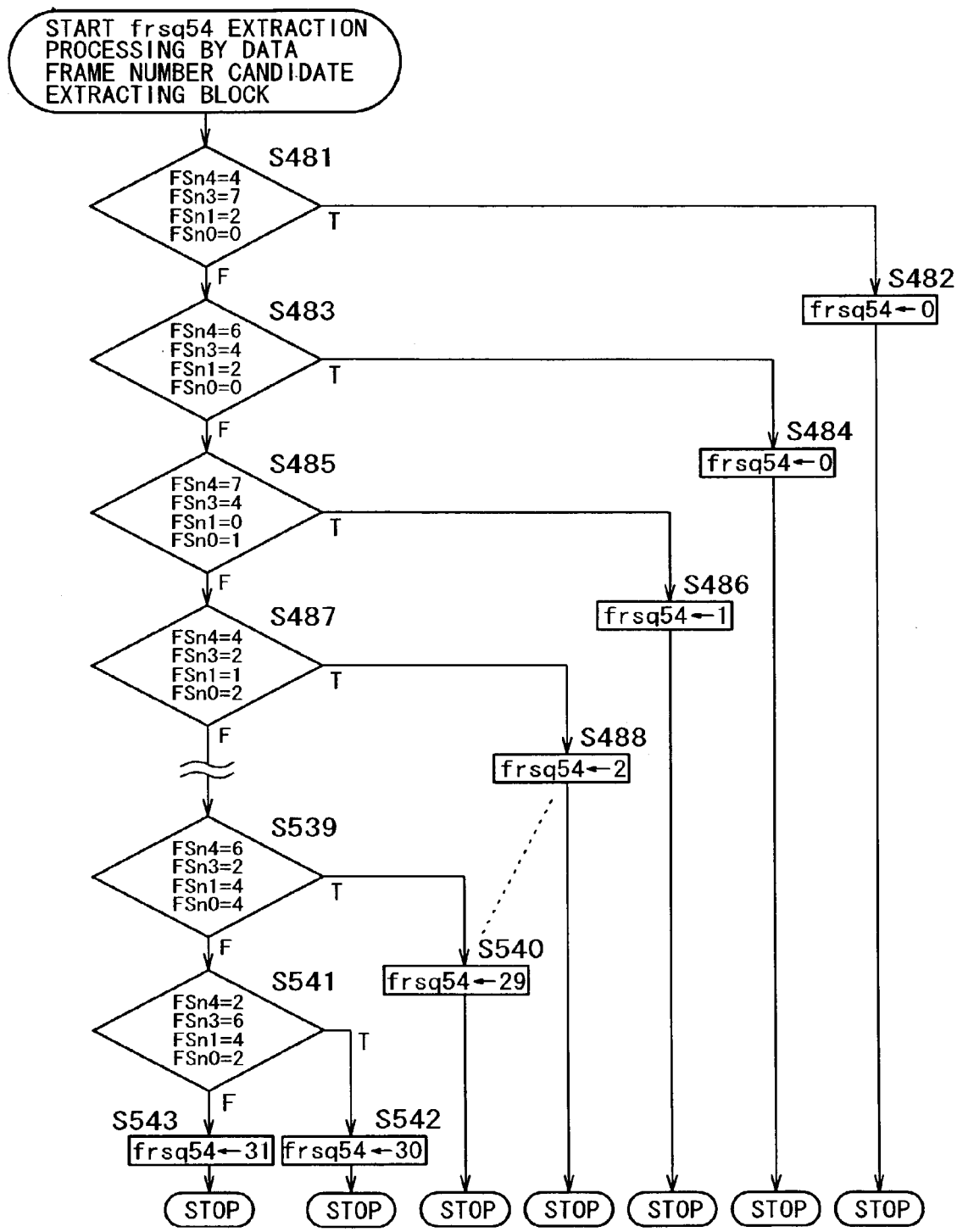
FIG. 18 is a flowchart describing the frsq54 extraction processing of the data frame number candidate extracting block.

Further, the data frame number candidate extracting block 56 executes the processing shown in the flowchart of FIG. 18 to determine whether or not the same arrangement as that of the FS patterns of entered FSn0, FSn1, FSn3, and FSn4 is found in DSX0 through DSX30, which are the rows forming the data part in column 6 of FIG. 21 through FIG. 24. If a frame number candidate of the data part is found as a result of the above-mentioned determination, the data frame number candidate extracting block 56 outputs the detected frame number candidate of the data part to the lock-mode generating block 57 and the frame number determining block 58 as frsq54. If the frame number candidate of the data part is not detected, the data frame number candidate extracting block 56 outputs "31" to the lock-mode generating block 57 and the frame number determining block 58 as frsq54.

The lock-mode generating block 57 is set to the lock mode=0 at the start of each cluster (step S602 shown in FIG. 19). Next, if the lock mode=0 (step S603 shown in FIG. 19) and if at least one of the answers to that frsq2 among the updated inputs from the data frame number candidate extracting block 56 is not "31" (step S604 shown in FIG. 19) and that pasq2 among the updated inputs from the preamble frame number candidate extracting block 55 is not "7" (step S606 shown in FIG. 19) is True (namely, a candidate is found), the lock-mode generating block 57 counts up the lock mode to set the lock mode=1 and outputs this lock mode to the frame number determining block 58 (step S605 shown in FIG. 19). It should be noted that, if frsq2 among the inputs from the data frame number candidate extracting block 56 is "31" in step S604 shown in FIG. 19 and pasq2 among the inputs from the preamble frame number candidate extracting block 55 is "7" in step S606, then the lock-mode generating block 57 maintains the lock mode=0 (step S602 shown in FIG. 19) and repeats the above-mentioned processes.

If the lock mode=1 (step S607 shown in FIG. 19) and if at least one of the answers to that frsq3 among the updated inputs from the data frame number candidate extracting block 56 is not "31" (step S608 shown in FIG. 19) and that pasq3 among the updated inputs from the preamble frame number candidate extracting block 55 is not "7" (step S610 shown in FIG. 19) is True (namely, a candidate is found), then the lock-mode generating block 57 counts up the lock mode to set the lock mode=2 and outputs this lock mode to the frame number determining block 58 (step S609 shown in FIG. 19).

It should be noted that, if frsq3 among the inputs from the data frame number candidate extracting block 56 is "31" (step S608 shown in FIG. 19) and pasq3 among the inputs from the preamble frame number candidate extracting block 55 is "7" (step S610 shown in FIG. 19), then the lock-mode generating block 57 sets the lock mode=0 (step S602 shown in FIG. 19) and repeats the above-mentioned processes.

If the lock mode=2 (step S611 shown in FIG. 19) and if at least one of the answers to that frsq4 among the updated inputs from the data frame number candidate extracting block 56 is not "31" (step S612 shown in FIG. 19) and that pasq4 among the updated inputs from the preamble frame number candidate extracting block 55 is not "7" (step S614 shown in FIG. 19) is True (namely, a candidate is found), then the lock-mode generating block 57 counts up to set the lock mode=3 and outputs this lock mode to the frame number determining block 58 (step S613 shown in FIG. 19).

It should be noted that, if frsq4 among the inputs from the data frame number candidate extracting block 56 is "31" (step S612 shown in FIG. 19) and pasq4 among the inputs from the preamble frame number candidate extracting block 55 is "7" (step S614 shown in FIG. 19), then the lock-mode generating block 57 sets the lock mode=0 (step S602 shown in FIG. 19) and repeats the above-mentioned processes.

If the lock mode=3 (step S615 shown in FIG. 19) and if at least one of the answers to that frsq54 among the updated inputs from the data frame number candidate extracting block 56 is not "31" (step S616 shown in FIG. 19) and that pasq54 among the updated inputs from the preamble frame number candidate extracting block 55 is not "7" (step S617 shown in FIG. 19) is True (namely, a candidate is found), then the lock-mode generating block 57 maintains the lock mode=3 and outputs this lock mode to the frame number determining block 58 (step S613 shown in FIG. 19).

It should be noted that, if frsq54 among the inputs from the data frame number candidate extracting block 56 is "31" (step S616 shown in FIG. 19) and pasq54 among the inputs from the preamble frame number candidate extracting block 55 is "7" (step S617 shown in FIG. 19), then the lock-mode generating block 57 sets the lock mode=0 (step S602 shown in FIG. 19) and repeats the above-mentioned processes.

On the basis of the data inputted from the data frame number candidate extracting block 56 and the lock-mode generating block 57 in the above-mentioned method, the frame number determining block 58 determines the frame number and outputs it as frm_no. The value of frm_no in the amble part is set to "31" by the above-mentioned method.

As described above, it is detected whether the data being reproduced are in the amble part or in the data part. If the data being reproduced are in the data part, the frame number is also detected.

Meanwhile, only by switching between the parameters in the different portions of a frame synchronous circuit practiced in MD-Data2 which is a format similar to the format described above with reference to FIGS. 3 through 6, the optical disk apparatus 1 can share the frame synchronous circuit portion with MD-Data2, so that the optical disk apparatus 1 can also reproduce data from magneto-optical disk on which data are written in MD-Data2.

FIGS. 25 through 27 illustrate examples of formats which are similar to those shown in FIGS. 3 through 6. The following describes these similar formats shown in FIGS. 25 through 27.

FIG. 25 illustrates an exemplary format. In FIG. 25, the data for one cluster which is the minimum rewrite unit are shown. As shown in the outside of the leftmost column of FIG. 25, the cluster is configured by a preamble part, data sectors 0 through 15 (hereafter also referred to as a data part), and a postamble part, from top to bottom.

In FIG. 25, each row from top to down corresponds to the frame which is the minimum unit of divided data. To be more specific, the preamble part shown on top outside the leftmost column in FIG. 25 is configured by frame 1 through frame 10 from top.

Outside the left column of FIG. 25, 16 data sectors 0 through 15 below the preamble part are each configured by 26 frames.

The postamble part at the bottom below the data part outside the leftmost column of FIG. 25 is configured by 6 frames, the sixth through first frames from bottom.

PrA0 through PrA9 shown in rows 1 through 10 from top in the leftmost column of FIG. 25 are those obtained by assigning numbers (frame numbers) to 10 frames forming the preamble part in the order of recording for the convenience of description; actually, these numbers are not recorded to the magneto-optical disk.

Likewise, DS0_0 through DS2_25 shown on row 11 through row 28 from above in the leftmost column in FIG. 25 and DS14_24 through DS15_25 shown on row 14 through row 7 from below are numbers obtained by assigning numbers to 26 frames of each data sector in the order of recording for the convenience of description. Therefore, these numbers are not actually recorded to the magneto-optical disk.

Namely, "x" of "DSx_y" denotes the sequence obtained by counting data sectors from above on a data sector basis and "y" denotes the sequence obtained by counting frames from above in a data sector.

Likewise, PoA0 through PoA5 shown on row 6 through row 1 from below in the leftmost column in FIG. 25 are those obtained by assigning numbers (frame numbers) to the 6 frames forming the postamble part in the order of recording for the convenience of description. Therefore, these numbers are not actually recorded to the magneto-optical disk.

The portion to be recorded to the magneto-optical disk is the 2 columns on the right side in FIG. 25. Namely, in the second column from the right side of FIG. 25, frame syncs are shown. In the rightmost column of FIG. 25, preamble data or user data are shown. As shown at the bottom of FIG. 25, each frame sync is formed by 24 channel bits. Each amble data and each user data are configured by 1110 bits each.

As shown in row 1 through row 10 from top in FIG. 25, the preamble part is configured by preamble data areas 0 through 9 and preamble FS areas 0 through 9 corresponding to preamble data areas 0 through 9.

As shown in row 6 through row 1 from bottom of FIG. 25, the postamble part is configured by postamble data areas 0 through 5 and postamble FS areas 0 through 5 corresponding to postamble data areas 0 through 5.

FIG. 26 shows data sector 0 extracted from row 11 through row 16 in FIG. 25. In FIG. 26, data sector 0 is configured by 26 frames, DS0_0 through DS0_25 and each frame is configured by user data areas 0_0 through 0_25 and data sector FS areas 0_0 through 0_25 corresponding to user data areas 0_0 through 0_25. As shown at the bottom of FIG. 26, the data sector FS area in each frame is configured by 24 channel bits and the user data area is configured by 1110 channel bits. Data sector 0 is configured as described above.

Returning to FIG. 25, the internal configuration of each of data sectors 1 through 15 is the same as that of data sector 0.

The following describes frame sync patterns (hereafter referred to as FS patterns) having the format shown in FIG. 25 with reference to FIGS. 27A through 27C. The FS patterns of the similar formats shown in FIGS. 25 through 27C are based on 7 patterns FS0 through FS6.

It should be noted that the contents of the FS patterns in the similar formats may be different from the formats to which the present invention is applied. To be more specific, in the similar formats in this example, each frame sync is configured by 24 channel bits, which is different from the configuration according to the present invention, namely 30 channel bits.

FIG. 27A shows the FS patterns of the preamble part. In FIG. 27A, the frames, PrA0 through PrA9, in the left-side column correspond to PrA0 through PrA9 in the preamble part of FIG. 25. The FS patterns shown in the right-side column of FIG. 27A are recorded to the preamble FS areas 0 through 9 shown in FIG. 25.

As shown in FIG. 27A, in the preamble part, FS6 is recorded to frame PrA0, FS6 to frame PrA1, FS6 to frame PrA2, FS6 to frame PrA3, FS2 to frame PrA4, FS5 to frame PrA5, FS6 to frame PrA6, FS5 to frame PrA7, FS1 to frame PrA8 , the FS6 to frame PrA9.

The frame syncs shown in FIG. 27A are arranged in accordance with the rules shown below.

To be more specific, let nth frame of frames PrA0 through PrA9 in the preamble part be PrA(n), then the frame syncs are arranged so that the arrangements of FS patterns of PrA(n-1) and the FS patterns of PrA(n) do not appear at two or more positions for n=0 to 9.

FIG. 27B shows the FS patterns in the postamble part. In FIG. 27B, frames PoA0 through PoA5 in the left-side column correspond to PoA0 through PoA5 in the postamble part shown in FIG. 25. The FS patterns shown in the right-side column of FIG. 27B are recorded to postamble FS areas 0 through 5 shown in FIG. 25.

As shown in FIG. 27B, in the postamble part, FS6 is recorded to each of frames PoA0 through PoA5.

FIG. 27C shows the FS patterns of frame syncs to be recorded to 26 frames DSX0 through DSX25 in each of data sectors 0 through 15 shown in FIG. 25. In FIG. 27C, frames DSX0 through DSX25 in the left-side column correspond to 26 frames in each of data sectors 0 through 15 shown in FIG. 25 (DS0_0 through DS0_25 in data sector 0 for example). The FS patterns shown in the right-side column of FIG. 27C are recorded to 26 data sector FS areas in each of data sectors 0 through 15 in FIG. 25 (data sector FS areas 0_0 through 0_25 in data sector 0 for example).

Namely, as shown in FIG. 27C, FS0 is recorded to frame DSX0, FS1 is recorded to DSX1, and FS2 is recorded to DSX2, and so on up to DSX25.

It should be noted that, in FIG. 27C, FS patterns FS0 through FS6 are arranged in accordance with the following rules. The rules described below are applied to all of frames DSX0 through DSX25 in the data sector shown in FIG. 27C.

To be more specific, let nth frame of frames DSX0 through DSX25 in the data sector shown in FIG. 27C be DSX(n), then the frame syncs are arranged so that the following two items are satisfied:
1. The arrangement of FS pattern of DSX(n-1) and FS pattern of DSX(n) does not occur at two or more positions for n=0 through 25.
2. The arrangement of FS pattern of DSX(n-2) and FS pattern of DSX(n) does not occur at two or more positions for n=0 through 25.

In the case of extension over the preamble part and the data sector part, the frame syncs are arranged so that the above-mentioned rules are satisfied for each of DSX(n) and corresponding PrA(m) and PrA(m-1).

The frame syncs are also arranged so that FS pattern FS0 is not used outside DSX0.

In accordance with the above-mentioned rules, the frame syncs are recorded to the data sector FS area in each frame of the data sector.

In the above-mentioned similar formats, FS6 used in the amble part is also used in the data sector (for example, DSX25), so that, when the optical disk apparatus 1 reproduces the magneto-optical disk, the identification between the amble part and the data part is not easy unlike the formats shown in FIG. 3 through 6.

In the above-mentioned similar formats, the number of frames forming the preamble part and the postamble part and the number of data sectors of the data part are the same as those of the formats (shown in FIGS. 3 through 6) to which the present invention is applied. Hence, only by slightly modifying the processing program used by the 1–7 pp demodulating block 26 into that for the similar formats, the optical disk apparatus 1 can reproduce the data from the magneto-optical disk to which the data are recorded in these similar formats.

It should be noted that, when reproducing the data recorded in the similar formats, the optical disk apparatus 1 detects the frame number by referencing the tables shown in FIGS. 28 through 31. FIG. 29 continues from FIG. 28 and FIG. 31 continues from FIG. 30.

In the tables shown in FIGS. 28 through 31, the leftmost column "Frame No" is referred as column 1 and column "FS(n)" on the right is referred to as column 2. The leftmost column "FSn0 FSn1" under column "Cluster Heads" (in FIGS. 30 and 31, "Cluster Intermediacies") is referred to as column 3. The subsequent column "FSn0 FSn1 FSn2" is referred to as column 4. The subsequent column "FSn0 FSn1 FSn2 FSn3" is referred to as column 5. The right-most column "FSn0 FSn1 FSn3 FSn4" is referred to as column 6.

In the following description, the row just below each header, the row on which "PrA0" is written below header "Frame No" in FIG. 28 is referred to as row 1 followed by row 2, row 3 and so on, for example.

The tables shown in FIGS. 28 and 29 shows the reference information for extracting the frame number candidates of the preamble part and data sector 0. The tables shown in FIGS. 30 and 31 show the reference information for extracting the frame number candidates of data sectors 1 through 15.

The arrangements of FS patterns is as shown in FIGS. 27A, 27B, and 27C. Column 1 in the tables shown in FIGS. 28 through 31 indicates the frames corresponding to those in FIGS. 27A through 27C. To be more specific, PrA0 through PrA9 shown on rows 1 through 10 in column 1 "Frame No" in the table shown in FIG. 28 correspond to PrA0 through PrA9 shown in the left column shown in FIG. 27A. DSX0 through DSX10 in rows 11 through 21 in column 1 "Frame No" in the table of FIG. 28 and DSX0 through DSX10 in rows 1 through 11 in column 1 "Frame No" in the table of FIG. 30 correspond to DSX0 through DSX10 in the left column of FIG. 27C. DSX11 through DSX25 in rows 1 through 15 in column 1 "Frame No" in the tables of FIGS. 29 and 31 correspond to DSX11 through DSX25 in the left column of FIG. 27C.

The numerals in rows 1 through 10 from top in column 2 "FS(n)" in the table of FIG. 28 are the numbers of the FS patterns shown in the right column of FIG. 27A. Namely, 6, 6, 6, 6, 2, 5, 6, 5, 1, 6 in rows 1 through 10 from top in column 2 "FS(n)" in the table of FIG. 28 denote FS6, FS6, FS6, FS6, FS2, FS5, FS6, FS5, FS1, FS6 in the right column of FIG. 27A.

Column 3 "FSn0 FSn1" in the tables of FIGS. 28 and 29 shows numerals when two FS patterns shown in column 2 are arranged. Namely, row 2 from top in column 3 "FSn0 FSn1" in the table of FIG. 28 shows "6" in row 1 from top in column 2 representing the FS pattern of PrA0 and "6" in row 2 from top in column 2 representing the FS pattern of PrA1, as "66" in the order of PrA1 and PrA0.

Likewise, row 3 from top in column 3 "FSn0 FSn1" shows "6" in row 2 from top in column 2 representing the FS pattern of PrA1 and "6" in row 3 from top in column 2 representing the FS pattern of PrA2, as "66" in the order of PrA2 and PrA1.

Likewise, row 4 from top in column 3 "FSn0 FSn1" shows "6" in row 3 from top in column 2 representing the FS pattern of PrA2 and "6" in row 4 from top in column 2 representing the FS pattern of PrA3, as "66" in the order of PrA3 and PrA2.

Likewise, row 5 from top in column 3 "FSn0 FSn1" shows "6" in row 4 from top in column 2 representing the FS pattern of PrA3 and "2" in row 5 from top in column 2 representing the FS pattern of PrA4, as "26" in the order of PrA4 and PrA3.

Likewise, row 6 from top in column 3 "FSn0 FSn1" shows "2" in row 5 from top in column 2 representing the FS pattern of PrA4 and "5" in row 6 from top in column 2 representing the FS pattern of PrA5, as "52" in the order of PrA5 and PrA4.

Likewise, row 7 from top in column 3 "FSn0 FSn1" shows "5" in row 6 from top in column 2 representing the FS pattern of PrA5 and "6" in row 7 from top in column 2 representing the FS pattern of PrA6, as "65" in the order of PrA6 and PrA5.

Likewise, row 8 from top in column 3 "FSn0 FSn1" shows "6" in row 7 from top in column 2 representing the FS pattern of PrA6 and "5" in row 8 from top in column 2 representing the FS pattern of PrA7, as "56" in the order of PrA7 and PrA6.

Likewise, row 9 from top in column 3 "FSn0 FSn1" shows "5" in row 8 from top in column 2 representing the FS pattern of PrA7 and "1" in row 9 from top in column 2 representing the FS pattern of PrA8, as "15" in the order of PrA8 and PrA7.

Likewise, row 10 from top in column 3 "FSn0 FSn1" shows "1" in row 9 from top in column 2 representing the FS pattern of PrA8 and "6" in row 10 from top in column 2 representing the FS pattern of PrA9, as "61" in the order of PrA9 and PrA8.

Likewise, row 11 from top in column 3 "FSn0 FSn1" shows "6" in row 10 from top in column 2 representing the FS pattern of PrA9 and "0" in row 11 from top in column 2 representing the FS pattern of DSX0, as "06" in the order of DSX0 and PrA9.

Likewise, row 12 from top in column 3 "FSn0 FSn1" shows "0" in row 11 from top in column 2 representing the FS pattern of DSX0 and "1" in row 12 from top in column 2 representing the FS pattern of DSX1, as "10" in the order of DSX1 and DSX0.

Likewise, row 13 from top in column 3 "FSn0 FSn1" shows "1" in row 12 from top in column 2 representing the FS pattern of DSX1 and "2" in row 13 from top in column 2 representing the FS pattern of DSX2, as "21" in the order of DSX2 and DSX1.

In what follows, as described above, in FIG. 28 and FIG. 29, nth row from top of column 3 "FSn0 FSn1" shows (if the row numbers are assigned through FIG. 28 and FIG. 29) the FS pattern on n-1 row from top of column 2 and the FA pattern on nth row from top of column 2 in the order of the FS pattern on nth row from top of column 2 and the FS pattern on row n-1 from top of column 2. It should be noted that n is up to 25.

Next, column 4 "FSn0 FSn1 FSn2" in the tables of FIG. 28 and FIG. 29 shows the numerals representing three FS patterns in column 2. To be more specific, row 3 from top of column 4 "FSn0 FSn1 FSn2" shows "6" in row 1 from top of column 2 representing the FS pattern of PrA0, "6" in row 2 from top of column 2 representing the FS pattern of PrA1, and "6" in row 3 from top of column 2 representing the FS pattern of PrA2, as "666" in the order of PrA2, PrA1, and PrA0.

Likewise, row 4 from top of column 4 "FSn0 FSn1 FSn2" shows "6" in row 2 from top of column 2 representing the FS pattern of PrA1, "6" in row 3 from top of column 2 representing the FS pattern of PrA2, and "6" in row 4 from top of column 2 representing the FS pattern of PrA3, as "666" in the order of PrA3, PrA2, and PrA1.

Likewise, row 5 from top of column 4 "FSn0 FSn1 FSn2" shows "6" in row 3 from top of column 2 representing the FS pattern of PrA2, "6" in row 4 from top of column 2 representing the FS pattern of PrA3, and "2" in row 5 from top of column 2 representing the FS pattern of PrA4, as "266" in the order of PrA4, PrA3, and PrA2.

Likewise, row 6 from top of column 4 "FSn0 FSn1 FSn2" shows "6" in row 4 from top of column 2 representing the FS pattern of PrA3, "2" in row 5 from top of column 2 representing the FS pattern of PrA4, and "5" in row 6 from top of column 2 representing the FS pattern of PrA5, as "526" in the order of PrA5, PrA4, and PrA3.

Likewise, row 7 from top of column 4 "FSn0 FSn1 FSn2" shows "2" in row 5 from top of column 2 representing the FS pattern of PrA4, "5" in row 6 from top of column 2 representing the FS pattern of PrA5, and "6" in row 7 from top of column 2 representing the FS pattern of PrA6, as "652" in the order of PrA6, PrA5, and PrA4.

Likewise, row 8 from top of column 4 "FSn0 FSn1 FSn2" shows "5" in row 6 from top of column 2 representing the FS pattern of PrA5, "6" in row 7 from top of column 2 representing the FS pattern of PrA6, and "5" in row 8 from top of column 2 representing the FS pattern of PrA7, as "565" in the order of PrA7, PrA6, and PrA5.

Likewise, row 9 from top of column 4 "FSn0 FSn1 FSn2" shows "6" in row 7 from top of column 2 representing the FS pattern of PrA6, "5" in row 8 from top of column 2 representing the FS pattern of PrA7, and "1" in row 9 from top of column 2 representing the FS pattern of PrA8, as "156" in the order of PrA8, PrA7, and PrA6.

Likewise, row 10 from top of column 4 "FSn0 FSn1 FSn2" shows "5" in row 8 from top of column 2 representing the FS pattern of PrA7, "1" in row 9 from top of column 2 representing the FS pattern of PrA8, and "6" in row 10 from top of column 2 representing the FS pattern of PrA9, as "615" in the order of PrA9, PrA8, and PrA7.

Likewise, row 11 from top of column 4 "FSn0 FSn1 FSn2" shows "1" in row 9 from top of column 2 representing the FS pattern of PrA8, "6" in row 10 from top of column 2 representing the FS pattern of PrA9, and "0" in row 11 from top of column 2 representing the FS pattern of DSX0, as "061" in the order of DSX0, PrA9, and PrA8.

Likewise, row 12 from top of column 4 "FSn0 FSn1 FSn2" shows "6" in row 10 from top of column 2 representing the FS pattern of PrA9, "0" in row 11 from top of column 2 representing the FS pattern of DSX0, and "1" in row 12 from top of column 2 representing the FS pattern of DSX1, as "106" in the order of DSX1, DSX0, and PrA9.

Likewise, row 13 from top of column 4 "FSn0 FSn1 FSn2" shows "0" in row 11 from top of column 2 representing the FS pattern of DSX0, "1" in row 12 from top of column 2 representing the FS pattern of DSX1, and "2" in row 13 from top of column 2 representing the FS pattern of DSX2, as "210" in the order of DSX2, DSX1, and DSX0.

In what follows, as described above, in FIG. 28 and FIG. 29, nth row from top of column 4 "FSn0 FSn1 FSn2" shows (if the row numbers are assigned through FIG. 28 and FIG. 29) the FS pattern on row n-2 from top of column 2, the FS pattern in row n-1 from top of column 2, and the FS pattern of nth row from top of column 2 in the order of the FS pattern on nth row from top of column 2, FS pattern in n-1 row from top of column 2, and the FS pattern on n-2 row from top of column 2. It should be noted that n is up to 25.

Next, column 5 "FSn0 FSn1 FSn2 FSn3" in the tables of FIG. 28 and FIG. 29 shows the numerals representing four FS patterns in column 2. To be more specific, row 4 from top of column 5 "FSn0 FSn1 FSn2 FSn3" of FIG. 28 shows "6" in row 1 from top of column 2 representing the FS pattern of PrA0, "6" in row 2 from top of column 2 representing the FS pattern of PrA1, "6" in row 3 from top of column 2 representing the FS pattern of PrA2, and "6" in row 4 from top of column 2 representing the FS pattern of PrA3, as "6666" in the order of PrA3, PrA2, PrA1, and PrA0.

Likewise, row 5 from top of column 5 "FSn0 FSn1 FSn2 FSn3" shows "6" in row 2 from top of column 2 representing the FS pattern of PrA1, "6" in row 3 from top of column 2 representing the FS pattern of PrA2, "6" in row 4 from top of column 2 representing the FS pattern of PrA3, and "2" in row 5 from top of column 2 representing the FS pattern of PrA4, as "2666" in the order of PrA4, PrA3, PrA2, and PrA1.

Likewise, row 6 from top of column 5 "FSn0 FSn1 FSn2 FSn3" shows "6" in row 3 from top of column 2 representing the FS pattern of PrA2, "6" in row 4 from top of column 2 representing the FS pattern of PrA3, "2" in row 5 from top of column 2 representing the FS pattern of PrA4, and "5" in row 6 from top of column 2 representing the FS pattern of PrA5, as "5266" in the order of PrA5, PrA4, PrA3, and PrA2.

Likewise, row 7 from top of column 5 "FSn0 FSn1 FSn2 FSn3" shows "6" in row 4 from top of column 2 representing the FS pattern of PrA3, "2" in row 5 from top of column 2 representing the FS pattern of PrA4, "5" in row 6 from top of column 2 representing the FS pattern of PrA5, and "6" in row 7 from top of column 2 representing the FS pattern of PrA6, as "6526" in the order of PrA6, PrA5, PrA4, and PrA3.

Likewise, row 8 from top of column 5 "FSn0 FSn1 FSn2 FSn3" shows "2" in row 5 from top of column 2 representing the FS pattern of PrA4, "5" in row 6 from top of column 2 representing the FS pattern of PrA5, "6" in row 7 from top of column 2 representing the FS pattern of PrA6, and "5" in row 8 from top of column 2 representing the FS pattern of PrA7, as "5652" in the order of PrA7, PrA6, PrA5, and PrA4.

Likewise, row 9 from top of column 5 "FSn0 FSn1 FSn2 FSn3" shows "5" in row 6 from top of column 2 representing the FS pattern of PrA5, "6" in row 7 from top of column 2 representing the FS pattern of PrA6, "5" in row 8 from top of column 2 representing the FS pattern of PrA7, and "1" in row 9 from top of column 2 representing the FS pattern of PrA8, as "1565" in the order of PrA8, PrA7, PrA6, and PrA5.

Likewise, row 10 from top of column 5 "FSn0 FSn1 FSn2 FSn3" shows "6" in row 7 from top of column 2 representing the FS pattern of PrA6, "5" in row 8 from top of column 2 representing the FS pattern of PrA7, "1" in row 9 from top of column 2 representing the FS pattern of PrA8, and "6" in row 10 from top of column 2 representing the FS pattern of PrA9, as "6156" in the order of PrA9, PrA8, PrA7, and PrA6.

Likewise, row 11 from top of column 5 "FSn0 FSn1 FSn2 FSn3" shows "5" in row 8 from top of column 2 representing the FS pattern of PrA7, "1" in row 9 from top of column 2 representing the FS pattern of PrA8, "6" in row 10 from top of column 2 representing the FS pattern of PrA9, and "0" in row 11 from top of column 2 representing the FS pattern of DSX0, as "0615" in the order of DSX0, PrA9, PrA8, and PrA7.

Likewise, row 12 from top of column 5 "FSn0 FSn1 FSn2 FSn3" shows "1" in row 9 from top of column 2 representing the FS pattern of PrA8, "6" in row 10 from top of column 2 representing the FS pattern of PrA9, "0" in row 11 from top of column 2 representing the FS pattern of DSX0, and "1" in row 12 from top of column 2 representing the FS pattern of DSX1, as "1061" in the order of DSX1, DSX0, PrA9, and PrA8.

Likewise, row 13 from top of column 5 "FSn0 FSn1 FSn2 FSn3" shows "6" in row 10 from top of column 2 representing the FS pattern of PrA9, "0" in row 11 from top of column 2 representing the FS pattern of DSX0, "1" in row 12 from top of column 2 representing the FS pattern of DSX1, and "2" in row 13 from top of column 2 representing the FS pattern of DSX2, as "2106" in the order of DSX2, DSX1, DSX0, and PrA9.

In what follows, as described above, in FIG. 28 and FIG. 29, nth row from top of column 5 "FSn0 FSn1 FSn2 FSn3" shows (if the row numbers are assigned through FIG. 28 and FIG. 29) the FS pattern on row n-3 from top of column 2, the FS pattern in row n-2 from top of column 2, the FS pattern in row n-1 from top of column 2, and the FS pattern of nth row from top of column 2 in the order of the FS pattern on nth row from top of column 2, FS pattern in n-1 row from top of column 2, the FS pattern in n-2 row from top of column 2, and the FS pattern on n-3 row from top of column 2. It should be noted that n is up to 25.

Next, column 6 "FSn0 FSn1 FSn3 FSn4" in the tables of FIG. 28 and FIG. 29 shows the numerals representing four FS patterns in column 2. To be more specific, row 5 from top of column 6 "FSn0 FSn1 FSn3 FSn4" shows "6" in row 1 from top of column 2 representing the FS pattern of PrA0, "6" in row 2 from top of column 2 representing the FS pattern of PrA1, "6" in row 4 from top of column 2 representing the FS pattern of PrA3, and "2" in row 5 from top of column 2 representing the FS pattern of PrA4, as "2666" in the order of PrA4, PrA3, PrA1, and PrA0.

Likewise, row 6 from top of column 6 "FSn0 FSn1 FSn3 FSn4" shows "6" in row 2 from top of column 2 representing the FS pattern of PrA1, "6" in row 3 from top of column 2 representing the FS pattern of PrA2, "2" in row 5 from top of column 2 representing the FS pattern of PrA4, and "5" in row 6 from top of column 2 representing the FS pattern of PrA5, as "5266" in the order of PrA5, PrA4, PrA2, and PrA1.

Likewise, row 7 from top of column 6 "FSn0 FSn1 FSn3 FSn4" shows "6" in row 3 from top of column 2 representing the FS pattern of PrA2, "6" in row 4 from top of column 2 representing the FS pattern of PrA3, "5" in row 6 from top of column 2 representing the FS pattern of PrA5, and "6" in row 7 from top of column 2 representing the FS pattern of PrA6, as "6566" in the order of PrA6, PrA5, PrA3, and PrA2.

Likewise, row 8 from top of column 6 "FSn0 FSn1 FSn3 FSn4" shows "6" in row 4 from top of column 2 representing the FS pattern of PrA3, "2" in row 5 from top of column 2 representing the FS pattern of PrA4, "6" in row 7 from top of column 2 representing the FS pattern of PrA6, and "5" in row 8 from top of column 2 representing the FS pattern of PrA7, as "5626" in the order of PrA7, PrA6, PrA4, and PrA3.

Likewise, row 9 from top of column 6 "FSn0 FSn1 FSn3 FSn4" shows "2" in row 5 from top of column 2 representing the FS pattern of PrA4, "5" in row 6 from top of column 2 representing the FS pattern of PrA5, "5" in row 8 from top of column 2 representing the FS pattern of PrA7, and "1" in row 9 from top of column 2 representing the FS pattern of PrA8, as "1552" in the order of PrA8, PrA7, PrA5, and PrA4.

Likewise, row 10 from top of column 6 "FSn0 FSn1 FSn3 FSn4" shows "5" in row 6 from top of column 2 representing the FS pattern of PrA5, "6" in row 7 from top of column 2 representing the FS pattern of PrA6, "1" in row 9 from top of column 2 representing the FS pattern of PrA8, and "6" in row 10 from top of column 2 representing the FS pattern of PrA9, as "6165" in the order of PrA9, PrA8, PrA6, and PrA5.

Likewise, row 11 from top of column 6 "FSn0 FSn1 FSn3 FSn4" shows "6" in row 7 from top of column 2 representing the FS pattern of PrA6, "5" in row 8 from top of column 2 representing the FS pattern of PrA7, "6" in row 10 from top of column 2 representing the FS pattern of PrA9, and "0" in row 11 from top of column 2 representing the FS pattern of DSX0, as "0656" in the order of DSX0, PrA9, PrA7, and PrA6.

Likewise, row 12 from top of column 6 "FSn0 FSn1 FSn3 FSn4" shows "5" in row 8 from top of column 2 representing the FS pattern of PrA7, "1" in row 9 from top of column 2 representing the FS pattern of PrA8, "0" in row 11 from top of column 2 representing the FS pattern of DSX0, and "1" in row 12 from top of column 2 representing the FS pattern of DSX1, as "1015" in the order of DSX1, DSX0, PrA8, and PrA7.

Likewise, row 13 from top of column 6 "FSn0 FSn1 FSn3 FSn4" shows "1" in row 9 from top of column 2 representing the FS pattern of PrA8, "6" in row 10 from top of column 2 representing the FS pattern of PrA9, "1" in row 12 from top of column 2 representing the FS pattern of DSX1, and "2" in row 13 from top of column 2 representing the FS pattern of DSX2, as "2161" in the order of DSX2, DSX1, PrA9, and PrA8.

In what follows, as described above, in FIG. 28 and FIG. 29, nth row from top of column 6 "FSn0 FSn1 FSn3 FS4" shows (if the row numbers are assigned through FIG. 28 and FIG. 29) the FS pattern on row n-4 from top of column 2, the FS pattern in row n-3 from top of column 2, the FS pattern in row n-1 from top of column 2, and the FS pattern of nth row from top of column 2 in the order of the FS pattern on nth row from top of column 2, FS pattern in n-1 row from top of column 2, the FS pattern in n-3 row from top of column 2, and the FS pattern on n-4 row from top of column 2. It should be noted that n is up to 25.

In column 3 "FSn0 FSn1" in the tables of FIGS. 30 and 31, two numerals are shown representing the FS patterns shown in column 2. To be more specific, row 1 from top in column 3 "FSn0 FSn1" shows "6" in row 15 from top of column 2 of FIG. 29 or FIG. 31 representing the FS pattern of DSX25 of the immediately preceding data sector and "0" in row 1 from top of column 2 of FIG. 30 representing the FS pattern of DSX0, as "06" in the order of DSX0 and DSX25.

Likewise, row 2 from top in column 3 "FSn0 FSn1" of FIG. 30 shows "0" in row 1 from top of column 2 representing the FS pattern of DSX0 and "1" in row 2 from top of column 2 representing the FS pattern of DSX1, as "10" in the order of DSX1 and DSX0.

Likewise, row 3 from top in column 3 "FSn0 FSn1" shows "1" in row 2 from top of column 2 representing the FS pattern of DSX1 and "2" in row 3 from top of column 2 representing the FS pattern of DSX2, as "21" in the order of DSX2 and DSX1.

In what follows, as described above, in FIG. 30 and FIG. 31, nth row from top of column 3 "FSn0 FSn1" shows (if the row numbers are assigned through FIG. 30 and FIG. 31) the FS pattern on n-1 row from top of column 2 and the FA pattern on nth row from top of column 2 in the order of the FS pattern on nth row from top of column 2 and the FS pattern on row n-1 from top of column 2. It should be noted that n is up to 25.

Next, column 4 "FSn0 FSn1 FSn2" in the tables of FIG. 30 and FIG. 31 shows the numerals representing three FS patterns in column 2. To be more specific, row 1 from top of column 4 "FSn0 FSn1 FSn2" shows "2" in row 14 from top of column 2 of FIG. 29 or FIG. 31 representing the FS pattern of DSX24 of the immediately preceding data sector, "6" in row 15 from top of column 2 of FIG. 29 or FIG. 31 representing the FS pattern of DSX25, and "0" in row 1 from top of column 2 of FIG. 30 representing the FS pattern of DSX0, as "062" in the order of DSX0, DSX25, and DSX24.

Likewise, row 2 from top of column 4 "FSn0 FSn1 FSn2" of FIG. 30 shows "6" in row 15 from top of column 2 of FIG. 29 or FIG. 31 representing the FS pattern of DSX25, "0" in row 1 from top of column 2 of FIG. 30 representing the FS pattern of DSX0, and "1" in row 2 from top of column 2 of FIG. 30 representing the FS pattern of DSX1, as "106" in the order of DSX1, DSX0, and DSX25.

Likewise, row 3 from top of column 4 "FSn0 FSn1 FSn2" of FIG. 30 shows "0" in row 1 from top of column 2 representing the FS pattern of DSX0, "1" in row 2 from top of column 2 representing the FS pattern of DSX1, and "2" in row 3 from top of column 2 representing the FS pattern of DSX2, as "210" in the order of DSX2, DSX1, and DSX0.

In what follows, as described above, in FIG. 30 and FIG. 31, nth row from top of column 4 "FSn0 FSn1 FSn2" shows (if the row numbers are assigned through FIG. 30 and FIG. 31) the FS pattern on row n-2 from top of column 2, the FS pattern in row n-1 from top of column 2, and the FS pattern of nth row from top of column 2 in the order of the FS pattern on nth row from top of column 2, FS pattern in n-1 row from top of column 2, and the FS pattern on n-2 row from top of column 2. It should be noted that n is up to 25.

Next, column 5 "FSn0 FSn1 FSn2 FSn3" in the tables of FIG. 30 and FIG. 31 shows the numerals representing four FS patterns in column 2. To be more specific, row 1 from top of column 5 "FSn0 FSn1 FSn2 FSn3" shows "5" in row 13 from top of column 2 of FIG. 29 or FIG. 31 representing the FS pattern of DSX23, "2" in row 14 from top of column 2 of FIG. 29 or FIG. 31 representing the FS pattern of DSX24, "6" in row 15 from top of column 2 of FIG. 29 or FIG. 31 representing the FS pattern of DSX25, and "0" in row 1 from top of column 2 of FIG. 30 representing the FS pattern of DSX0, as "0625" in the order of DSX0, DSX25, DSX24, and DSX23.

Likewise, row 2 from top of column 5 "FSn0 FSn1 FSn2 FSn3" shows "2" in row 14 from top of column 2 of FIG. 29 or FIG. 31 representing the FS pattern of DSX24, "6" in row 15 from top of column 2 of FIG. 29 or FIG. 31 representing the FS pattern of DSX25, "0" in row 1 from top of column 2 of FIG. 30 representing the FS pattern of DSX0, and "1" in row 2 from top of column 2 of FIG. 30 representing the FS pattern of DSX1, as "1062" in the order of DSX1, DSX0, DSX25, and DSX24.

Likewise, row 3 from top of column 5 "FSn0 FSn1 FSn2 FSn3" shows "6" in row 15 from top of column 2 of FIG. 29 or FIG. 31 representing the FS pattern of DSX25, "0" in row 1 from top of column 2 of FIG. 30 representing the FS pattern of DSX0, "1" in row 2 from top of column 2 of FIG. 30 representing the FS pattern of DSX1, and "2" in row 3 from top of column 2 of FIG. 30 representing the FS pattern of DSX2, as "2106" in the order of DSX2, DSX1, DSX0, and DSX25.

In what follows, as described above, in FIG. 30 and FIG. 31, nth row from top of column 5 "FSn0 FSn1 FSn2 FSn3"

shows (if the row numbers are assigned through FIG. 30 and FIG. 31) the FS pattern on row n-3 from top of column 2, the FS pattern in row n-2 from top of column 2, the FS pattern in row n-1 from top of column 2, and the FS pattern of nth row from top of column 2 in the order of the FS pattern on nth row from top of column 2, FS pattern in n-1 row from top of column 2, the FS pattern in n-2 row from top of column 2, and the FS pattern on n-3 row from top of column 2. It should be noted that n is up to 25.

Next, column 6 "FSn0 FSn1 FSn3 FSn4" in the tables of FIG. 30 and FIG. 31 shows the numerals representing four FS patterns in column 2. To be more specific, row 1 from top of column 6 "FSn0 FSn1 FSn3 FSn4" shows "3" in row 12 from top of column 2 of FIG. 29 or FIG. 31 representing the FS pattern of DSX22, "5" in row 13 from top of column 2 of FIG. 29 or FIG. 31 representing the FS pattern of DSX23, "6" in row 15 from top of column 2 of FIG. 29 or FIG. 31 representing the FS pattern of DSX25, and "0" in row 1 from top of column 2 of FIG. 30 representing the FS pattern of DSX0, as "0653" in the order of DSX0, DSX25, DSX23, and DSX22.

Likewise, row 2 from top of column 6 "FSn0 FSn1 FSn3 FSn4" of FIG. 30 shows "5" in row 13 from top of column 2 of FIG. 29 or FIG. 31 representing the FS pattern of DSX23, "2" in row 14 from top of column 2 of FIG. 29 or FIG. 31 representing the FS pattern of DSX24, "0" in row 1 from top of column 2 of FIG. 30 representing the FS pattern of DSX0, and "1" in row 2 from top of column 2 of FIG. 30 representing the FS pattern of DSX1, as "1025" in the order of DSX1, DSX0, DSX24, and DSX23.

Likewise, row 3 from top of column 6 "FSn0 FSn1 FSn3 FSn4" of FIG. 30 shows "2" in row 14 from top of column 2 of FIG. 29 or FIG. 31 representing the FS pattern of DSX24, "6" in row 15 from top of column 2 of FIG. 29 or FIG. 31 representing the FS pattern of DSX25, "1" in row 2 from top of column 2 representing the FS pattern of DSX1, and "2" in row 3 from top of column 2 of FIG. 30 representing the FS pattern of DSX2, as "2162" in the order of DSX2, DSX1, DSX25, and DSX24.

In what follows, as described above, in FIG. 30 and FIG. 31, nth row from top of column 6 "FSn0 FSn1 FSn3 FS4" shows (if the row numbers are assigned through FIG. 30 and FIG. 31) the FS pattern on row n-4 from top of column 2, the FS pattern in row n-3 from top of column 2, the FS pattern in row n-1 from top of column 2, and the FS pattern of nth row from top of column 2 in the order of the FS pattern on nth row from top of column 2, FS pattern in n-1 row from top of column 2, the FS pattern in n-3 row from top of column 2, and the FS pattern on n-4 row from top of column 2. It should be noted that n is up to 25.

As described above, by referencing the tables of FIG. 28 through FIG. 31, the preamble frame number candidate extracting block 55 and the data frame number candidate extracting block 56, which are the demodulating blocks equivalent in MD-Data2 to the 1–7 pp demodulating block 26 searches for frame number candidates. It should be noted that the basic contents of the processing up to the determination of the frame numbers for the similar formats in the demodulating blocks equivalent in MD-Data2 to the 1–7 pp demodulating block 26 are substantially the same as that of the processing described above with reference to FIGS. 21 through 24, except that the shift register 51 is a 24-bit shift register.

The register 54-1 outputs the FS pattern (hereafter referred to as FSn1) reproduced one frame (1134 bits) before the head of the FS pattern (hereafter referred to as FSn0) detected in the FS pattern comparing block 53, the register 54-2 outputs the FS pattern (hereafter referred to as FSn2) reproduced two frames (2268 bits) before the head of the detected data FSn0, the register 54-3 outputs the FS pattern (hereafter referred to as FSn3) reproduced three frames (3402 bits) before the head of the detected data FSn0, and the register 54-4 outputs the FS pattern (hereafter referred to as FSn4) reproduced four frames (4536 bits) before the head of the detected data FSn0.

The format of the data to be recorded by the optical disk apparatus 1 to which the present invention is applied is the same in data-part frame sync arrangement as the recording format (hereafter referred to as a DVR format) in which data are recorded by a digital video recorder (DVR), so that the frame sync channel bit patterns in the data part may be shared between the optical disk apparatus 1 and the digital video recorder. The following describes the DVR format with reference to FIGS. 32 and 33.

FIG. 32 shows a frame sync structure in the DVR format. As shown in FIG. 32, the FS pattern of the DVR format is obtained by removing FS7 from the FS pattern of the format shown in FIG. 6 to which the present invention is applied. Namely, the configuration of FS0 through FS6 is generally the same as the configuration of FS0 through FS 6 shown in FIG. 6.

FIG. 33 shows the arrangement of the FS patterns in the data part in the DVR format. The arrangement shown in FIG. 33 is the same as the arrangement of the FS patterns in the format to which the present invention is applied shown in FIG. 5C.

As shown in FIGS. 32 and 33, the frame sync structure in the data part of the format of the present invention is the same as the frame sync structure in the data part of the DVR format. Designed as such, the format of the present invention and the DVR format may share the arrangements of the frame sync bit patterns in the data part and of the frame syncs.

Consequently, the recording medium practiced as one embodiment of the present invention allows the processing of the data part to be executed by the modulator/demodulator of the DVR.

The above-mentioned sequences of processing may be executed by not only hardware but also software. In the software approach, the optical disk apparatus 1 is configured by a general-purpose personal computer such as shown in FIG. 34.

Referring to FIG. 34, a CPU 101 executes various processing operations as instructed by programs stored in a ROM 102 or programs loaded into a RAM 103 from a storage block 108. The RAM 103 also stores, as required, the data necessary for the CPU 101 to execute various processing operations.

The CPU 101, the ROM 102, and the RAM 103 are interconnected via a bus 104. This bus 104 is also connected to an input/output interface 105.

The input/output interface 105 is connected to an input block 106 constituted by a keyboard and a mouse for example, an output block 107 constituted by a display device for example, a storage block 108 constituted by a hard disk for example, and a communication block 109 constituted by a modem and terminal adaptor for example. The communication block 109 performs the communication processing via networks including the Internet.

The input/output interface 105 is also connected to a drive 110 as required, on which a magnetic disk 121, an optical disk 122, a magneto-optical disk 123, or a semiconductor memory 124 is loaded as required. The computer programs read from these storage media are installed in the storage block 108 as required.

To have software execute the above-mentioned sequences of processing, the programs constituting the software are installed, from networks or recording media, into a computer assembled in a dedicated hardware unit or a general-purpose personal computer for example capable of executing various functions by installing various programs.

The recording media are constituted not only by a package media including the magnetic disk 121 (including floppy disk), the optical disk 122 (including CD-ROM (Compact Disk Read Only Memory) and DVD (Digital Versatile Disk)), the magneto-optical disk 123 (including MD (Mini Disk)), or the semiconductor memory 124 which are provided separately of the device main body to supply programs, but also by the ROM 102 and the hard disk recorded with programs incorporated in the storage block 108 which are supplied to users as assembled in the device main body beforehand.

It should be noted that the steps describing each program recorded on the recording media may include not only the processing which is executed in a time-dependent manner in accordance with a predetermined sequence but also the processing which is executed in a parallel or discrete manner.

While the preferred embodiments of the present invention have been described using specific terms, such description is for illustrative purposes only, and it is to be understood that changes and variations may be made without departing from the spirit or scope of the appended claims.

What is claimed is:

1. A recording medium in which a synchronous pattern is attached to each of divided data having a predetermined length to form a frame, a data part is constituted by 31 frames, a preamble part including a plurality of synchronous patterns is attached to a start portion of said data part and a postamble part including a plurality of synchronous patterns is attached to an end portion of said data part to form a cluster, and information is recorded to said recording medium in units of said cluster;
    wherein at least one of said plurality of synchronous patterns attached to said preamble part and said postamble part is different from those attached to said data part, and
    a plurality of synchronous patterns are attached to said data part, said plurality of synchronous patterns attached to said data part are arranged such that at least three of the following four criteria are satisfied,
        a sequenced arrangementof synchronous patterns attached to frames (n-1) and n does not occur at two or more positions,
        a sequenced arrangement of synchronous patterns attached to frames (n-2) and n does not occur at two or more positions,
        a sequenced arrangement of synchronous patterns attached to frames (n-3) and n does not occur at two or more positions, and
        a sequenced arrangement of synchronous patterns attached to frames (n-4) and n does not occur at two or more positions,
    wherein n is an integer that ranges from 0 through 31.

2. The recording medium according to claim 1, wherein at least one of said plurality of synchronous patterns to be attached to said preamble part is attached with the same synchronous pattern as said synchronous pattern attached to said data part.

3. A recording medium reproducing apparatus for reproducing a recording medium in which a synchronous pattern is attached to each of divided data having a predetermined length to form a frame, a data part is constituted by 31 frames, a synchronous pattern attached to each of said 31 frames in said data part, a preamble part including a plurality of synchronous patterns is attached to a start portion of said data part and a postamble part including a plurality of synchronous patterns is attached to an end portion of said data part to form a cluster, and information is recorded to said recording medium in units of said cluster, said recording medium reproducing apparatus comprising:
    synchronous pattern detecting means for detecting each of said plurality of synchronous patterns and for detecting whether said plurality of synchronous patterns attached to said frames in said data part are arranged such that at least three of the following four criteria are satisfied,
        a sequenced arrangement of synchronous patterns attached to frames (n-1) and n does not occur at two or more positions,
        a sequenced arrangement of synchronous patterns attached to frames (n-2) and n does not occur at two or more positions,
        a sequenced arrangement of synchronous patterns attached to frames (n-3) and n does not occur at two or more positions, and
        a sequenced arrangement of synchronous patterns attached to frames (n-4) and n does not occur at two or more positions,
        wherein n ranges from 0 through 31; and
    reproducing position identifying means for identifying, from a combination of at least two of said plurality of synchronous patterns detected by said synchronous pattern detecting means, said frame of one of said preamble part and said data part.

4. A recording medium recording apparatus for recording information including a data part, a preamble part, and a postamble part to a recording medium, comprising:
    synchronous pattern attaching means for attaching synchronous patterns in a predetermined sequence to each of 31 frames constituting said data part and attaching said synchronous patterns to said preamble part and said postamble part each being configured on a frame basis such that said data part includes, at least one synchronous pattern that is different from said synchronous patterns to be attached to each of said frames;
    said synchronous patterns attached to said data part are arranged such that at least three of the following four criteria are satisfied,
        an arrangement sequence of synchronous patterns attached to frames (n-1) and n does not occur at two or more positions,
        an arrangement seQuence of synchronous patterns attached to frames (n-2) and n does not occur at two or more positions,
        an arrangement sequence of synchronous patterns attached to frames (n-3) and n does not occur at two or more positions, and
        an arrangement sequence of synchronous patterns attached to frames (n-4) and n does not occur at two or more positions,
        wherein n is an integer that ranges from 0 through 31; and
    recording means for recording, to said recording medium, information attached with said preamble part and said postamble part by said synchronous pattern attaching means.

* * * * *